United States Patent
Goto et al.

(10) Patent No.: US 9,102,871 B2
(45) Date of Patent: Aug. 11, 2015

(54) LIQUID CRYSTAL COMPOUND SHOWING NEGATIVE DIELECTRIC ANISOTROPY, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Mayumi Goto, Chiba (JP); Sayaka Fujimori, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/865,559

(22) Filed: Apr. 18, 2013

(65) Prior Publication Data

US 2013/0277610 A1 Oct. 24, 2013

(30) Foreign Application Priority Data

Apr. 24, 2012 (JP) .................................. 2012-098635
Apr. 16, 2013 (JP) .................................. 2013-085729

(51) Int. Cl.
*C09K 19/34* (2006.01)
*C07D 407/00* (2006.01)
*C09K 19/54* (2006.01)

(52) U.S. Cl.
CPC .............. *C09K 19/54* (2013.01); *C09K 19/3402* (2013.01)

(58) Field of Classification Search
CPC .... C09K 19/54; C09K 19/34; C09K 19/3402; C07D 407/00
USPC ............... 252/299.01, 299.6, 299.61, 299.63; 549/200, 356, 416, 427, 428; 428/1.1
See application file for complete search history.

(56) References Cited

U.S. PATENT DOCUMENTS 6,576,303 B1 6/2003 Tamura et al.
7,838,087 B2 * 11/2010 Matsui et al. .................. 428/1.1

FOREIGN PATENT DOCUMENTS

| EP | 0 967 261 | 12/1999 |
|---|---|---|
| EP | 1 731 493 | 12/2006 |
| JP | 8-040953 | 2/1996 |
| JP | 2000-8040 | 1/2000 |
| JP | 2005-314385 | 11/2005 |
| WO | 00/39063 | 7/2000 |

OTHER PUBLICATIONS

F. M. Leslie, "Distortion of Twisted Orientation Patterns in Liquid Crystals by Magnetic Fields", Molecular Crystals and Liquid Crystals, vol. 12, pp. 57-72, 1970.
P. Kirsch et al., "Nematic Liquid Crystals with Negative Dielectric Anisotropy: Molecular Design and Synthesis", Synlett., No. 4, pp. 389-396, 1999.
P. Kirsch et al., "Nematic Liquid Crystals for Active Matrix Displays: Molecular Design and Synthesis", Angew. Chem. Int. Ed., vol. 39, pp. 4216-4235, 2000.

* cited by examiner

*Primary Examiner* — Geraldina Visconti
(74) *Attorney, Agent, or Firm* — Wenderoth, Lind & Ponack, L.L.P.

(57) ABSTRACT

To provide a liquid crystal compound having a large negative value of dielectric anisotropy ($\Delta\epsilon$). A compound is represented by formula (1):

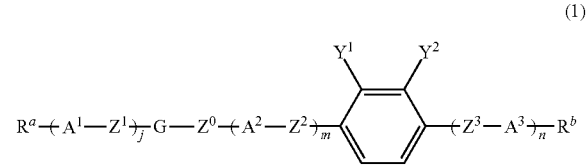

(1)

wherein, in formula (1), one of $Y^1$ and $Y^2$ is fluorine, and the other is $CF_2H$ or $CF_3$; G is a ring represented by formula (pr-1) or formula (pr-2):

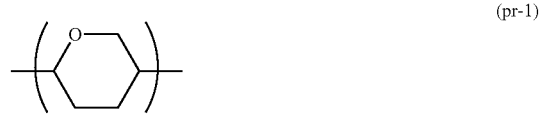

(pr-1)

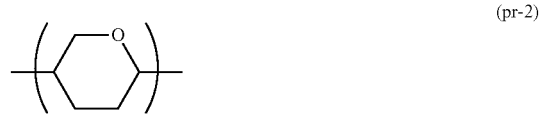

(pr-2)

wherein $A^1$ to $A^3$ are independently 1,4-cyclohexylene or 1,4-phenylene; $R^a$ and $R^b$ are independently hydrogen, alkyl having 1 to 20 carbons, or the like; $Z^0$, and $Z^1$ to $Z^3$ are independently a single bond, $-(CH_2)_2-$, $-CH=CH-$, $-CF_2O-$, $-OCF_2-$, $-CH_2O-$, $-OCH_2-$, $-COO-$ or $-OCO-$; j, m and n are an integer from 0 to 2, and a sum of j, m and n is 0, 1 or 2, however, when m is 0, $Y^1$ is $CF_2H$ or $CF_3$, $Y^2$ is fluorine, and $Z^0$ is a single bond, G is a ring represented by formula (pr-1).

12 Claims, No Drawings

LIQUID CRYSTAL COMPOUND SHOWING NEGATIVE DIELECTRIC ANISOTROPY, LIQUID CRYSTAL COMPOSITION AND LIQUID CRYSTAL DISPLAY DEVICE

TECHNICAL FIELD

The invention relates to a new liquid crystal composition, liquid crystal compound and liquid crystal display device. More specifically, the invention relates to a liquid crystal compound having a negative value of dielectric anisotropy (Δ∈), a liquid crystal composition containing the compound and a liquid crystal display device including the liquid crystal composition.

BACKGROUND ART

A display device using a liquid crystal compound is widely utilized for a display of a watch, a calculator, a word processor and so forth. The display devices utilize characteristics of the liquid crystal compound, such as optical anisotropy and dielectric anisotropy.

A liquid crystal phase includes a nematic liquid crystal phase, a smectic liquid crystal phase and a cholesteric liquid crystal phase, and the nematic liquid crystal phase is most widely utilized. Specific examples of display modes include a dynamic scattering (DS) mode, a deformation of aligned phases (DAP) mode, a guest/host (GH) mode, a twisted nematic (TN) mode, a super twisted nematic (STN) mode, a bistable twisted nematic (BTN) mode, a thin film transistor (TFT) mode, a vertical alignment (VA) mode, a multi-domain vertical alignment (MVA) mode, an optical compensation bend (OCB) mode, an in-plane switching (IPS) mode and a polymer sustained alignment (PSA) mode.

For the liquid crystal compound used in the display modes, characteristics such as having a liquid crystal phase in a wide temperature range centering on room temperature, being sufficiently stable under conditions in which the display device is used, and having sufficient characteristics for driving the display device are required. However, no single compound meeting the requirements is found at present.

Therefore, a liquid crystal composition meeting the requirements is prepared by mixing several kinds to several tens kinds of liquid crystal compounds. The requirements desired for the liquid crystal compound constituting the liquid crystal composition are as described below.

The requirements include:
(1) high stability to heat, light and so forth;
(2) high clearing point (clearing point: phase transition temperature between the liquid crystal phase and an isotropic phase);
(3) low minimum temperature of a liquid crystal phase such as the nematic phase and the smectic phase, particularly, a low minimum temperature of the nematic phase;
(4) suitable optical anisotropy;
(5) large dielectric anisotropy;
(6) suitable elastic constant; and
(7) excellent solubility in other liquid crystal compounds As a display mode for overcoming narrowness of viewing angle being a biggest problem of the liquid crystal display device, among the display modes, the modes such as the IPS mode, the VA mode, the OCB mode and the PSA mode attract attention in recent years. Among the liquid crystal display devices according to the modes, in particular, the liquid crystal display device according to the IPS mode or the VA mode has a wide viewing angle and also an excellent responsiveness to further obtain a high contrast display, and thus is actively developed. Features of the liquid crystal composition used for the liquid crystal display devices according the display modes are in a negative value of dielectric anisotropy. Further, a liquid crystal composition having a large negative value of dielectric anisotropy is known to allow a decrease of driving voltage of the liquid crystal device including the liquid crystal composition (see Non-patent literature No. 1). Therefore, the liquid crystal compound being a constituent of the liquid crystal composition is also required to have a larger negative value of dielectric anisotropy.

An attempt has been made so far for increasing an absolute value of negative dielectric anisotropy in a compound having a 2,3-difluorophenylene skeleton. For example, a compound prepared by introducing a tetrahydropyran-2,5-diyl skeleton into a compound having a 2,3-difluorophenylene skeleton is reported (Patent literature No. 1). Compound (b) shows a large negative dielectric anisotropy in comparison with compound (a).

Formula 1

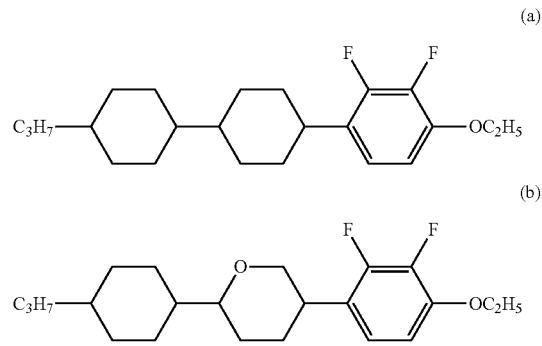

Furthermore, as a compound showing a negative dielectric anisotropy, compound (15) having a 2,3-difluoro-1,4-phenylene skeleton is generally known (Non-patent literature No. 3). In order to further increase an absolute value of negative dielectric anisotropy, compound (16) prepared by bonding trifluoromethyl on a lateral position of a molecule; and compound (17), compound (18) and compound (19) each prepared by bonding difluoromethyl on a lateral position of a molecule have been reported (Patent literature No. 2, Non-patent literature No. 2, Non-patent literature No. 3, Patent literature No. 3 and Patent literature No. 4).

Formula 2

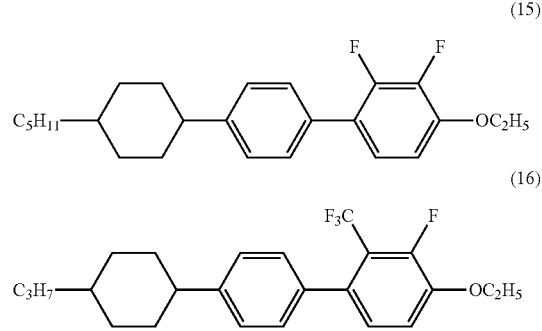

-continued (17)

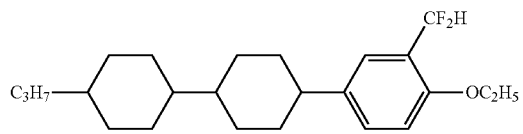

(18)

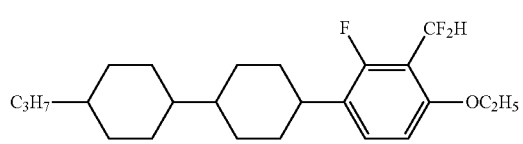

(19)

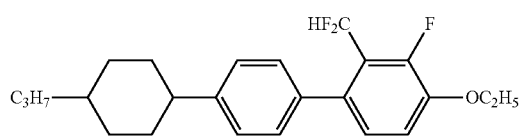

In order to decrease the driving voltage of the liquid crystal display device according to the IPS mode, the VA mode or the like, a liquid crystal compound having a further large negative value of dielectric anisotropy, a liquid crystal composition containing the compound and a liquid crystal display device including the liquid crystal composition are desired.

CITATION LIST

Patent Literature

Patent literature No. 1: JP 2000-008040 A.
Patent literature No. 2: JP H8-040953 A.
Patent literature No. 3: WO 2000/039063 A.
Patent literature No. 4: JP 2005-314385 A.

Non-Patent Literature

Non-patent literature No. 1: Mol. Cryst. Liq. Cryst., 12, 57 (1970).
Non-patent literature No. 2: Synlett. 1999, No. 4, 389-396.
Non-patent literature No. 3: Angew, Chem. Int, Ed. 2000, 39, 4216-4235.

SUMMARY OF INVENTION

Technical Problem

An object of the invention is to provide a liquid crystal compound having a large negative value of dielectric anisotropy ($\Delta\epsilon$), a liquid crystal composition containing the compound and a liquid crystal display device including the liquid crystal composition.

Solution to Problem

The present inventors have diligently conducted research to achieve the object. As a result, the present inventors have found that a liquid crystal compound having a structure as described below has a large negative value of dielectric anisotropy ($\Delta\epsilon$), and have completed the invention.

More specifically, the invention concerns a compound represented by formula (1):

Formula 3

(1)

$$R^a\text{-}(A^1\text{-}Z^1)_j\text{-}G\text{-}Z^0\text{-}(A^2\text{-}Z^2)_m\text{-}\underset{Y^1\ Y^2}{\underset{|\ |}{\bigcirc}}\text{-}(Z^3\text{-}A^3)_n\text{-}R^b$$

wherein, in formula (1), one of $Y^1$ and $Y^2$ is fluorine, and the other is $CF_2H$ or $CF_3$; G is a ring represented by formula (pr-1) or formula (pr-2):

Formula 4

(pr-1)

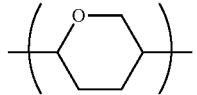

(pr-2)

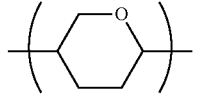

wherein $A^1$ to $A^3$ are independently 1,4-cyclohexylene or 1,4-phenylene; $R^a$ and $R^b$ are independently hydrogen or alkyl having 1 to 20 carbons, and in the alkyl, at least one of —$CH_2$— may be replaced by —O—, —S— or —CO—, and at least one of —$(CH_2)_2$— may be replaced by —CH=CH—; $Z^0$, and $Z^1$ to $Z^3$ are independently a single bond, —$(CH_2)_2$—, —CH=CH—, —$CF_2O$—, —$OCF_2$—, —$CH_2O$—, —$OCH_2$—, —COO— or —OCO—; j, m and n are an integer from 0 to 2, and a sum of j, m and n is 0, 1 or 2, a plurality of -$A^1$-$Z^1$— may be identical with or different from each other when j is 2, a plurality of -$A^2$-$Z^2$— may be identical with or different from each other when m is 2, and a plurality of —$Z^3$-$A^3$- may be identical with or different from each other when n is 2, however, G is a ring represented by formula (pr-1) when m is 0, $Y^1$ is $CF_2H$ or $CF_3$, $Y^2$ is fluorine, and $Z^0$ is a single bond.

In formula (1), $Z^0$, and $Z^1$ to $Z^3$ are preferably a single bond.

In formula (1), m is preferably 0.

The compound of the invention is preferably represented by formula (1-1-1) or formula (1-2-1):

Formula 5

(1-1-1)

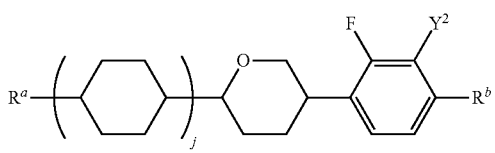

-continued

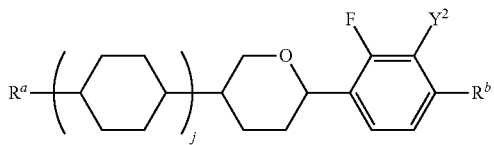
(1-2-1)

wherein, in formula (1-1-1) or formula (1-2-1), $R^a$ and $R^b$ are each defined in a manner identical with the definitions of the identical symbols in formula (1), $Y^2$ is $CF_2H$ or $CF_3$, and j is 1 or 2.

The invention also concerns a liquid crystal composition containing the compound represented by formula (1).

The liquid crystal composition of the invention preferably further contains at least one kind of compound selected from the group of compounds represented by formulas (2) to (4) as described later. The liquid crystal composition of the invention also preferably further contains a compound represented by formula (5) as described later. The liquid crystal composition of the invention also preferably further contains at least one kind of compound selected from the group of compounds represented by formulas (6) to (11) as described later. The liquid crystal composition of the invention also preferably further contains at least one kind of compound selected from the group of compounds represented by formulas (12) to (14) as described later.

The liquid, crystal composition of the invention also preferably further contains at least one kind selected from the group of an optically active compound and a polymerizable compound, and preferably further contains at least one kind selected from the group of an antioxidant and an ultraviolet absorber.

The invention further concerns the liquid crystal display device containing the liquid crystal composition.

Advantageous Effects of Invention

The invention provides a liquid crystal compound having a large negative value of dielectric anisotropy (Δ∈), a liquid crystal composition containing the compound and a liquid crystal display device including the liquid crystal composition.

DESCRIPTION OF EMBODIMENTS

Hereinafter, a liquid crystal compound having a large negative value of dielectric anisotropy (Δ∈), a liquid crystal composition containing the compound and a liquid crystal display device including the liquid crystal composition according to the invention will be explained in detail with showing specific examples.

Usage of terms herein is as described below.

"Liquid crystal compound" is a generic term for a compound having a liquid crystal phase such as a nematic phase or a smectic phase, and a compound having no liquid crystal phase but being useful as a component of a liquid crystal composition.

"Liquid crystal display device" is a generic term for a liquid crystal display panel and a liquid crystal display module.

"Liquid crystal display device" may be occasionally abbreviated as "display device" or "device."

"Clearing point" is one of values of physical properties measured using the liquid crystal compound per se as a sample, and is a phase transition temperature between the liquid crystal phase (examples: nematic phase or smectic phase) and an isotropic phase in the liquid crystal compound.

"Minimum temperature of the liquid crystal phase" is one of values of physical properties measured using the liquid crystal compound per se as a sample, and is a phase transition temperature between a crystal phase and the liquid crystal phase (examples: nematic phase or smectic phase) in the liquid crystal compound.

"Maximum temperature of the nematic phase" is a phase transition temperature between the nematic phase and the isotropic phase in the liquid crystal composition, or a phase transition temperature between the nematic phase and the isotropic phase (in the liquid crystal compound) as calculated according to an extrapolation method from a measured value of a mixture of the liquid crystal compound and a base liquid crystal, and may be occasionally abbreviated as "maximum temperature."

"Minimum temperature of the nematic phase" is a phase transition temperature between the nematic phase and the crystal phase, or between the nematic phase and the smectic phase in the liquid crystal composition, or a phase transition temperature between the nematic phase and the crystal phase, or between the nematic phase and the smectic phase (in the liquid crystal compound) as calculated according to an extrapolation method from a measured value of a mixture of the liquid crystal compound and the base liquid crystal, and may be occasionally abbreviated as "minimum temperature."

A compound represented by formula (1) (symbol "i" represents the formula number) may be occasionally abbreviated as "compound (i)." In the explanation of formula (1), $A^1$ to $A^3$ generically may be occasionally referred simply as "ring A." In the explanation of each formula, a symbol such as $B^1$, $C^1$, $D^1$ and $E^1$ each surrounded by a hexagonal shape corresponds to ring $B^1$, ring $C^1$, ring $D^1$ and ring $E^1$, respectively. A plurality of identical symbols in ring $D^1$ or the like are described in an identical or different formula, but the symbols may be identical with or different from each other.

In the explanation of each formula, "at least one" in the context of "at least one of something may be replaced by something else" means any of not only positions but also the number. For example, an expression "at least one of A may be replaced by B, C or D" includes a case where arbitrary A is replaced by B, a case where arbitrary A is replaced by C, a case where arbitrary A is replaced by D, and also a case where a plurality of A are replaced by at least two of B to D.

Specifically, a case where "in the alkyl, at least one of —$CH_2$— may be replaced by —O—, and at least one of —$(CH_2)_2$— may be replaced by —CH═CH—" includes unsubstituted alkyl, and also alkoxy, alkoxyalkyl, alkenyl, alkenyloxyalkyl and alkoxyalkenyl.

Examples of groups in which, in $CH_3(CH_2)_3$—, at least one of —$CH_2$— is replaced by —O—, —S— or —CO— include $CH_3(CH_2)_2O$—, $CH_3$—O—$(CH_2)_2$—, $CH_3$—O—$CH_2$—O—, $CH_3(CH_2)_2S$—, $CH_3$—S—$(CH_2)_2$—, $CH_3$—S—$CH_2$—S—, $CH_3$ $(CH_2)_2CO$—, $CH_3$—CO—$(CH_2)_2$— and $CH_3$—CO—$CH_2$—CO—.

Examples of groups in which, in $CH_3$ $(CH_2)_3$—, at least one of —$(CH_2)_2$— is replaced by —CH═CH—, and also at least one of —$CH_2$— may be replaced by —O—, —S— or —CO— include $CH_3$—CH═CH—$CH_2$—, $CH_2$═CH—$CH_2$—O— and $CH_3$—S—CH═CH—.

In the invention, in consideration of stability of the compound, replacement of two successive —$CH_2$— by —O— to form a group such as —O—O— is not preferred ($CH_3$—O—$CH_2$—O— in which oxygen and oxygen are not adjacent is preferred to $CH_3$—O—O—$CH_2$— in which oxygen and oxygen are adjacent, for example). Moreover, replacement of —CH$_2$— at a terminal in alkyl by —O— is not preferred, either (CH$_3$—O—CH$_2$— is preferred to HO—CH$_2$—CH$_2$—, for example).

1. Liquid Crystal Compound Showing Negative Dielectric Anisotropy 1-1. Structure of Liquid Crystal Compound of the Invention A liquid crystal compound of invention is represented by formula (1).

Formula 6

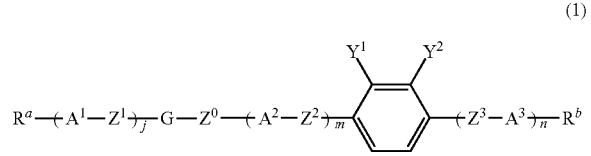

(1)

In formula (1), a meaning of each symbol is as described below.

Substituents $Y^1$ and $Y^2$ on a Benzene Ring

One of $Y^1$ and $Y^2$ is fluorine, and the other is CF$_2$H or CF$_3$. More specifically, $Y^1$ is fluorine, and $Y^2$ is CF$_2$H or CF$_3$, or $Y^1$ is CF$_2$H or CF$_3$, and $Y^2$ is fluorine.

Tetrahydropyran Ring G

G is a ring represented by formula (pr-1) or formula (pr-2).

Formula 7

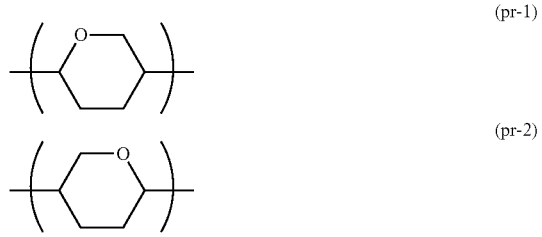

(pr-1)

(pr-2)

$A^1$, $A^2$ and $A^3$ ($A^1$ to $A^3$)

$A^1$ to $A^3$ are independently 1,4-cyclohexylene or 1,4-phenylene.

When at least two of ring A are 1,4-cyclohexylene, compound (1) has a high maximum temperature, a small optical anisotropy and a small viscosity. When at least one of ring A is 1,4-phenylene, compound (1) has a relatively large optical anisotropy, and a large orientational order parameter. When at least two of ring A are 1,4-phenylene, compound (1) has a large optical anisotropy, a wide temperature range of the liquid crystal phase, and a high maximum temperature.

Terminal Groups $R^a$ and $R^b$ $R^a$ and $R^b$ are independently hydrogen or alkyl having 1 to 20 carbons, and in the alkyl, at least one of —CH$_2$— may be replaced by —O—, —S— or —CO—, and at least one of —(CH$_2$)$_2$— may be replaced by —CH=CH—. Hereafter, a group in which such replacement is made in the alkyl is also referred to as "substituted alkyl."

$R^a$ and $R^b$ are preferably not identical. If $R^a$ and $R^b$ are not identical, compound (1) easily develops the liquid crystal phase, and solubility of compound (1) in the liquid crystal composition tends to become high.

Specific examples of the substituted alkyl include alkoxy, alkoxyalkyl, alkoxyalkoxy, alkylthio, alkylthioalkoxy, acyl, acylalkyl, acyloxy, acyloxyalkyl, alkoxycarbonyl, alkoxycarbonylalkyl, alkenyl, alkenyloxy, alkenyloxyalkyl and alkoxyalkenyl.

With regard to alkyl and the substituted alkyl, a straight chain is preferred to a branched chain. Even when alkyl and the substituted alkyl each have a branched chain, when alkyl and the substituted alkyl have optical activity, such alkyl and substituted alkyl are preferred.

When either one or both of $R^a$ and $R^b$ have a straight chain, compound (1) has a wide temperature range of the liquid crystal phase and a small viscosity. When either one or both of $R^a$ and $R^b$ have a branched chain, compound (1) has a highly solubility in other liquid crystal compounds.

When either or both of $R^a$ and $R^b$ are an optically active group, compound (1) is useful as a chiral dopant. When the compound is added to the liquid crystal composition, a reverse twisted domain generated in the device can be prevented. When neither $R^a$ nor $R^b$ is an optically active group, compound (1) is useful as a component of the liquid crystal composition.

$R^a$ and $R^b$ are independently preferably alkyl, alkoxy, alkoxyalkyl, alkenyl or alkenyloxy; independently further preferably alkyl, alkoxy, alkoxyalkyl or alkenyl; independently still further preferably alkyl or alkoxy.

The number of carbons of alkyl is ordinarily 1 to 20, preferably, 1 to 8, further preferably, 1 to 5. Specific examples of alkyl include —CH$_3$, —C$_2$H$_5$, —C$_3$H$_7$, —C$_4$H$_9$, —C$_5$H$_{10}$, —C$_6$H$_{13}$, —C$_7$H$_{15}$ and —C$_8$H$_{17}$.

The number of carbons of alkoxy is ordinarily 1 to 19, preferably, 1 to 7, further preferably, 1 to 4. Specific examples of alkoxy include —OCH$_3$, —OC$_2$H$_5$, —OC$_3$H$_7$, —OC$_4$H$_9$, —OC$_5$H$_{11}$, —OC$_6$H$_{13}$ and —OC$_7$H$_{15}$.

The number of carbons of alkoxyalkyl is ordinarily 2 to 19, preferably, 2 to 7, further preferably, 2 to 4. Specific examples of alkoxyalkyl include —CH$_2$OCH$_3$, —CH$_2$OC$_2$H$_5$, —CH$_2$OC$_3$H$_7$, (CH$_2$)$_2$OCH$_3$, —(CH$_2$)$_2$OC$_2$H$_5$, —(CH$_2$)$_2$OC$_3$H$_7$, —(CH$_2$)$_3$OCH$_3$, (CH$_2$)$_4$OCH$_3$ and —(CH$_2$)$_5$OCH$_3$.

The number of carbons of alkenyl is ordinarily 2 to 20, preferably, 2 to 8, further preferably, 2 to 5. Specific examples of alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$, —(CH$_2$)$_3$CH=CH$_2$, —CH=CHC$_4$H$_9$, —CH$_2$CH=CHC$_3$H$_7$ and —(CH$_2$)$_2$CH=CHC$_2$H$_5$.

A preferred configuration of —CH=CH— in alkenyl depends on a position of a double bond. A trans configuration is preferred in alkenyl having a double bond in an odd-numbered position such as —CH=CHCH$_3$, —CH=CHC$_2$H$_5$, —CH=CHC$_3$H$_7$, —CH=CHC$_4$H$_9$, —(CH$_2$)$_2$CH=CH$_2$, —(CH$_2$)$_2$CH=CHCH$_3$ and —(CH$_2$)$_2$CH=CHC$_2$H$_5$. A cis configuration is preferred in alkenyl having a double bond in an even-numbered posit ion such as —CH$_2$CH=CH$_2$, —CH$_2$CH=CHCH$_3$, —CH$_2$CH=CHC$_2$H$_5$—(CH$_2$)$_3$ CH=CH$_2$ and —CH$_2$CH=CHC$_3$H$_7$. An alkenyl compound having the preferred configuration has a high maximum temperature or a wide temperature range of the liquid crystal phase. A detailed explanation is found in Mol. Cryst. Liq. Cryst., 1985, 131, 109 and Mol. Cryst. Liq. Cryst., 1985, 131, 327.

The number of carbons of alkenyloxy is ordinarily 2 to 19, preferably, 2 to 7. Specific examples of alkenyloxy include —OCH$_2$CH=CH$_2$, —OCH$_2$CH=CHCH$_3$ and —OCH$_2$CH=CHC$_2$H$_5$.

Preferred specific examples of $R^a$ and $R^b$ include —CH$_3$, —C$_2$H$_5$, —C$_3$H$_7$, —C$_4$H$_9$ and —C$_5$H$_{10}$; —OCH$_3$, —OC$_2$H$_5$, —OC$_3$H$_7$, —OC$_4$H$_9$ and —OC$_5$H$_{11}$; —CH$_2$OCH$_3$, —(CH$_2$)$_2$OCH$_3$ and —(CH$_2$)$_3$OCH$_3$; —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$—CH$_2$CH=CHC$_2$H$_5$, —(CH$_2$)$_2$CH=CHCH$_3$ and —(CH$_2$)$_3$CH=CH$_2$; —OCH$_2$CH=CH$_2$, —OCH$_2$CH=CHCH$_3$ and —OCH$_2$CH=CHC$_2$H$_5$.

Further preferred specific examples of R$^a$ and R$^b$ include —CH$_3$, —C$_2$H$_5$, —C$_3$H$_7$, —C$_4$H$_9$ and —C$_5$H$_{10}$; —OCH$_3$, —OC$_2$H$_5$, —OC$_3$H$_7$, —OC$_4$H$_9$ and —OC$_5$H$_{11}$; —CH$_2$OCH$_3$; and —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$CH=CH$_2$, —CH=CHC$_3$H$_7$, —CH$_2$CH=CHC$_2$H$_5$, —(CH$_2$)$_2$CH=CHCH$_3$ and —(CH$_2$)$_3$CH=CH$_2$.

Bonding Groups $Z^0$, $Z^1$, $Z^2$ and $Z^3$ ($Z^0$ to $Z^3$)

$Z^0$ to $Z^3$ are independently a single bond, —(CH$_2$)$_2$—, —CH=CH—, —CF$_2$O—, —OCF$_2$—, —CH$_2$O—, —OCH$_2$—, —COO— or —OCO—; independently preferably a single bond, —(CH$_2$)$_2$—, —CH=CH—, —CF$_2$O—, —OCF$_2$—, —CH$_2$O— or —OCH$_2$—; further preferably a single bond, —CH=CH—, —CF$_2$O— or —OCF$_2$—; and particularly preferably a single bond. In addition, with regard to a configuration of a double bond of —CH=CH— or the like, trans is preferred to cis.

When $Z^0$ to $Z^3$ are a single bond, —(CH$_2$)$_2$—, —CH=CH—, —CF$_2$O— or —OCF$_2$—, compound (1) has a small viscosity. When $Z^0$ to $Z^3$ are a single bond, —CF$_2$O—, —OCF$_2$—, —CH$_2$O—, —OCH$_2$— or —CH=CH—, compound (1) has a smaller viscosity. When $Z^0$ to $Z^3$ are —CH=CH—, compound (1) has a wide temperature range of the liquid crystal phase and a large elastic constant ratio $K_{33}/K_{11}$ ($K_{33}$: bend elastic constant, $K_{11}$: spray elastic constant). When $Z^0$ to $Z^3$ are a single bond, compound (1) is easily synthesized.

Number of Repetitions of -A$^i$-Z$^i$— (i: 1, 2 or 3)

Then, j is an integer from 0 to 2, m is an integer from 0 to 2, and n is an integer from 0 to 2. A sum of j, m and n is 0, 1 or 2. More specifically, compound (1) of the invention has two to four rings, and therefore is easily synthesized and has a high solubility in the liquid crystal composition. The sum of j, m and n is preferably 1 or 2, and m is preferably 0.

A plurality of -A$^1$-Z$^1$— may be identical with or different from each other when j is 2.

A plurality of -A$^2$-Z$^2$— may be identical with or different from each other when m is 2.

A plurality of —Z$^3$-A$^3$- may be identical with or different from each other when n is 2.

However, when m is 0, Y$^1$ is CF$_2$H or CF$_3$, Y$^2$ is fluorine and $Z^0$ is a single bond (requirement A), G is a ring represented by formula (pr-1). When requirement A is met, in a case where G is a ring represented by formula (pr-1), compound (1) of the invention has both a high maximum temperature and a large absolute value of dielectric anisotropy in comparison with a case where G is a ring represented by formula (pr-2).

1-2. Specific Examples of Compound (1) of the Invention

Compound (1) of the invention is specifically represented by formulas (1-1) to (1-4). Formulas (1-1) and (1-3) represent a case where G is a ring represented by formula (pr-1) in formula (1), and formulas (1-2) and (1-4) represent a case where G is a ring represented by formula (pr-2) in formula (1).

Formula 8

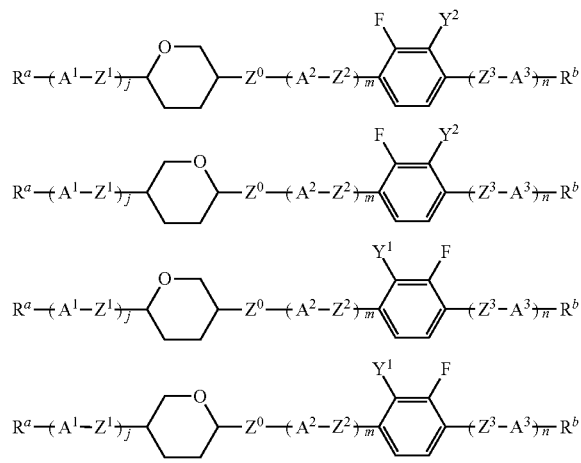

In formulas (1-1) to (1-4), Y$^1$ and Y$^2$ are CF$_2$H or CF$_3$; and A$^1$ to A$^3$, R$^a$, R$^b$, Z$^0$, Z$^1$ to Z$^3$, and j, m and n are defined in a manner identical with the definitions of the identical symbols in formula (1). However, in formula (I-4), a structure in which m is 0 and Z$^0$ is a single bond is not included.

Compound (1) of the invention particularly preferably includes a compound represented by formula (1-1-1) or formula (1-2-1).

Formula 9

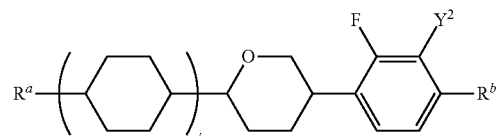

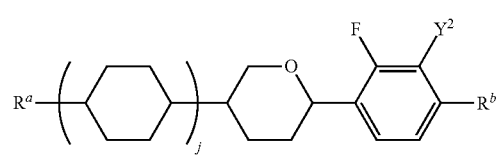

In formulas (1-1-1) to (1-2-1), R$^a$ and R$^b$ are defined in a manner identical with the definitions of the identical symbols in formula (1), respectively, Y$^2$ is CF$_2$H or CF$_3$, and j is 1 or 2.

Compound (1) of the invention also preferably includes a compound represented by formula (1-2-2), formula (1-3-1), formula (1-3-2) or formula (1-4-1).

Formula 10

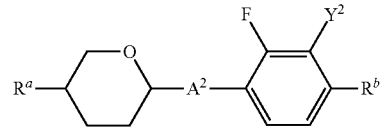

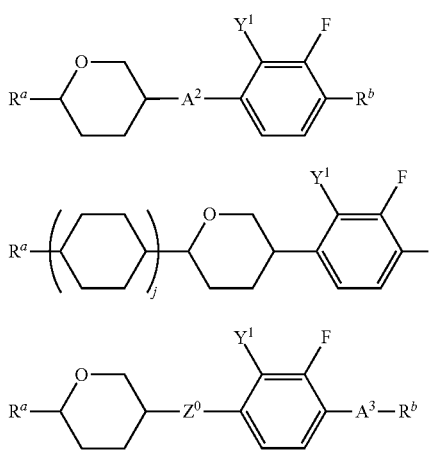

In formula (1-2-2), formula (1-3-1), formula (1-3-2) and formula (1-4-1), $R^a$, $R^b$, $A^2$, $A^3$ and $Z^0$ are defined in a manner identical with the definitions of the identical symbols in formula (1), respectively, however, $Z^0$ is not a single bond, $Y^1$ and $Y^2$ are $CF_2H$ or $CF_3$, and j is 1 or 2.

1-3. Properties of Compound (1) of the Invention

When compound (1) of the invention has both a tetrahydropyran ring, and a benzene ring having fluorine, difluoromethyl or trifluoromethyl on a lateral position, compound (1) of the invention shows a large negative dielectric anisotropy. The liquid crystal compound showing a large negative dielectric anisotropy is a component useful for decreasing threshold voltage of the liquid crystal composition for application to the IPS mode or the VA mode.

Moreover, compound (1) of the invention has general physical properties required as the liquid crystal compound, specifically, stability to heat and light, a relatively high clearing point, a suitable optical anisotropy, an excellent solubility in other liquid crystal compounds and a relatively small viscosity, and is the liquid crystal compound having an excellent balance of physical properties.

For example, compound (1) of the invention is significantly physically and chemically stable under conditions in which the device is ordinarily used. Accordingly, the liquid crystal composition containing compound (1) of the invention is stable under conditions in which the device is ordinarily used. Moreover, even if the liquid crystal composition of the invention is stored at a low temperature, compound (1) of the invention has no smectic phase or has no crystal precipitated at the relevant temperature.

As described above, according to the invention, terminal groups $R^a$ and $R^b$, $A^1$ to $A^3$, bonding groups $Z^0$ to $Z^3$, substituents $Y^1$ and $Y^2$ on a benzene ring in formula (1), and the number of rings of compound (1) are suitably selected, and thus physical properties of compound (1), such as values of dielectric anisotropy and optical anisotropy, can be adjusted.

1-4. Synthesis of Compound (1) of the Invention

Compound (1) of the invention can be synthesized by suitably combining techniques in synthetic organic chemistry. In order to introduce an objective terminal group, ring and bonding group into a starting material, a publicly known general organic synthesis method can be employed. Typical synthesis methods include methods described in "New Experimental Chemistry Course (Shin Jikken Kagaku Koza in Japanese), 14 Synthesis and Reaction of Organic Compounds (1978) (Maruzen Co., Ltd.)" or "Experimental Chemistry Course (Jikken Kagaku Koza in Japanese) 19 to 26 Organic Synthesis I to VIII (1991), 4th edition, Maruzen Co., Ltd.".

Hereinafter, examples for forming a bonding group, a ring represented by formula (pr-1) or formula (pr-2), a benzene ring having substituents Y1 and Y2, or the like, each being possibly included in compound (1) of the invention, will be explained by appropriately using a scheme. However, the methods for synthesizing compound (1) of the invention are not limited to the scheme as described below.

1-4-1. Formation of a Bonding Group

Examples of methods for forming bonding groups $Z^0$, $Z^1$, $Z^2$ and $Z^3$ in formula (1) are shown below using schemes. In the schemes, $MSG^1$ or $MSG^2$ represents a monovalent organic group. A plurality of $MSG^1$ or $MSG^2$ may be identical or different. Compounds (1A) to (1F) correspond to compound (1) of the invention.

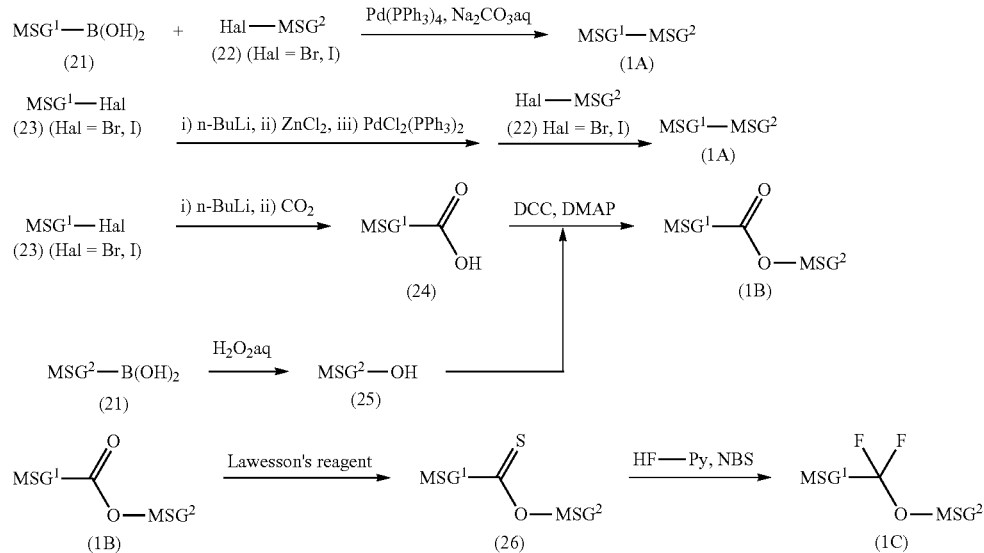

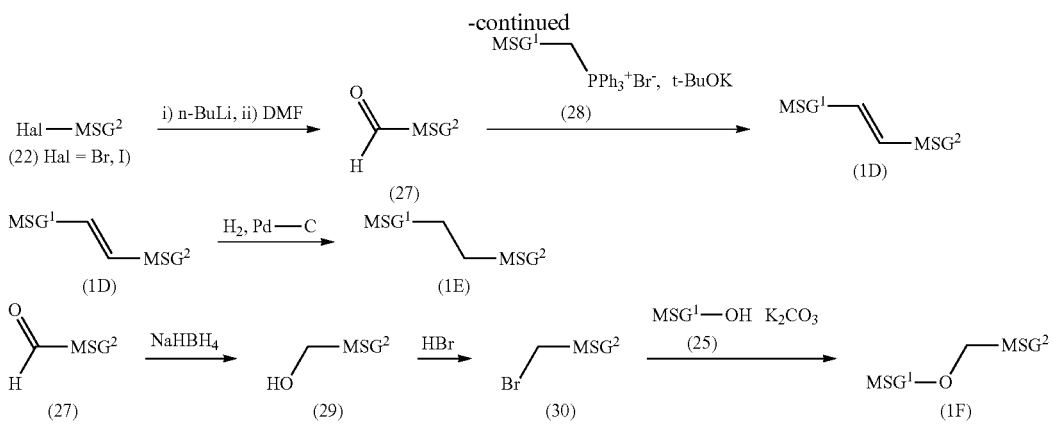

(I) Formation of a Single Bond

Compound (1A) is prepared by allowing arylboronic acid (21) to react, in the presence of an aqueous solution of carbonate and a catalyst such as tetrakis(triphenylphosphine)palladium, with compound (22) to be prepared according to a publicly known method.

Moreover, compound (1A) can be prepared also by allowing compound (23) to be prepared according to a publicly known method to react with n-butyllithium and subsequently with zinc chloride, and further with compound (22) in the presence of a catalyst such as dichlorobis(triphenylphosphine)palladium.

(II) Formation of —COO— and —OCO—

Carboxylic acid (24) is prepared by allowing compound (23) to react with n-butyllithium, and subsequently with carbon dioxide. Compound (1B) having —COO— is prepared by dehydrating compound (24) and phenol (25) to be prepared according to a publicly known method, in the presence of 1,3-dicyclohexylcarbodiimide (DDC) and 4-dimethylaminopyridine (DMAP). A compound having —OCO— can also be prepared according to the method.

(III) Formation of —CF$_2$O— and —OCF$_2$—

Compound (26) is prepared by treating compound (1B) with a thiation reagent such as Lawesson's reagent. Compound (10) having —CF$_2$O— is prepared by fluorinating compound (26) with a hydrogen fluoride-pyridine complex and N-bromosuccinimide (NBS). See M. Kuroboshi et al., Chem. Lett., 1992, 827. Compound (10) can be prepared also by fluorinating compound (26) with (diethylamino)sulfurtrifluoride (DAST). See W. H. Bunnelle et al., J. Org. Chem. 1990, 55, 768. A compound having —OCF$_2$— can also be prepared according to the method. The bonding groups can also be formed according to the method described in Peer. Kirsch et al., Angew. Chem. Int. Ed. 2001, 40, 1480.

(IV) Formation of —CH=CH—

Aldehyde (27) is prepared by treating compound (22) with n-butyllithium and then allowing the treated compound to react with formamide such as N,N-dimethylformamide (DMF). Compound (1D) is prepared by allowing aldehyde (27) to react with phosphorus ylide generated by treating phosphonium salt (28) to be prepared according to a known method with a base such as potassium tert-butoxide. Because a cis isomer is formed depending on reaction conditions, the cis isomer is isomerized into a trans isomer according to a known method, when necessary.

(V) Formation of —(CH$_2$)$_2$—

Compound (1E) is prepared by hydrogenating compound (1D) in the presence of a catalyst such as palladium on carbon.

(VI) Formation of —CH$_2$O— or —OCH$_2$—

Compound (29) is prepared by reducing compound (27) with a reducing agent such as sodium borohydride. Compound (30) is prepared by halogenating compound (29) with hydrobromic acid or the like. Compound (1F) is prepared by allowing compound (30) to react with compound (25) in the presence of potassium carbonate or the like.

1-4-2. Formation of a Ring Represented by Formula (pr-1) or Formula (pr-2)

A compound (tetrahydropyran compound) having a ring represented by formula (pr-1) or formula (pr-2) can be prepared, for example, according to a method as described in method (1) and method (2) as described below.

Method (1) for obtaining tetrahydropyran compound (41) according to step (1-1) in which oxetane compound (34) is prepared by using compound (31) having —COCl as a reaction raw material, step (1-2) in which lactone compound (36) is prepared by using the oxetane compound (34) and compound (35) having —CH$_2$—COOH or compound (37) having —CH$_2$—COOtBu as raw materials, and step (1-3) in which tetrahydropyran compound (41) is prepared by using the lactone compound (36) as a reaction raw material.

Method (2) for obtaining tetrahydropyran compound (41) according to step (2-1) in which lactone compound (45) is prepared by using compound (42) having —CH$_2$—CHO as reaction raw material, and step (2-2) in which by tetrahydropyran compound (41) is obtained by using the lactone compound (45) as a reaction raw material.

1-4-2-1. Method (1)

In a scheme as described below, MSG$^3$ or MSG$^4$ represents a monovalent organic group.

(1-1) Process for Synthesizing an Oxetane Compound

One example of a process for synthesizing oxetane compound (34) to be used as a synthetic intermediate is shown below.

Formula 12

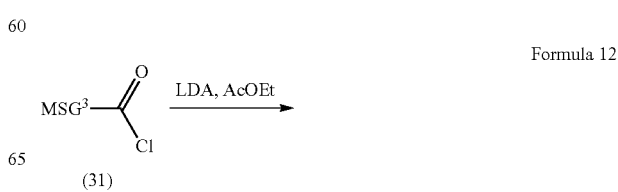

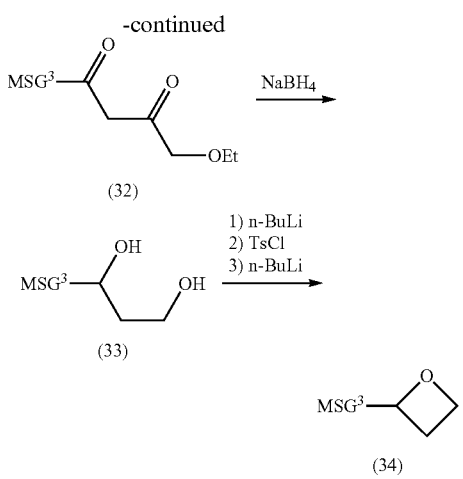

Compound (32) is prepared by allowing compound (31) to react with lithium diisopropylamide (LDA) and then allowing the reaction product to further react with ethyl acetate. The reactions are preferably performed in a tetrahydrofuran solvent at a temperature of −65° C. or lower, and then allowing temperature to slowly increase to room temperature. Compound (31) being a starting material can be easily prepared according to a method of synthetic organic chemistry.

Compound (33) is prepared by allowing compound (32) to react with sodium borohydride. The reaction is preferably performed in an ethanol solvent at a temperature between room temperature and 50° C.

Compound (34) is prepared by allowing compound (33) to react with n-butyllithium in a tetrahydrofuran solvent at a temperature between −5° C. and 5° C., and then to further react with p-toluenesulfonyl chloride, and subsequently adding n-butyllithium to the resultant reaction mixture, and then slowly increasing temperature of the reaction mixture to a boiling point. The reactions are preferably performed by sufficiently taking time for each reaction, and using exactly one equivalent for each reagent.

(1-2) Process for Synthesizing a Lactone Compound

One example of a process for synthesizing lactone compound (36) to be used as a synthetic intermediate is shown below.

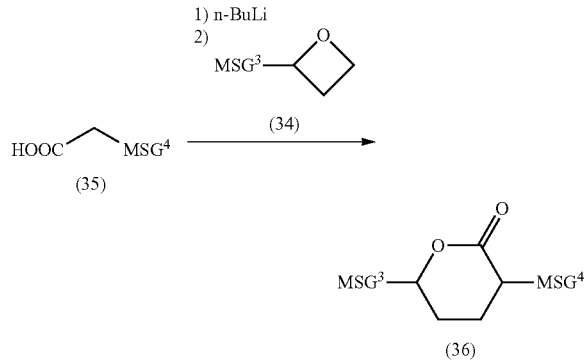

Method A: Compound (35) is allowed to react with n-butyllithium, and then to further react with compound (34) under coexistence of a boron trifluoride-diethyl ether complex. In a tetrahydrofuran solvent, the reaction with n-butyllithium is preferably performed at a temperature of −65° C. or lower, and the reaction with compound (34) is preferably performed at a temperature of −65° C. or lower. Compound (36) is obtained by performing, in the presence of p-toluenesulfonic acid monohydrate, hating reflux of a product obtained according to the reaction. The reaction is preferably performed in a toluene solvent. Compound (35) can be easily prepared according to a method of synthetic organic chemistry.

One example of a process for synthesizing lactone compound (36) to be used as a synthetic intermediate is shown below.

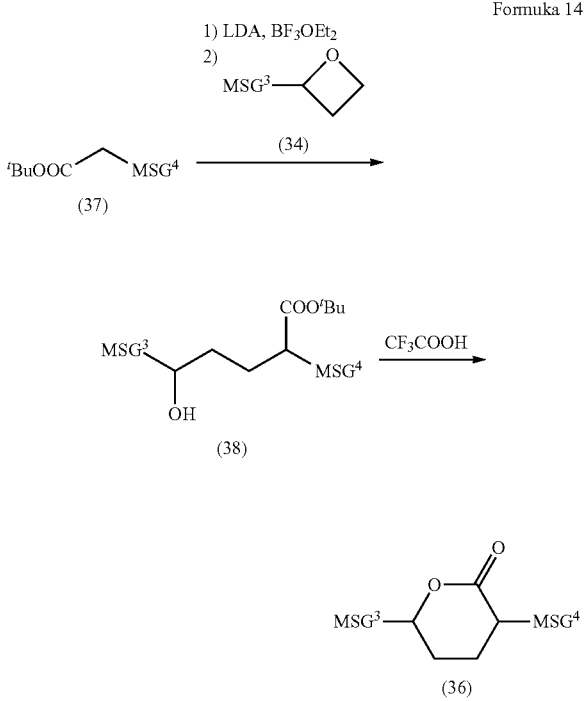

Method B: Compound (38) is prepared by allowing compound (37) to react with lithium diisopropylamide (LDA) and then to further react with compound (34) under coexistence of a boron trifluoride-diethyl ether complex. The reaction is preferably performed in a tetrahydrofuran solvent at a temperature of −65° C. or lower. Compound (36) is prepared by subsequently allowing compound (38) to react with trifluoroacetic acid in a dichloromethane solvent at room temperature. Compound (37) can be easily prepared according to a method of synthetic organic chemistry.

(1-3) Process for Synthesizing a Tetrahydropyran Compound

One example of a process for synthesizing tetrahydropyran compound (41) is shown below.

17

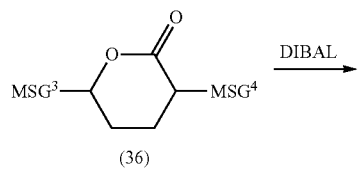

Formula 15

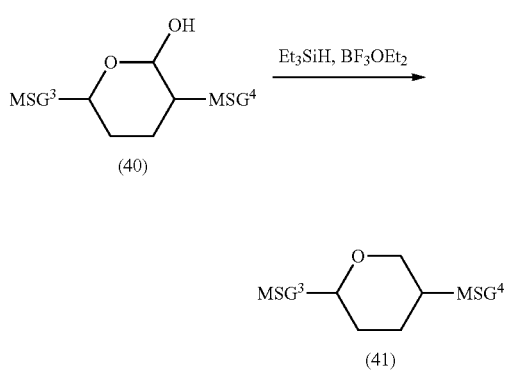

Compound (40) is prepared according to a reaction between compound (36) and diisopropylaluminum hydride (DIBAL). The reaction is preferably performed in a solvent such as at a temperature of −50° C. or lower.

Compound (41) is prepared by allowing compound (40) to react, under coexistence of a boron trifluoride-diethyl ether complex, with triethyl silane in a dichloromethane solvent at a temperature of −50° C. or lower.

1-4-2-2. Method (2)

(2-1) Process for Synthesizing a Lactone Compound

One example of a process for synthesizing lactone compound (45) to be used as a synthetic intermediate is shown below.

Formula 16

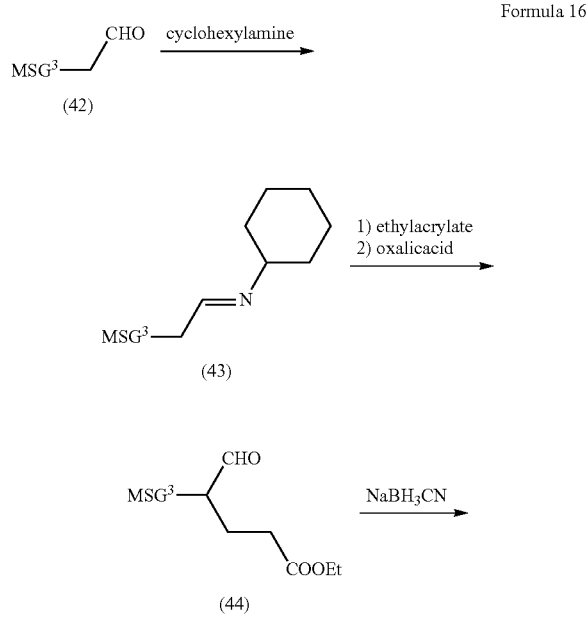

18

-continued

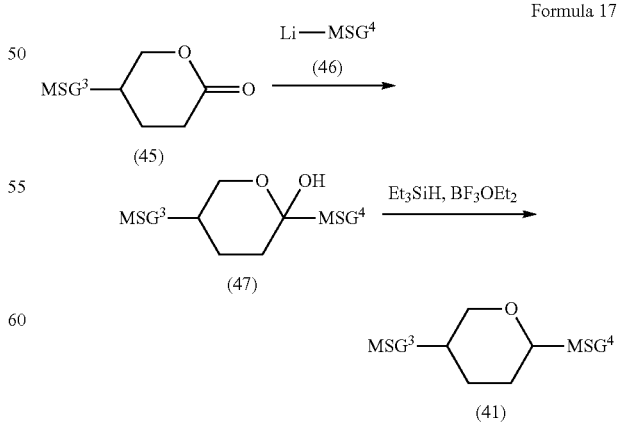

Compound (43) is prepared according to a reaction between compound (42) and cyclohexylamine. The reaction is preferably performed in a diethyl ether solvent in the presence of a base such as potassium carbonate at a temperature between room temperature and a boiling point of the solvent. Compound (42) being a starting material can be easily prepared according to a method of synthetic organic chemistry.

Compound (44) is prepared by adding ethyl acrylate to compound (43) and then deprotecting the resultant product under an acidic condition. In the reaction, ethyl acrylate per se is preferably used as a solvent. However, toluene or the like that does not react with compound (43) or ethyl acrylate may be used as the solvent. In order to prevent polymerization of ethyl acrylate, a polymerization inhibitor such as hydroquinone is preferably coexisted. When an ordinary glass reaction vessel is used, the reaction is performed at a temperature between room temperature and a boiling point of a solvent, but when a pressure reaction vessel such as an autoclave made from stainless steel is used, the reaction can also be performed at a temperature of a boiling point of the solvent or higher. Compound (44) is prepared, after an addition reaction sufficiently progresses, by adding acid such as oxalic acid to eliminate cyclohexylamine.

Compound (45) is prepared by a cyclization reaction of compound (44). The reaction is preferably performed in an isopropyl alcohol solvent in the presence of sodium cyanoborohydride at a temperature of approximately room temperature. In order to accelerate the reaction, acid such as hydrochloric acid may be added.

(2-2) Process for Synthesizing a Tetrahydropyran Compound

One example of a process for synthesizing tetrahydropyran compound (41) is shown below.

Formula 17

Compound (47) is prepared according to a reaction between compound (45) and organolithium reagent (46). The reaction is preferably performed in a tetrahydrofuran solvent at a temperature of −30° C. or lower.

Compound (41) is prepared by allowing compound (47) to react, under coexistence of and a boron trifluoride-diethyl ether complex, with triethyl silane in a dichloromethane solvent at a temperature of −50° C. or lower.

1-4-3. Formation of a Benzene Ring Having Substituents $Y^1$ and $Y^2$ 1-4-3-1. Case where Substituents $Y^1$ and $Y^2$ are a Set of Fluorine and $CF_2H$ In formula (1), an example of a method for synthesizing compound (1) in a case where substituents $Y^1$ and $Y^2$ are a set of fluorine and $CF_2H$ is shown in a scheme below. In the scheme described below, $MSG^5$ or $MSG^6$ represents a monovalent organic group.

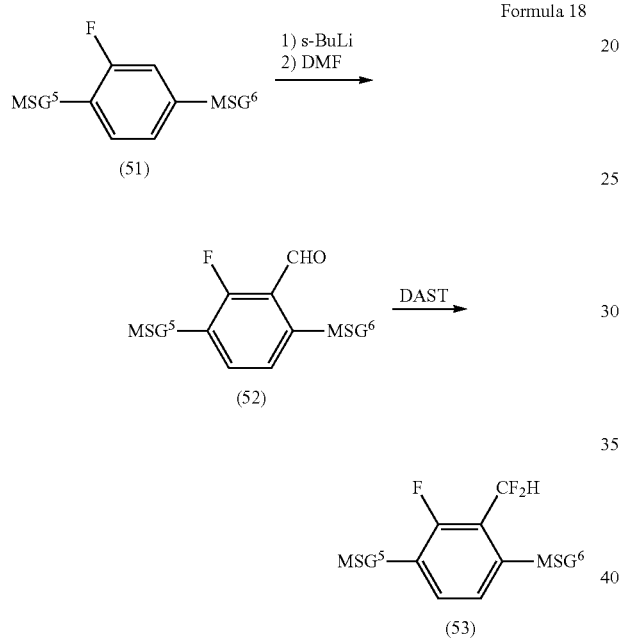

3-fluorobenzene derivative (51) is prepared according to a method disclosed in, for example, JP S58-126823 A, JP S58-121225 A, JP S59-016840 A or JP S59-042329 A.

Compound (52) is prepared, for example, by allowing 3-fluorobenzene derivative (51) to react with an organolithium reagent such as sec-butyllithium, and subsequently with dimethylformamide or formylpiperidine. The reactions are preferably performed in a solvent such as an ether hydrocarbon solvent (diethyl ether, tetrahydrofuran) at a temperature between −100° C. and room temperature.

Compound (53) is prepared by allowing compound (52) to react with a fluorinating agent such as DAST. The reaction is preferably performed in a solvent such as a halogen hydrocarbon solvent (dichloromethane) at a temperature between −100° C. and a boiling point of the solvent.

Next, examples of processes for synthesizing compounds (60) to (62) are shown, in a case where a set of substituents $Y^1$ and $Y^2$ in formula (1) is fluorine and $CF_2H$, and a bond directly bonded with a benzene ring having substituents $Y^1$ and $Y^2$ is —OCO—, —OCF$_2$— or —OCH$_2$—. A compound in which the bond is —(CH$_2$)$_2$—, —CH═CH—, —COO—, —CF$_2$O— or —CH$_2$O— can also be easily prepared according to a method of synthetic organic chemistry.

First, an example of a process for synthesizing phenolic compound (58) used as an intermediate is shown.

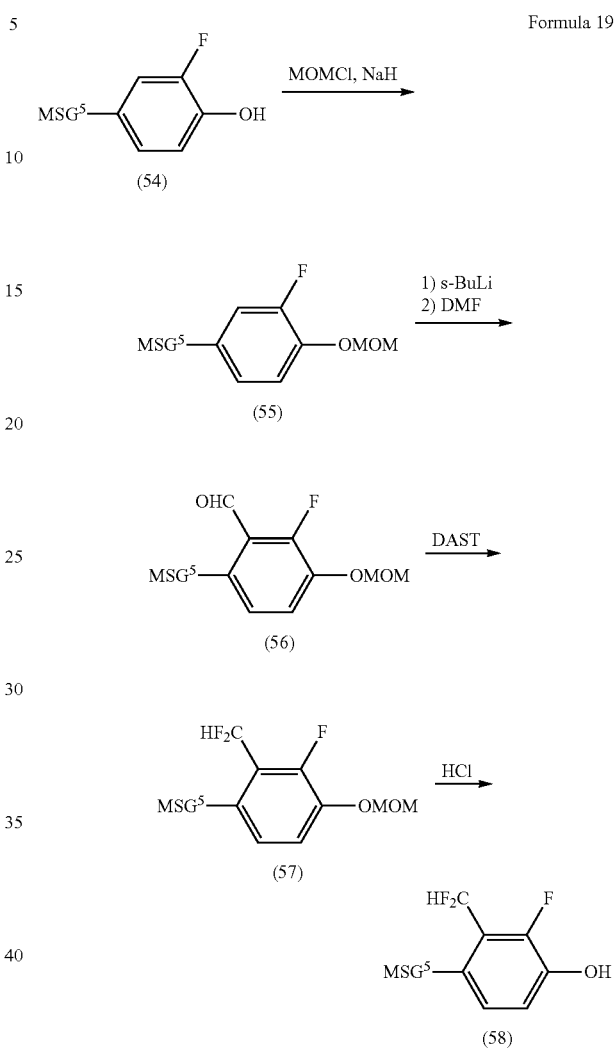

Compound (55) is prepared by allowing compound (54) to sequentially react with sodium hydride and chloromethyl methyl ether (MOMCl). The reactions are preferably performed in a tetrahydrofuran solvent at a temperature between −20° C. and a boiling point of the solvent.

Compound (56) is prepared by allowing compound (55) to react with an organolithium reagent such as sec-butyllithium, and subsequently with dimethylformamide or formylpiperidine. The reactions are preferably performed in a solvent such as an ether hydrocarbon solvent (diethyl ether or tetrahydrofuran) at a temperature between −100° C. and room temperature.

Compound (57) is prepared by allowing compound (56) to react with a fluorinating agent such as DAST. The reaction is preferably performed in a solvent such as a halogen hydrocarbon solvent (dichloromethane) at a temperature between −100° C. and a boiling point of the solvent.

Phenolic compound (58) is prepared by deprotecting compound (57). The reaction is preferably performed by allowing dilute hydrochloric acid such as 2 M hydrochloric acid to react with compound (57) in a solvent such as an alcohol solvent (ethanol) at a temperature between a boiling point of the solvent and room temperature.

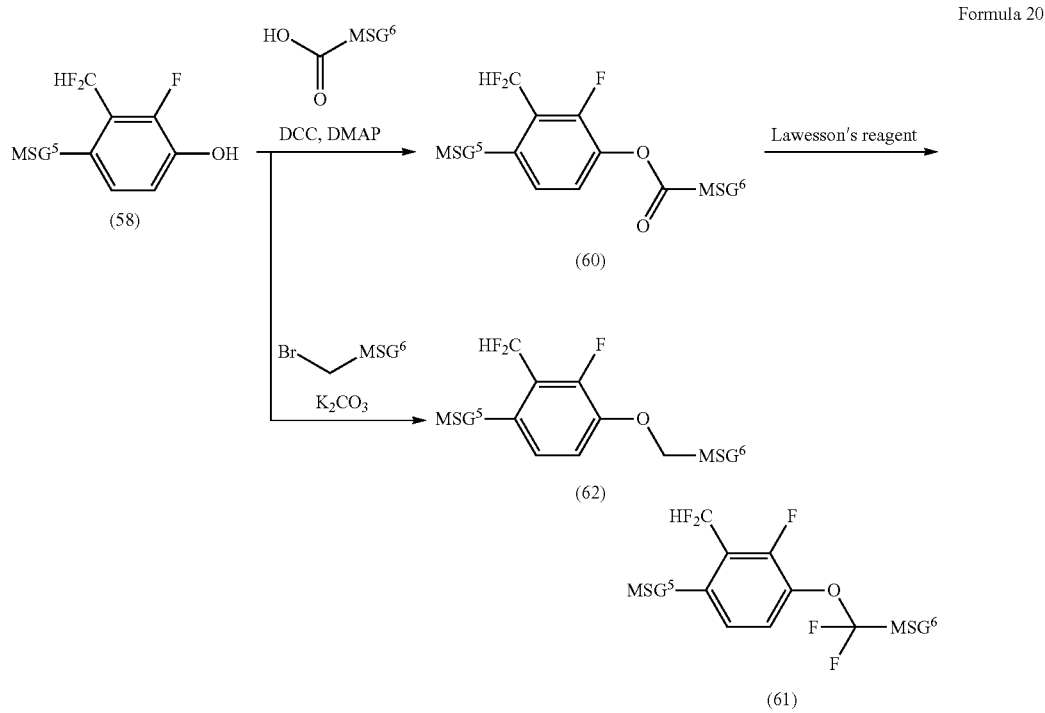

Compounds (60) to (62) can be prepared, respectively, by using phenolic compound (58) in place of compound (25) in the method for forming the bonding group.

A compound in which $Z^2$ is a single bond and $A^2$ is 1,4-phenylene, or compounds (72) and (75) in which $Z^3$ is a single bond and $A^3$ is 1,4-phenylene can be prepared according to methods as described below. A compound having 1,4-cyclohexylene can also be easily prepared by using 1,4-cyclohexylene in place of 1,4-phenylene according to a method of synthetic organic chemistry.

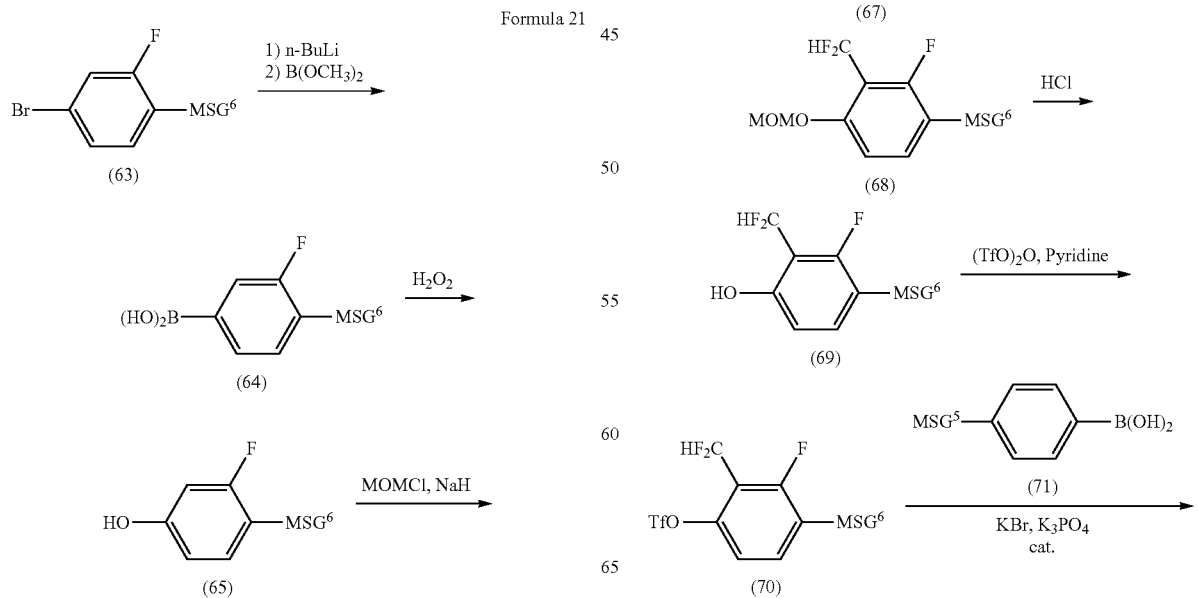

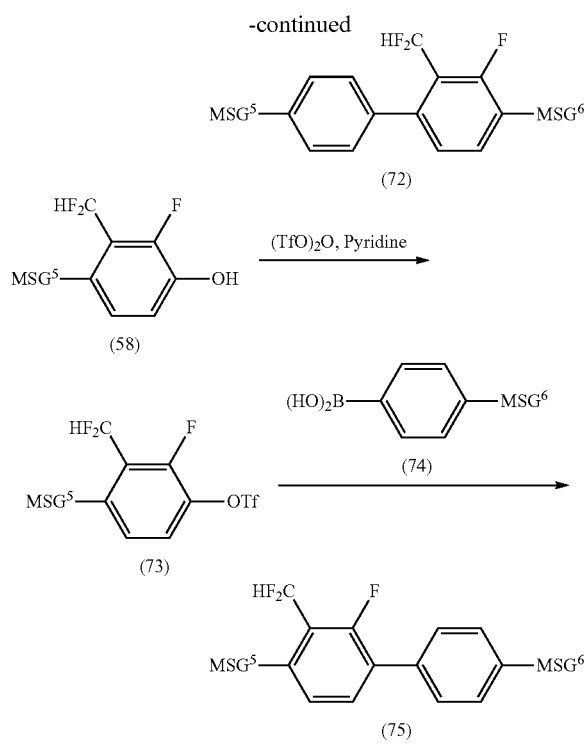

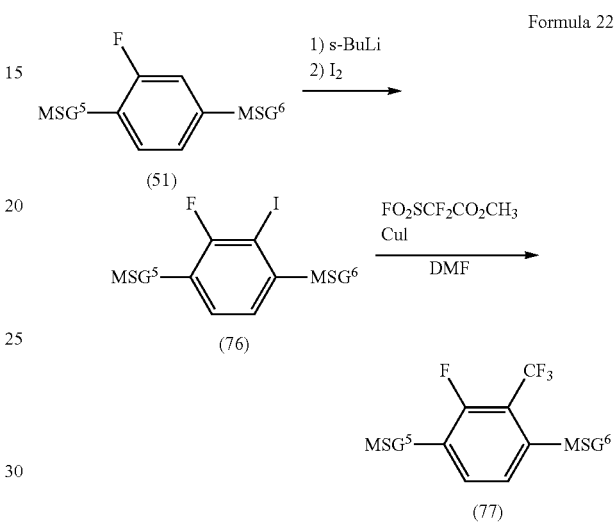

Compound (75) is prepared by using compound (58) and compound (74) in place of compound (69) and compound (71) by applying an identical reaction operation in the reaction route for preparing compound (72) from compound (69) as explained above.

1-4-3-2. Case where Substituents $Y^1$ and $Y^2$ are a Set of Fluorine and $CF_3$ An example of a method for synthesizing compound (1) in a case where substituents $Y^1$ and $Y^2$ are a set of fluorine and $CF_3$ In formula (1) is shown in a scheme as described below.

Compound (64) is prepared by lithiating compound (63) using n-butyllithium, and then allowing boric acid ester such as trimethyl borate to react with the reaction product, and further hydrolyzing the resultant reaction product with hydrochloric acid, sulfuric acid or the like. The reactions are preferably performed in a solvent such as an ether hydrocarbon solvent (diethyl ether or tetrahydrofuran) at a temperature between −100° C. and room temperature.

Compound (65) is prepared by allowing compound (64) to act on peroxide such as hydrogen peroxide water or peracetic acid to be oxidized. The reactions are preferably performed in an ether hydrocarbon solvent (examples: diethyl ether or tetrahydrofuran) or carboxylic acid (examples: formic acid or acetic acid) at a temperature between −20° C. and room temperature.

Compound (69) is prepared by using compound (65) in place of compound (54) and by applying an identical reaction operation in the reaction route for synthesizing compound (58) from compound (54) as explained above.

Compound (70) is prepared by allowing compound (69) to react with trifluoromethanesulfonic anhydride in the presence of a base such as pyridine and triethylamine. The reactions are preferably performed in a solvent such as a halogen hydrocarbon solvent (dichloromethane) at a temperature between −20° C. and room temperature.

Compound (72) is prepared by allowing compound (70) to react with boric acid compound (71). The reactions are preferably performed by using a metal catalyst in a solvent such as an aromatic hydrocarbon solvent (toluene) and an ether hydrocarbon solvent (dioxane or ethylene glycol dimethyl ether) in the presence of a base such as potassium phosphate and potassium carbonate at a temperature between room temperature and a boiling point of the solvent. As the metal catalyst, for example, tetrakis(triphenylphosphine)palladium, dichlorobis(triphenylphosphine)palladium or palladium carbon is used.

3-fluorobenzene derivative (51) is prepared according to the methods disclosed in, for example, JP S58-126823 A, JP S58-121225 A, JP S59-016840 A or JP S59-042329 A.

Compound (76) is prepared by allowing 3-fluorobenzene derivative (51) to react with an organolithium reagent such as sec-butyllithium, and subsequently with iodine. The reactions are preferably performed in a solvent such as an ether hydrocarbon solvent (diethyl ether or tetrahydrofuran) at a temperature between −100° C. and room temperature.

Compound (77) is prepared by allowing compound (76) to react with methyl fluorosulphonyldifluoroacetate in the presence of copper(I) iodide according to a method described in Qing-Yun Chen et al., J. Chem. Soc., Chem. Commun., 1989, 705. The reaction is preferably performed in an aprotic polar solvent such as dimethylformamide and dimethylsulfoxide at a temperature between 60° C. and a boiling point of the solvent.

Next, an example of a process for synthesizing a compound is shown in a case where substituents $Y^1$ and $Y^2$ in formula (1) are a set of fluorine and $CF_3$, and m and n are 0, a group ($R^b$) on a side of fluorine is alkoxy, and a group ($Z^o$) on a side of trifluoromethyl is —CH=CH—.

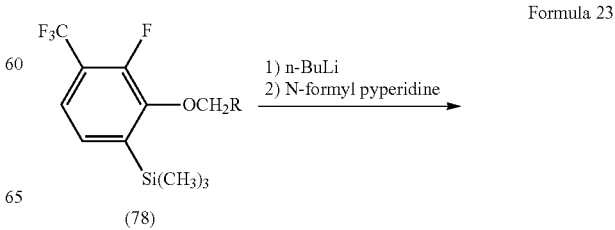

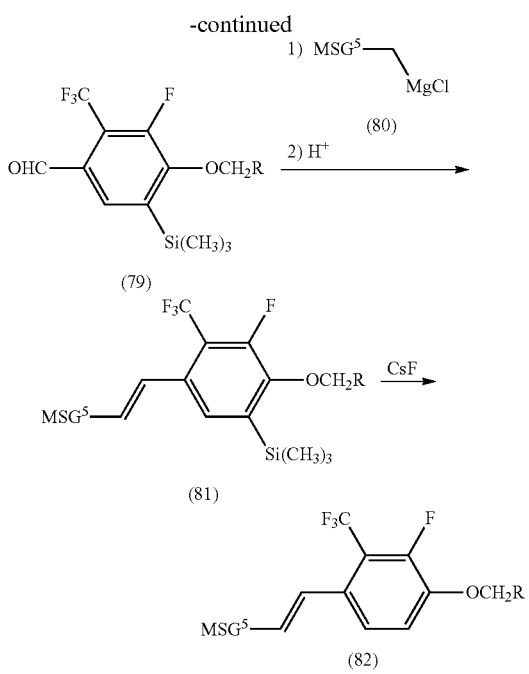

Compound (79) is prepared, for example, by allowing compound (78) described in Synlett 1999, No. 4, 389-396 to react with n-butyllithium, and subsequently with N-formylpiperidine. The reactions are preferably performed in a solvent such as an ether hydrocarbon solvent (diethyl ether or tetrahydrofuran) at a temperature between –100° C. and room temperature.

Compound (81) is prepared by allowing compound (79) to act on Grignard reagent (80), and then performing, in the presence of an acid catalyst such as p-toluenesulfonic acid, a dehydration reaction of an alcoholic body obtained.

Compound (82) is prepared by allowing compound (81) to act on a tetrahydrofuran (THF) solution of cesium fluoride or tetrabutylammonium fluoride in N,N-dimethylformamide.

2. Liquid Crystal Composition

The liquid crystal composition of the invention contains compound (1) of the invention as component A. The liquid crystal composition of the invention may contain only one kind of compound (1) or two or more kinds of compound (1).

The liquid crystal composition of the invention preferably contains component A in a ratio of approximately 0.1 to approximately 99% by mass, further preferably, approximately 1 to approximately 99% by mass, still further preferably, approximately 2 to approximately 98% by mass, based on the total mass of the liquid crystal composition. The range of content of component A is preferred in view of developing excellent characteristics (examples: threshold voltage, a temperature range of the liquid crystal phase, a value of dielectric anisotropy, a value of optical anisotropy, and viscosity) of the liquid crystal composition.

The liquid crystal composition of the invention may contain only component A, or component A and any other component that is not particularly named herein. Moreover, in order to develop various kinds of characteristics, the liquid crystal composition of the invention may further contain at least one kind of component selected from the group of component B, component C, component D and component E as explained below.

Component B is at least one kind of compound selected from the group of compounds represented by formulas (2) to (4) as described later. Component C is a compound represented by formula (5) as described later. Component D is at least one kind of compound selected from the group of compounds represented by formulas (6) to (11) as described later. Component E is at least one kind of compound selected from the group of compounds represented by formulas (12) to (14) as described later.

In addition, an expression "at least one kind of compound selected from the group of compounds represented by formulas (2) to (4)" means at least one kind of compound selected from a compound represented by formula (2), a compound represented by formula (3), and a compound represented by formula (4). A similar definition applies to other examples.

The liquid crystal composition of the invention may further contain at least one kind selected from the group of an optically active compound and a polymerizable compound, and at least one kind selected from the group of an antioxidant and an ultraviolet light absorber, according to an application.

Even when each component constituting the liquid crystal composition of the invention is an analog including an isotopic element of each element, the liquid crystal composition of the invention has no large difference in chemical and physical characteristics.

Component B (Compounds (2) to (4))

The liquid crystal composition of the invention may contain at least one kind of compound (component B) selected from the compounds represented by formulas (2) to (4). Component B has a positive value of dielectric anisotropy and a thermally and chemically superb stability, and therefore is suitably used when preparing a liquid crystal composition for application to the TN mode or IPS mode to be driven by TFT.

Formula 24

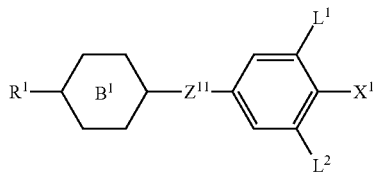

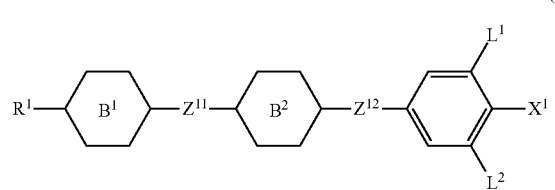

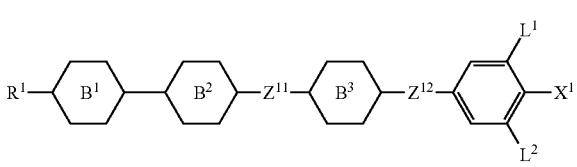

In formulas (2) to (4), a meaning of each symbol is as described below.

$R^1$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

$X^1$ is fluorine, chlorine, —$OCF_3$, —$OCF_2H$, —$CF_3$, —$CF_2H$, —$CFH_2$, —$OCF_2CF_2H$ or —$OCF_2CFHCF_3$.

Ring $B^1$, ring $B^2$ and ring $B^3$ are independently 1,4-cyclohexylene, 1,3-dioxane-2,5-diyl, pyrimidine-2,5-diyl, tetrahydropyran-2,5-diyl, tetrahydropyran-3,6-diyl, or 1,4-phenylene in which at least one of hydrogen may be replaced by fluorine.

$Z^{11}$ and $Z^{12}$ are independently —$(CH_2)_2$—, —$(CH_2)_4$—, —COO—, —$CF_2O$—, —$OCF_2$—, —CH=CH—, —C≡C—, —$CH_2O$— or a single bond.

$L^1$ and $L^2$ are independently hydrogen or fluorine.

Content of component B when using component B is ordinarily in the range of approximately 1 to approximately 99% by mass, preferably, in the range of approximately 10 to approximately 97% by mass, still further preferably, in the range of approximately 40 to approximately 95% by mass, based on the total mass of the liquid crystal composition. Moreover, when component E is further introduced into the liquid crystal composition together with component B, the viscosity of the liquid crystal composition can be adjusted. Content of component E in the case is ordinarily in the range of approximately 1 to approximately 99% by mass, preferably, in the range of approximately 10 to approximately 97% by mass, still further preferably, in the range of approximately 30 to approximately 95% by mass, based on the total mass of the liquid crystal composition.

Component C (Compound (5))

The liquid crystal composition of the invention may contain a compound (component C) represented by formula (5). Component C has a very large positive value of dielectric anisotropy, and therefore is suitably used when preparing a liquid crystal composition for application to the TN mode, the STN mode or the IPS mode. When component C is introduced into the liquid crystal composition, the threshold voltage of the liquid crystal composition can be decreased, the viscosity can be adjusted, the value of optical anisotropy can be adjusted, and the temperature range of the liquid crystal phase can be extended. Furthermore, component C can also be utilized for improvement in steepness.

Formula 25

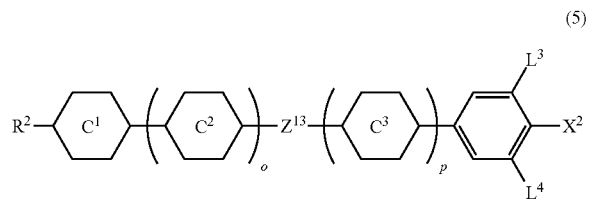

(5)

In formula (5), a meaning of each symbol is as described below.

$R^2$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

$X^2$ is —C≡N or —C≡C—C≡N.

Ring $C^1$, ring $C^2$ and ring $C^3$ are independently 1,4-cyclohexylene, 1,4-phenylene, 1,3-dioxane-2,5-diyl, tetrahydropyran-2,5-diyl, tetrahydropyran-3,6-diyl or pyrimidine-2,5-diyl, and in the 1,4-phenylene, at least one of hydrogen may be replaced by fluorine.

$Z^{13}$ is —$(CH_2)_2$—, —COO—, —$CF_2O$—, —$OCF_2$—, —C≡C—, —$CH_2O$— or a single bond.

$L^3$ and $L^4$ are independently hydrogen or fluorine.

Then, o is 0, 1 or 2 and p is 0 or 1. Two of ring $C^2$ may be identical or different when o is 2. A sum of o and p is 0, 1 or 2.

When using component C, content of component C is ordinarily in the range of approximately 0.1 to approximately 99.9% by mass, preferably, in the range of approximately 10 to approximately 97% by mass, further preferably, in the range of approximately 40 to approximately 95% by mass, based on the total mass of the liquid crystal composition. The liquid crystal composition having the content of component C in the range is preferred as a liquid crystal composition for application to the TN mode, the STN mode or the IPS mode.

Component D (Compounds (6) to (11))

The liquid crystal composition of the invention may contain at least one kind of compound (component D) selected from the group of compounds represented by formulas (6) to (11). Component D is suitably used when preparing a liquid crystal composition having a negative value of dielectric anisotropy for application to the VA mode, the PSA mode or the like. Moreover, when component D is mixed into the liquid crystal composition, the elastic constant can be controlled, and a voltage-transmittance curve of the liquid crystal composition can be controlled.

Formula 26

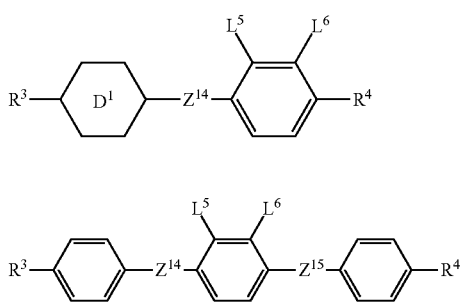

(6)

(7)

(8)

(9)

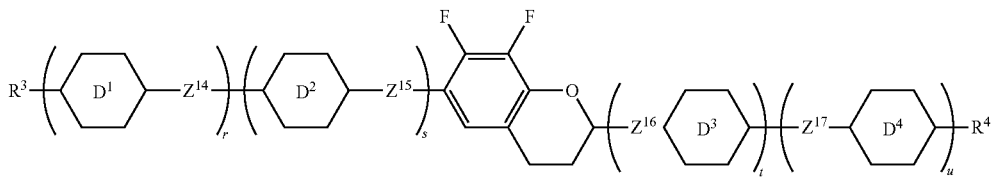

(10)

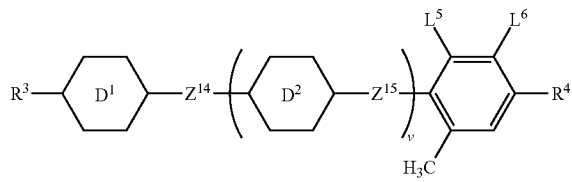

(11)

In formulas (6) to (11), a meaning of each symbol is as described below.

$R^3$ and $R^4$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

Ring $D^1$, ring $D^2$, ring $D^3$ and ring $D^4$ are independently 1,4-cyclohexylene, 1,4-cyclohexenylene, 1,4-phenylene, tetrahydropyran-2,5-diyl, tetrahydropyran-3,6-diyl or decahydro-2,6-naphthalene, and in the 1,4-phenylene, at least one of hydrogen may be replaced by fluorine.

$Z^{14}$, $Z^{15}$, $Z^{16}$ and $Z^{17}$ are independently —$(CH_2)_2$—, —COO—, —$CH_2O$—, —$OCF_2$—, —$OCF_2(CH_2)_2$— or a single bond.

$L^5$ and $L^6$ are independently fluorine or chlorine.

Then, q, r, s, t, u and v are independently 0 or 1.

A sum of r, s, t and u is 1 or 2.

Compound (6) is a bicyclic compound, and therefore effective mainly in adjusting the threshold voltage, the viscosity or the value of optical anisotropy. Compound (7) and compound (8) each are a tricyclic compound, and therefore effective in increasing the maximum temperature, extending the temperature range of the nematic phase, decreasing the threshold voltage, increasing the value of optical anisotropy, or the like. Compounds (9) to (11) each are effective in decreasing the threshold voltage, or the like.

If the content of component D is increased, the threshold voltage of the liquid crystal composition decreases, but the viscosity increases, and therefore the content is preferably decreased, as long as the requirement for the threshold voltage of the liquid crystal composition is met. However, an absolute value of dielectric anisotropy of component D is approximately 5. Accordingly, in order to perform sufficient voltage driving, the content of component D is preferably in the range of approximately 40% by mass or more, further preferably, in the range of approximately 50 to approximately 95% by mass, based on the total mass of the liquid crystal composition. In the case, content of component A is preferably in the range of approximately 2 to approximately 40% by mass based on the total mass of the liquid crystal composition. The liquid crystal composition having the content in the range is preferred as a liquid crystal composition for application to the VA mode or the PSA mode.

On the other hand, when component D is mixed with a liquid crystal composition having a positive value of dielectric anisotropy, the content is preferably in the range of approximately 30% by mass or less, further preferably, in the range of approximately 10% by mass or less, based on the total mass of the liquid crystal composition.

Component E (Compounds (12) to (14))

The liquid crystal composition of the invention may contain at least one kind of compound (component E) selected from the group of compounds represented by formulas (12) to (14). Component E has a small absolute value of dielectric anisotropy, and is close to neutrality. When component E is used, the threshold voltage, the temperature range of the liquid crystal phase, the value of optical anisotropy, the value of dielectric anisotropy, the viscosity or the like can be adjusted.

Formula 27

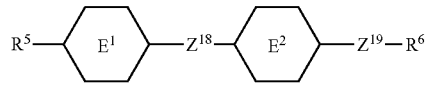

(12)

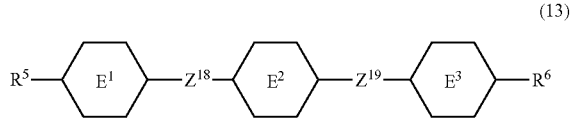

(13)

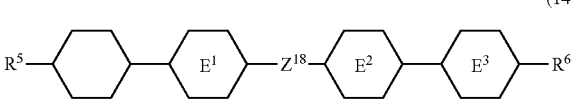

(14)

In formulas (12) to (14), a meaning of each symbol is as described below.

$R^5$ and $R^6$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

Ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene.

$Z^{18}$ and $Z^{19}$ are independently —C≡C—, —COO—, —$(CH_2)_2$—, —CH—CH— or a single bond.

Compound (12) is effective mainly in adjusting the viscosity or the value of optical anisotropy. Compound (13) and compound (14) are effective in extending the temperature range of the nematic phase, such as increasing the maximum temperature, or effective in adjusting the value of optical anisotropy.

If the content of component E is increased, the viscosity decreases, but the threshold voltage of the liquid crystal composition increases, and therefore the content is preferably increased, as long as the requirement for the threshold voltage of the liquid crystal composition is met.

When preparing a liquid crystal composition for application to the MVA mode or the PSA mode, the content of component E is preferably in the range of approximately 30% by mass or more, further preferably, in the range of approximately 50% by mass or more, based on the total mass of the liquid crystal composition. When preparing a liquid crystal composition for application to the TN, the STN mode or the IPS mode, the content of component E is preferably in the range of approximately 30% by mass or more, further preferably, in the range of approximately 40% by mass or more, based on the total mass of the liquid crystal composition. In the cases, the content of component A is preferably in the range of approximately 1 to approximately 40% by mass based on the total mass of the liquid crystal composition.

Description of Specific Examples of Component B to Component E

Among types of component B, specific examples of suitable compounds represented by formula (2) include compounds represented by formulas (2-1) to (2-16), specific examples of suitable compounds represented by formula (3) include compounds represented by formulas (3-1) to (3-112), and specific examples of suitable compounds represented by formula (4) include compounds represented by formulas (4-1) to (4-54).

Formula 28

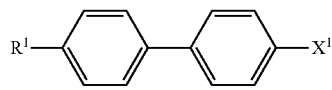 (2-1)

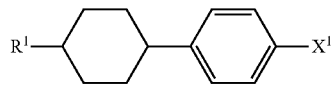 (2-2)

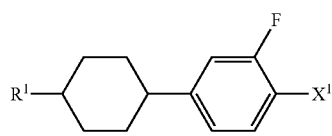 (2-3)

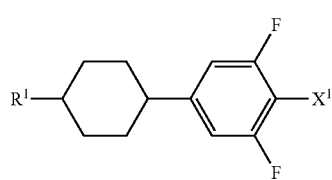 (2-4)

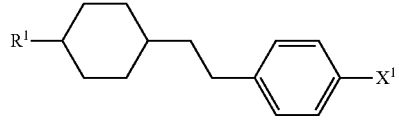 (2-5)

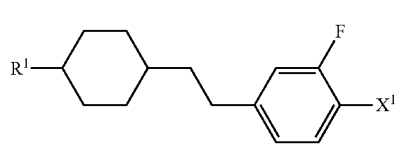 (2-6)

-continued

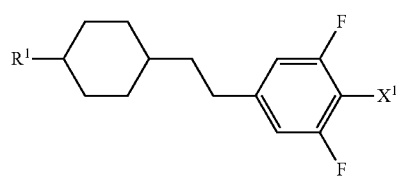 (2-7)

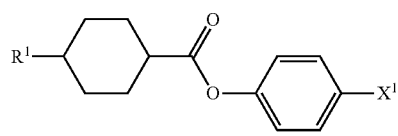 (2-8)

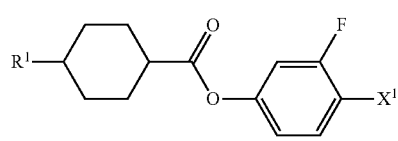 (2-9)

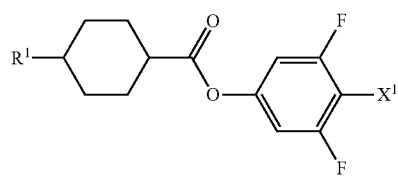 (2-10)

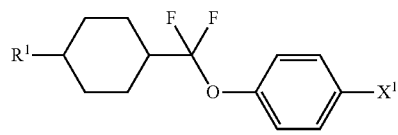 (2-11)

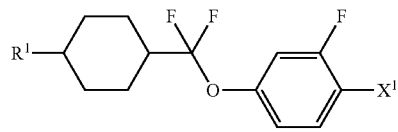 (2-12)

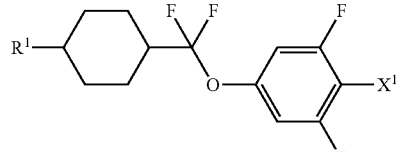 (2-13)

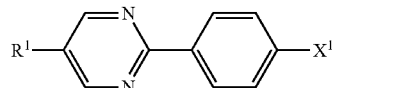 (2-14)

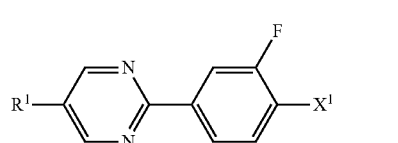 (2-15)

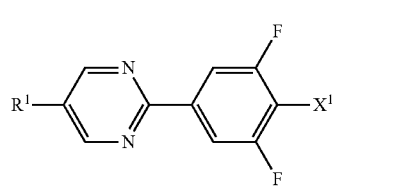 (2-16)

Formula 29
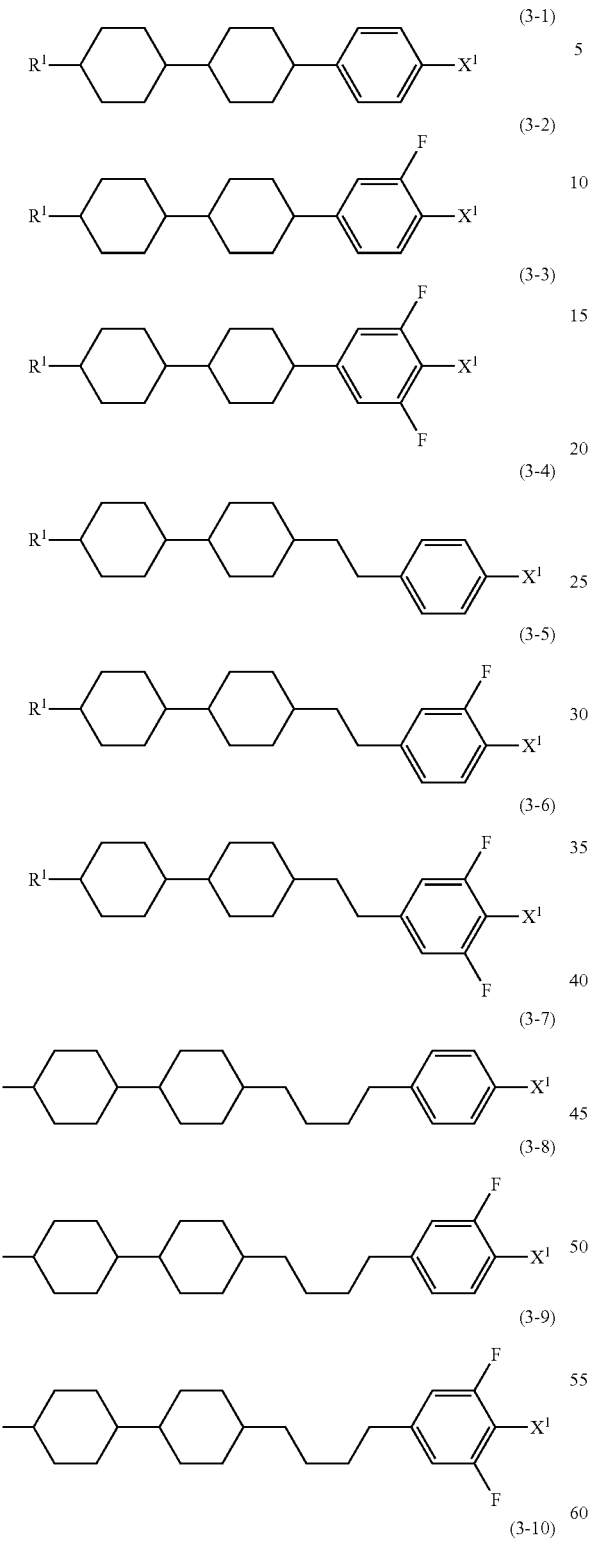
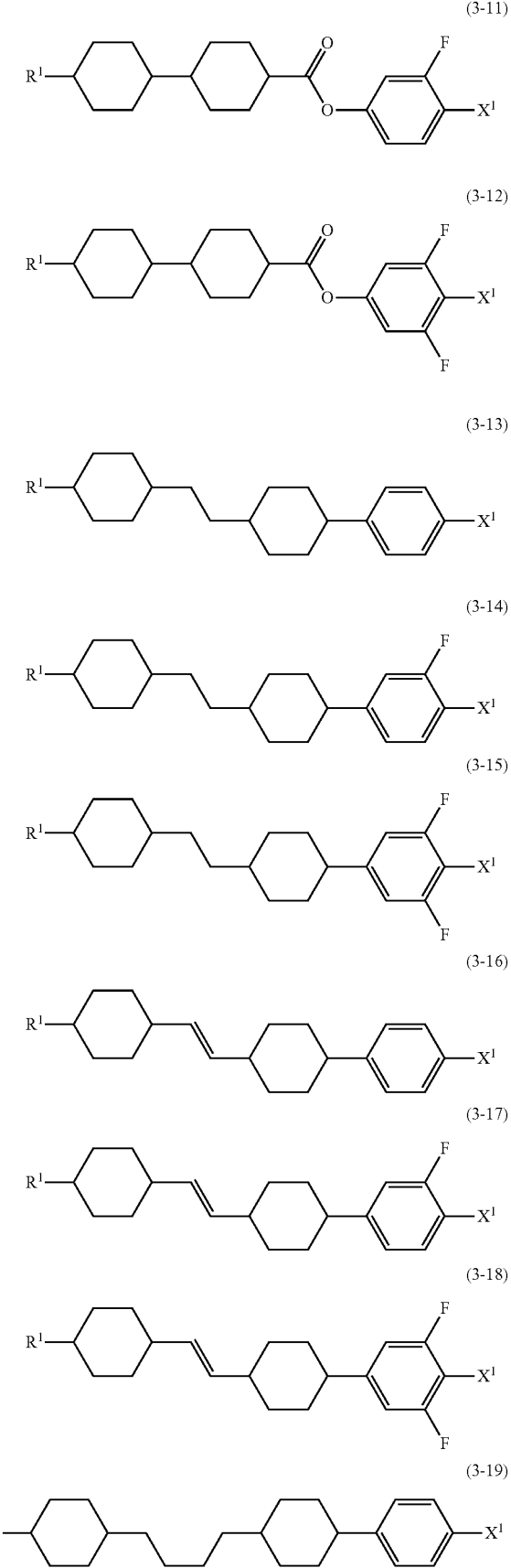

(3-20)
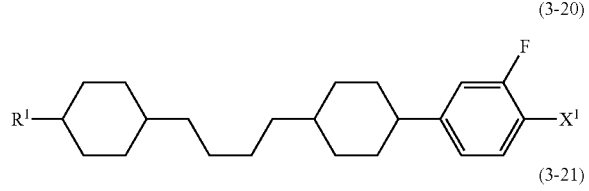
(3-21)
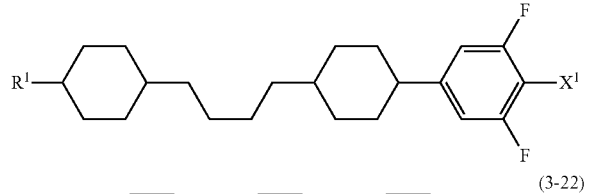
(3-22)
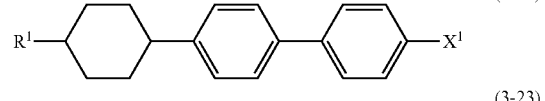
(3-23)
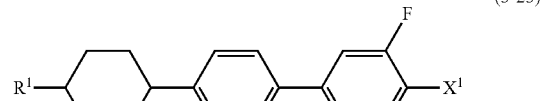
(3-24)
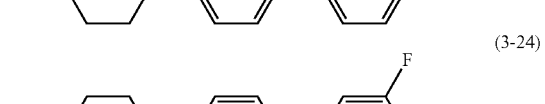
Formula 30
(3-25)
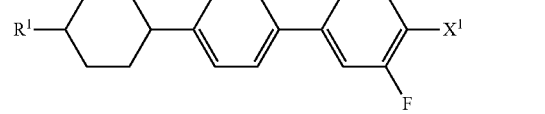
(3-26)
(3-27)
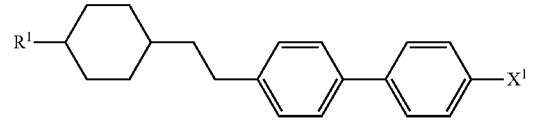
(3-28)
(3-29)
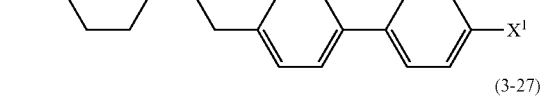
(3-30)
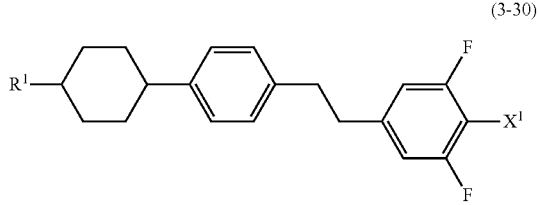
(3-31)
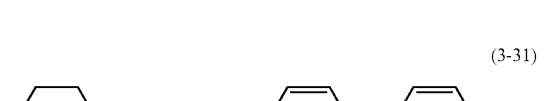
(3-32)
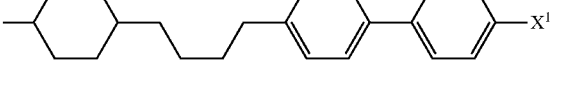
(3-33)
(3-34)
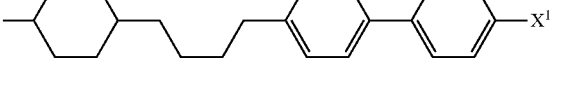
(3-35)
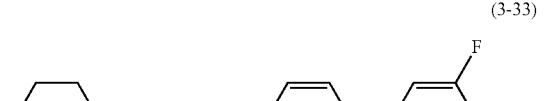
(3-36)
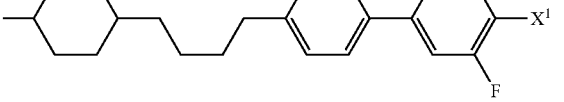
(3-37)
(3-38)
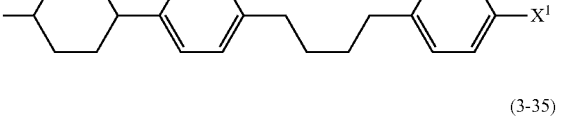

(3-39) 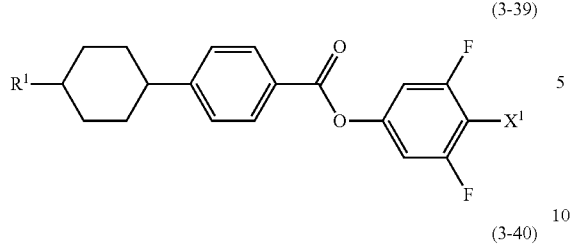
(3-40) 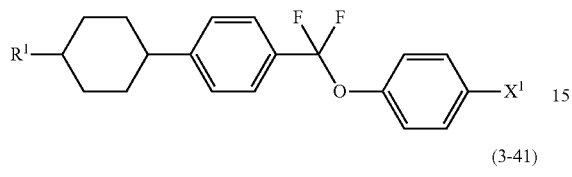
(3-41) 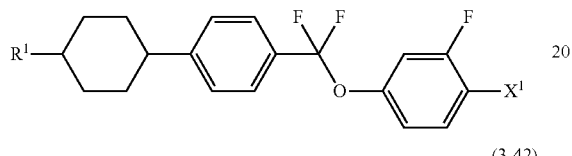
(3-42) 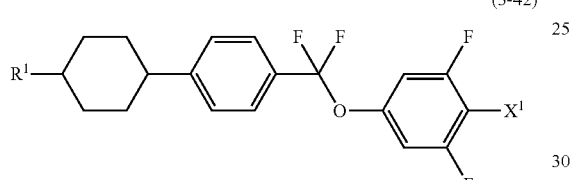
(3-43) 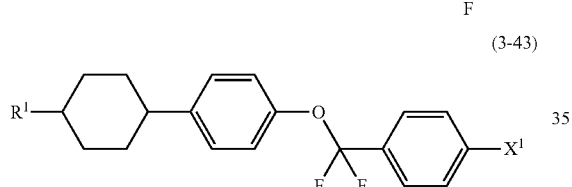
(3-44) 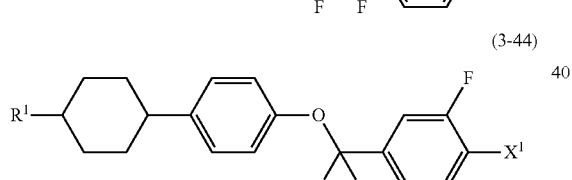
(3-45) 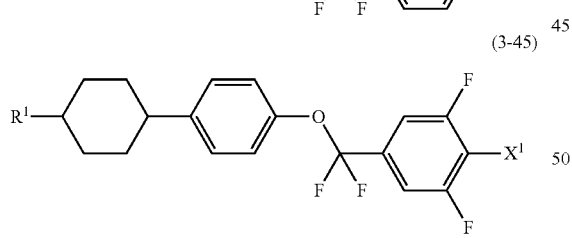
(3-46) 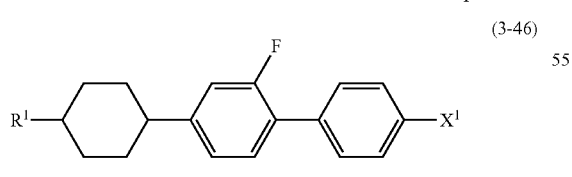
(3-47) 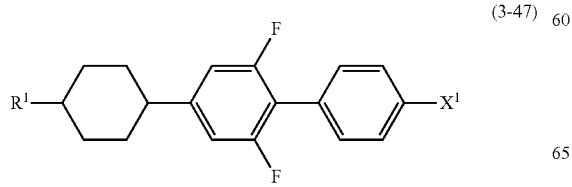
(3-48) 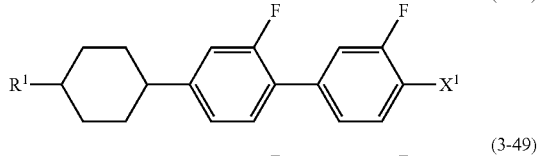
(3-49) 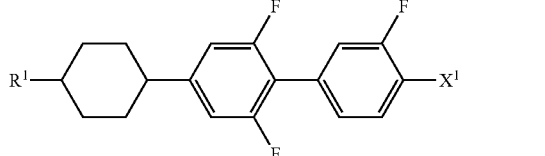
(3-50) 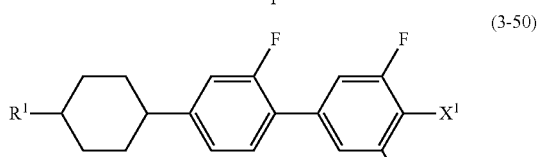
(3-51) 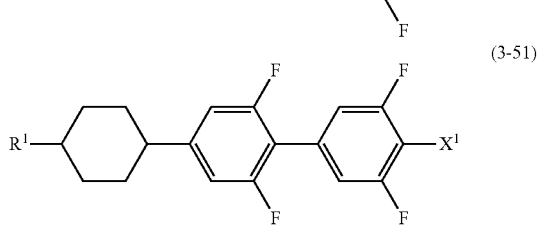
Formula 31
(3-52) 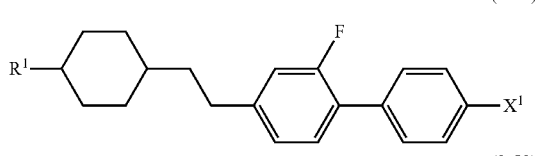
(3-53) 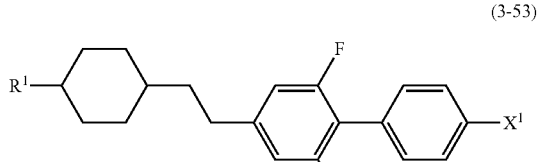
(3-54) 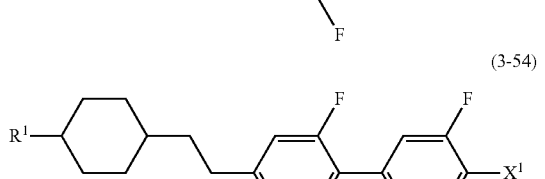
(3-55) 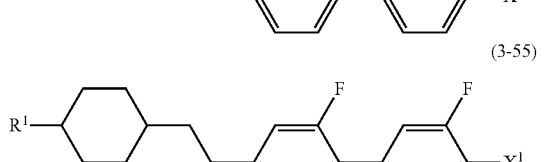
(3-56) 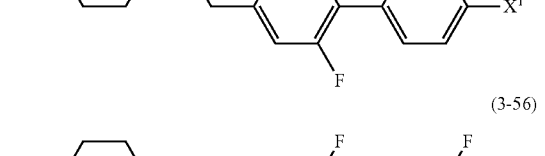
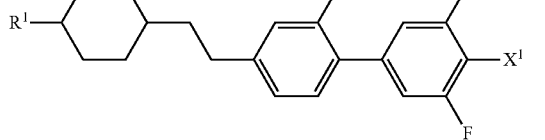

(3-57) 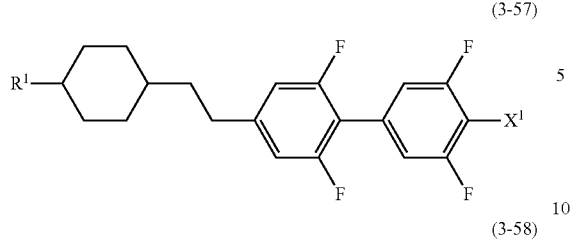
(3-58) 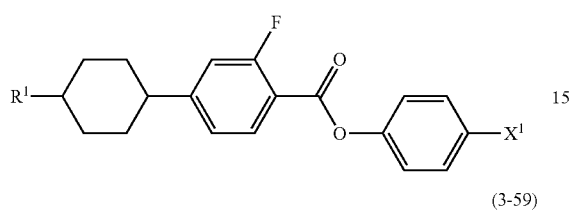
(3-59) 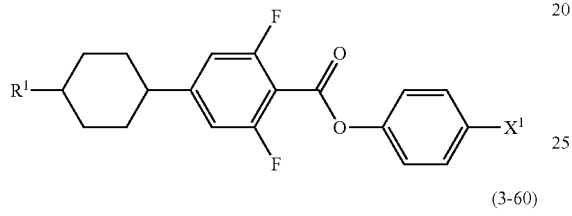
(3-60) 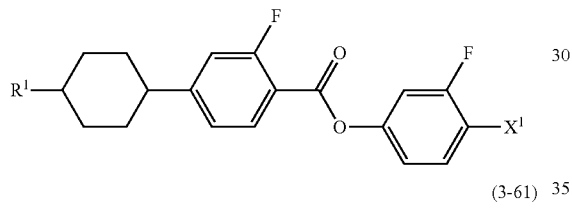
(3-61) 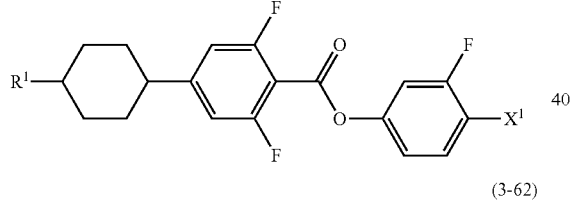
(3-62) 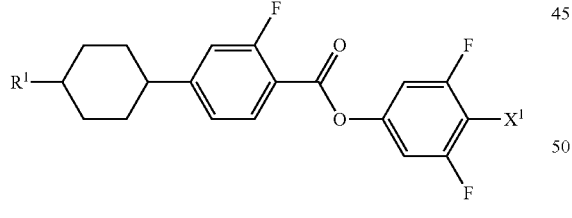
(3-63) 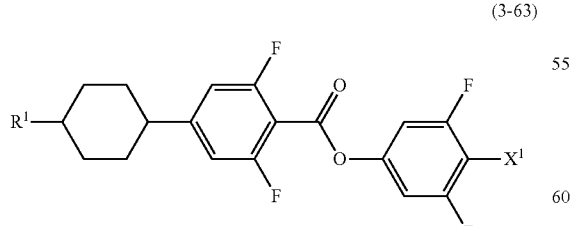
(3-64) 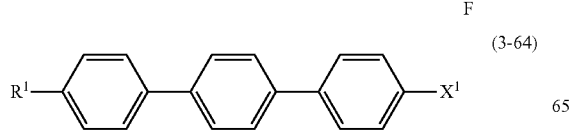
(3-65) 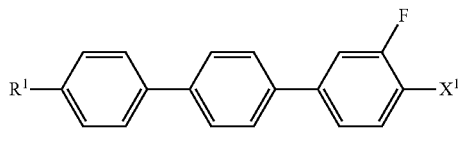
(3-66) 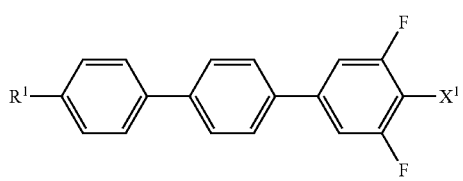
(3-67) 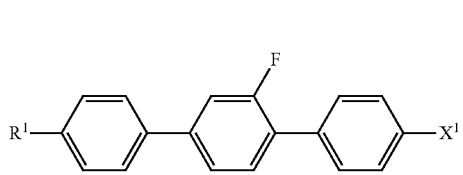
(3-68) 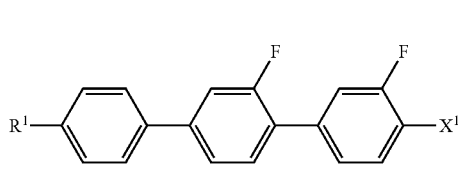
(3-69) 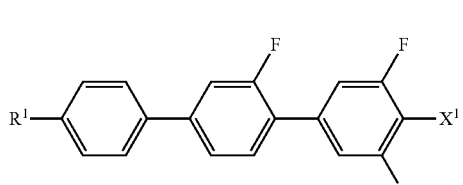
(3-70) 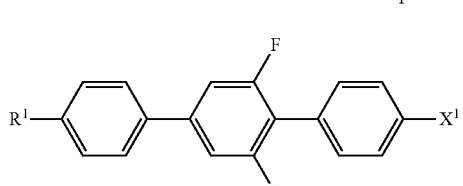
(3-71) 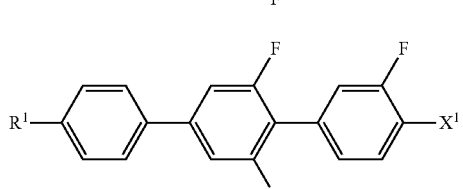
(3-72) 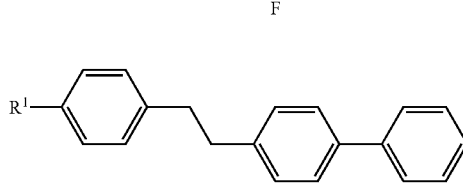
(3-73) 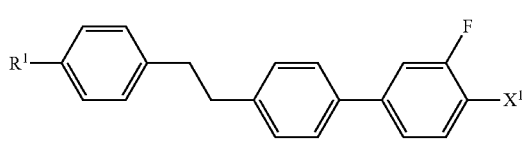

(3-74)
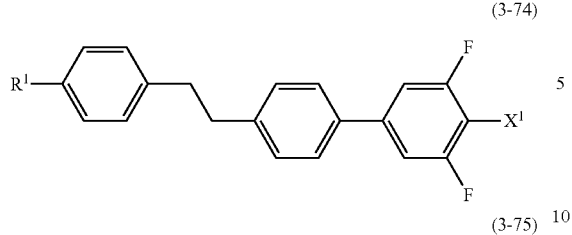
(3-75)
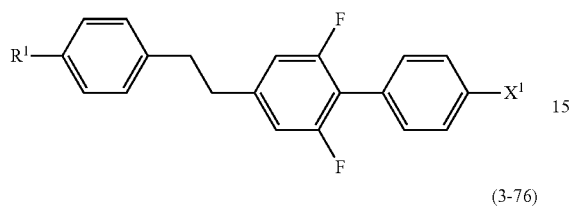
(3-76)
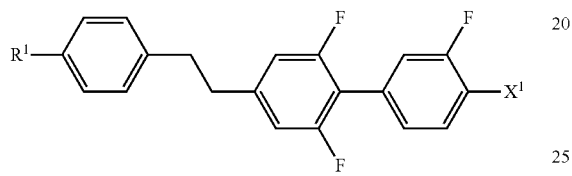
Formula 32
(3-77)
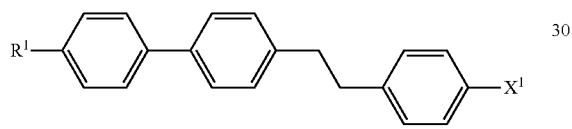
(3-78)
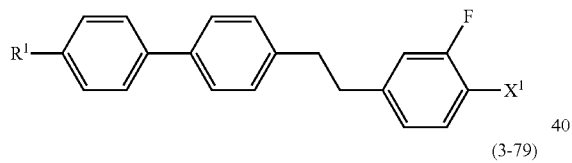
(3-79)
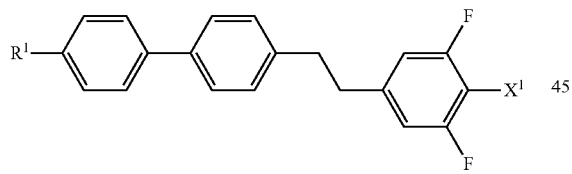
(3-80)
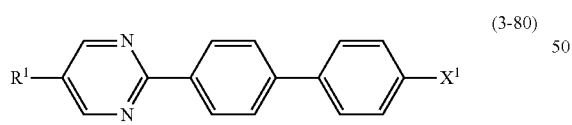
(3-81)
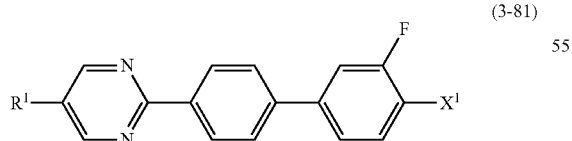
(3-82)
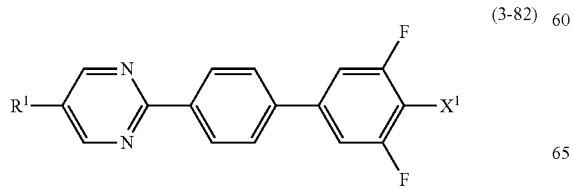
(3-83)
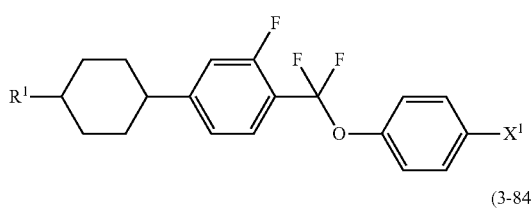
(3-84)
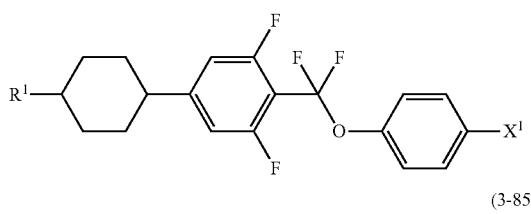
(3-85)
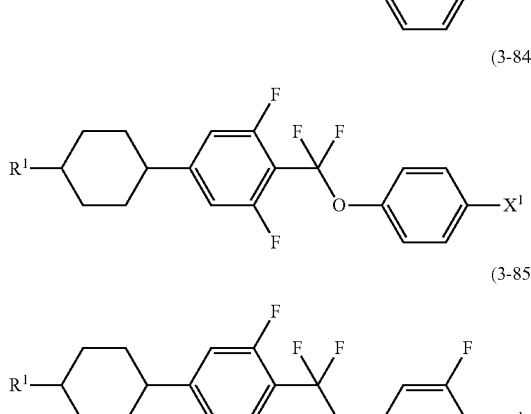
(3-86)
(3-87)
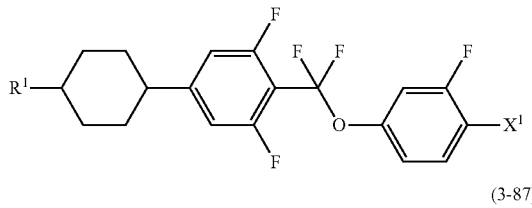
(3-88)
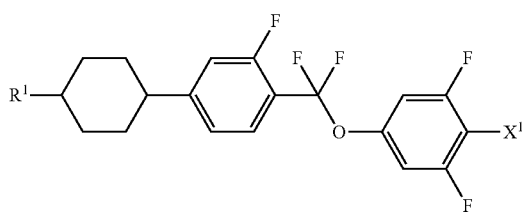
(3-89)
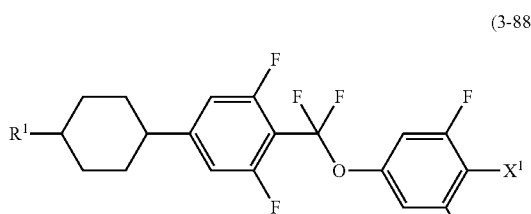
(3-90)
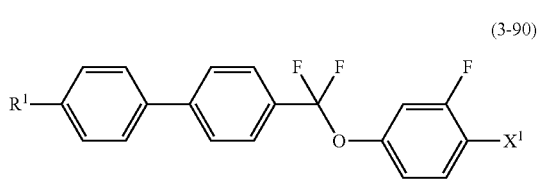

-continued (3-91) through (3-108): chemical structure diagrams

Formula 33

(3-109)
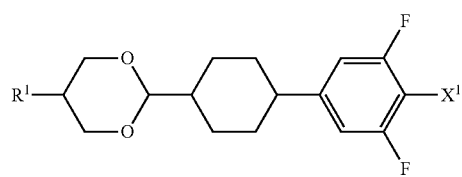
(3-110)
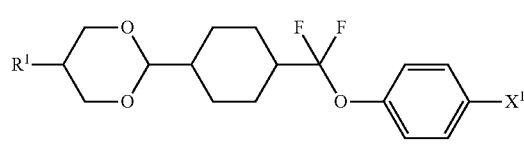
(3-111)
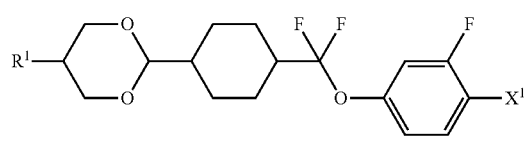
(3-112)
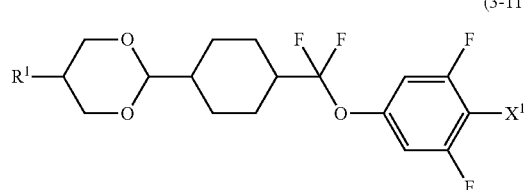
Formula 34
(4-1)
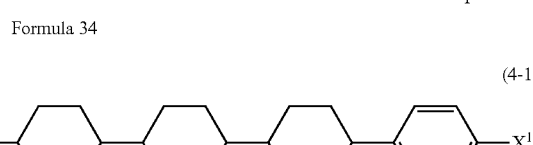
(4-2)
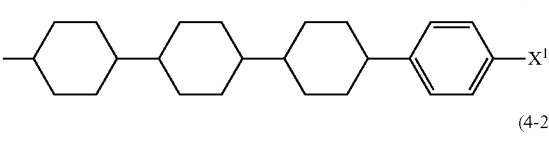
(4-3)
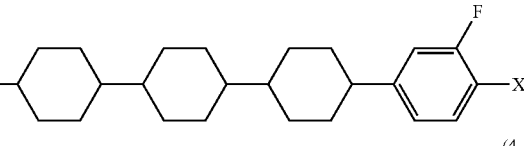
(4-4)
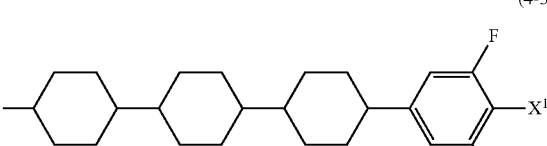
(4-5)
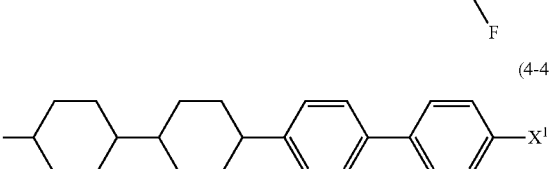
(4-6)
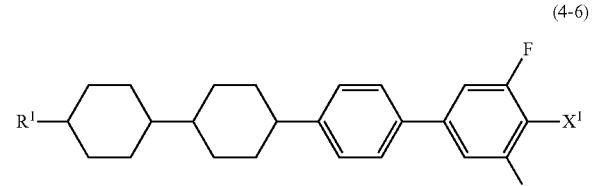
(4-7)
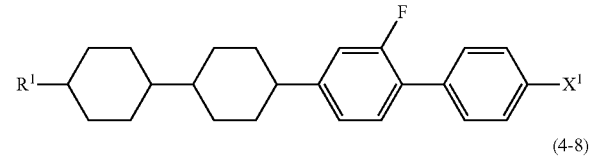
(4-8)
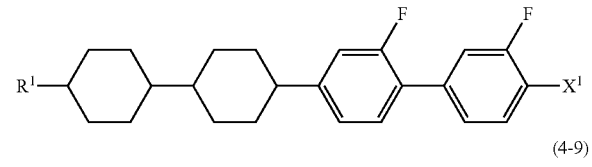
(4-9)
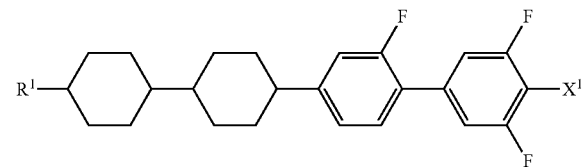
(4-10)
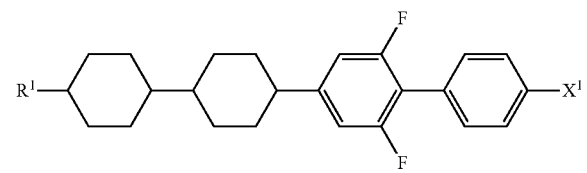
(4-11)
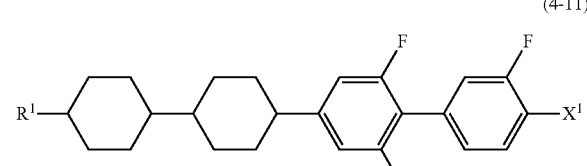
(4-12)
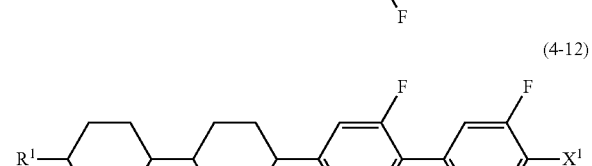
(4-13)
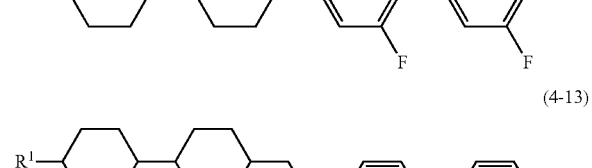
(4-14)
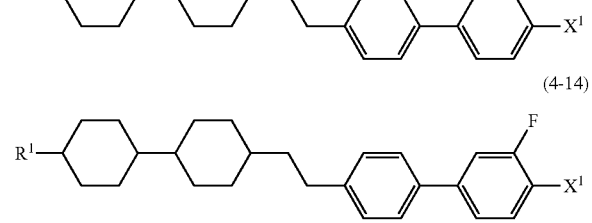

(4-15) 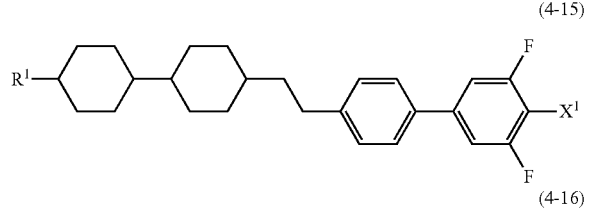
(4-16) 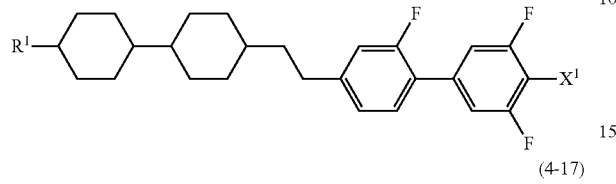
(4-17) 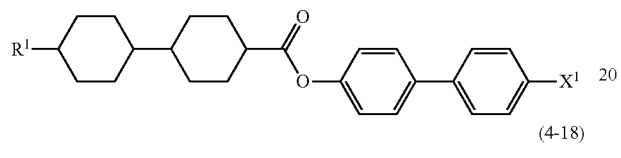
(4-18) 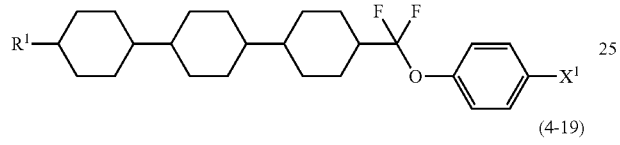
(4-19) 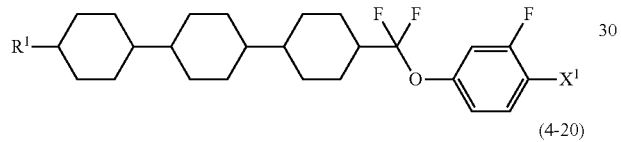
(4-20) 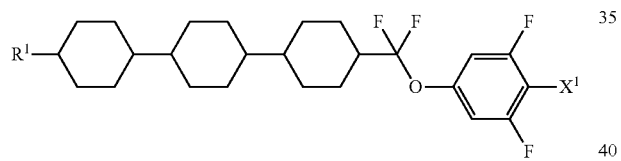
(4-21) 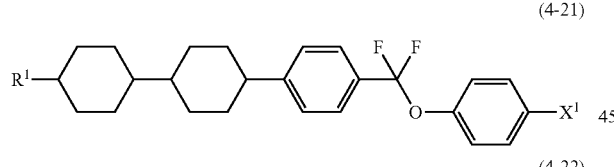
(4-22) 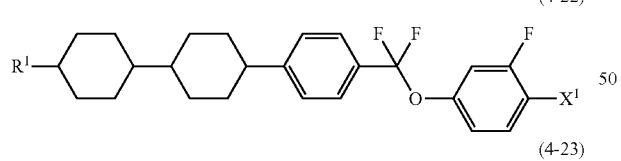
(4-23) 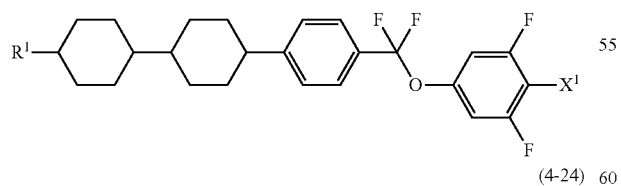
(4-24) 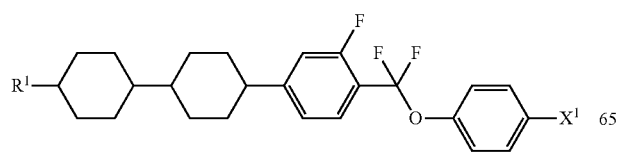
(4-25) 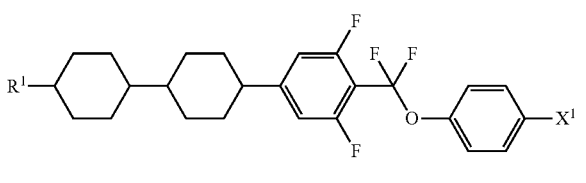
(4-26) 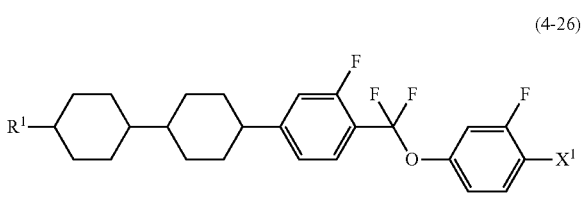
(4-27) 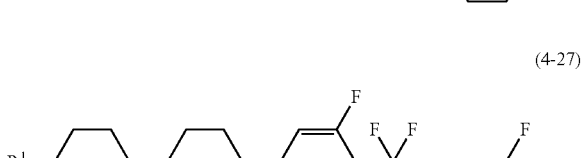
(4-28) 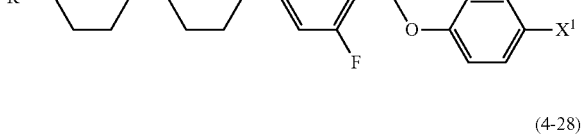
(4-29) 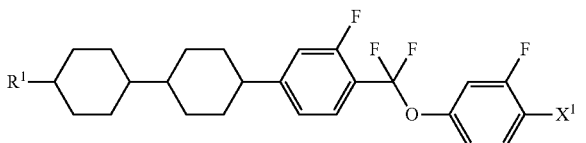
Formula 35
(4-30) 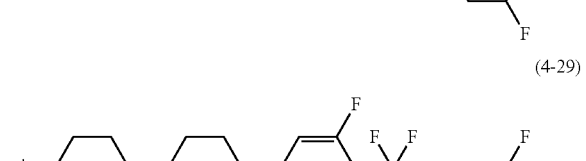
(4-31) 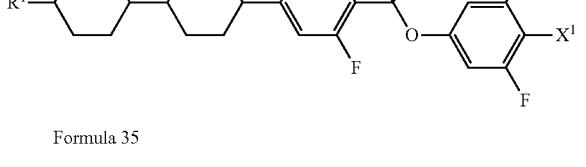
(4-32) 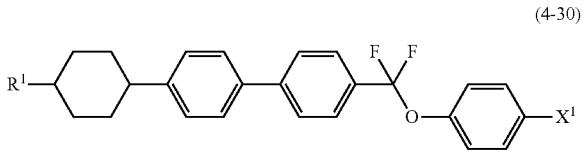

-continued (4-33) through (4-48): chemical structure diagrams of liquid crystal compounds containing R¹ and X¹ substituents with various fluorinated biphenyl/terphenyl/cyclohexyl moieties linked via -CF₂-O- groups.

(4-49)
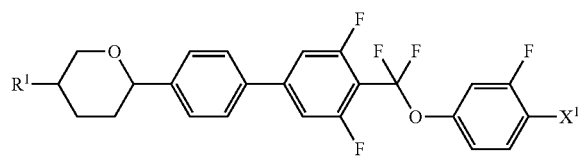
(4-50)
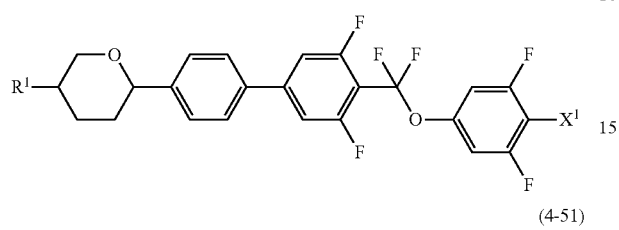
(4-51)
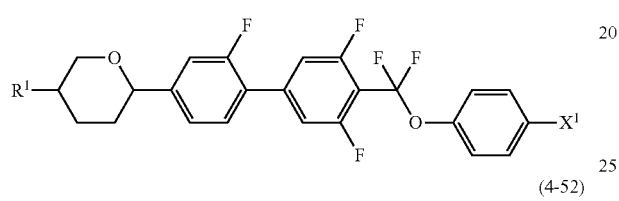
(4-52)
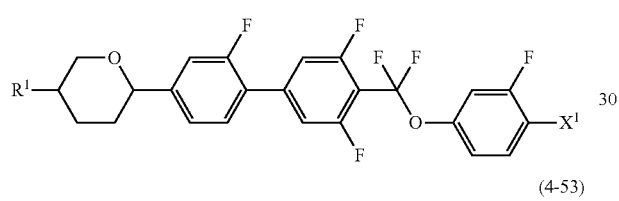
(4-53)
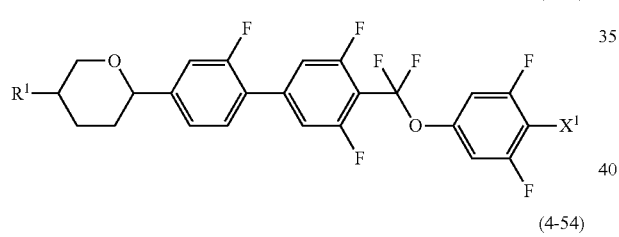
(4-54)
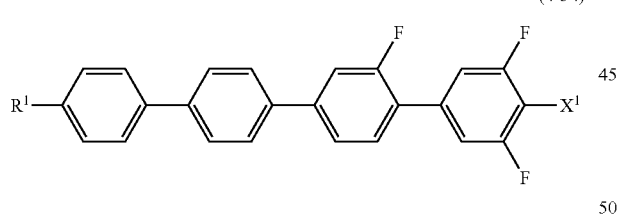
In the formulas, $R^1$ and $X^1$ are defined in a manner identical with the definitions of $R^1$ and $X^1$ in formulas (2) to (4).
Among types of component C, specific examples of suitable compounds represented by formula (5) include compounds represented by formulas (5-1) to (5-64).
Formula 36
(5-1)
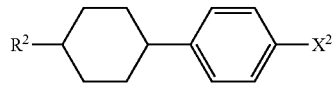
(5-2)
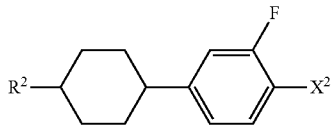
(5-3)
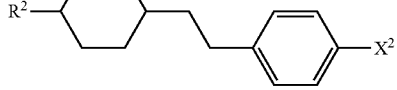
(5-4)
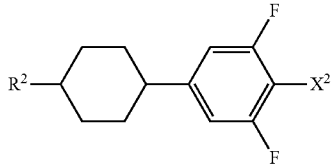
(5-5)
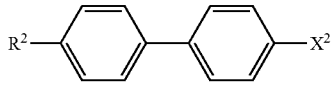
(5-6)
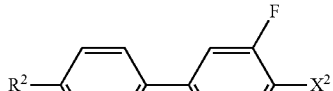
(5-7)
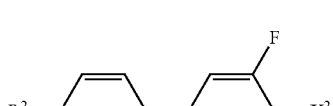
(5-8)
(5-9)
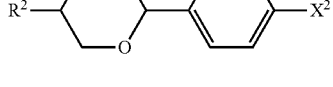
(5-10)
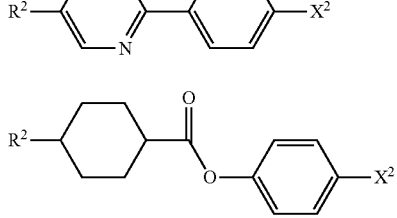
(5-11)
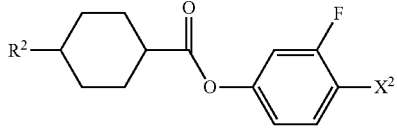
(5-12)
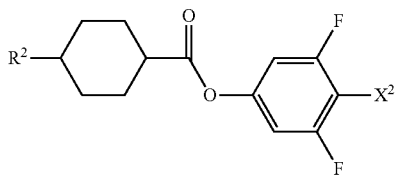

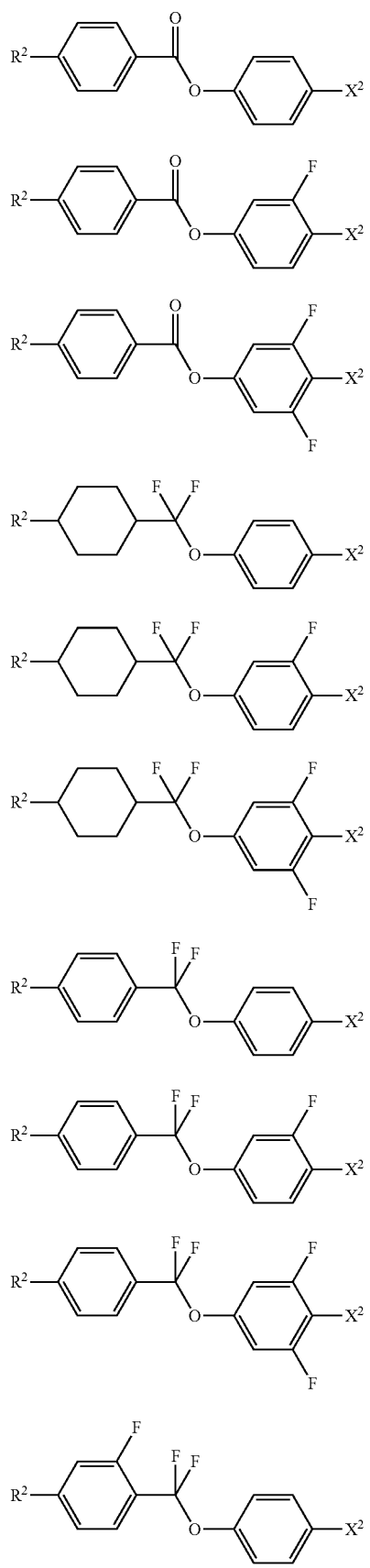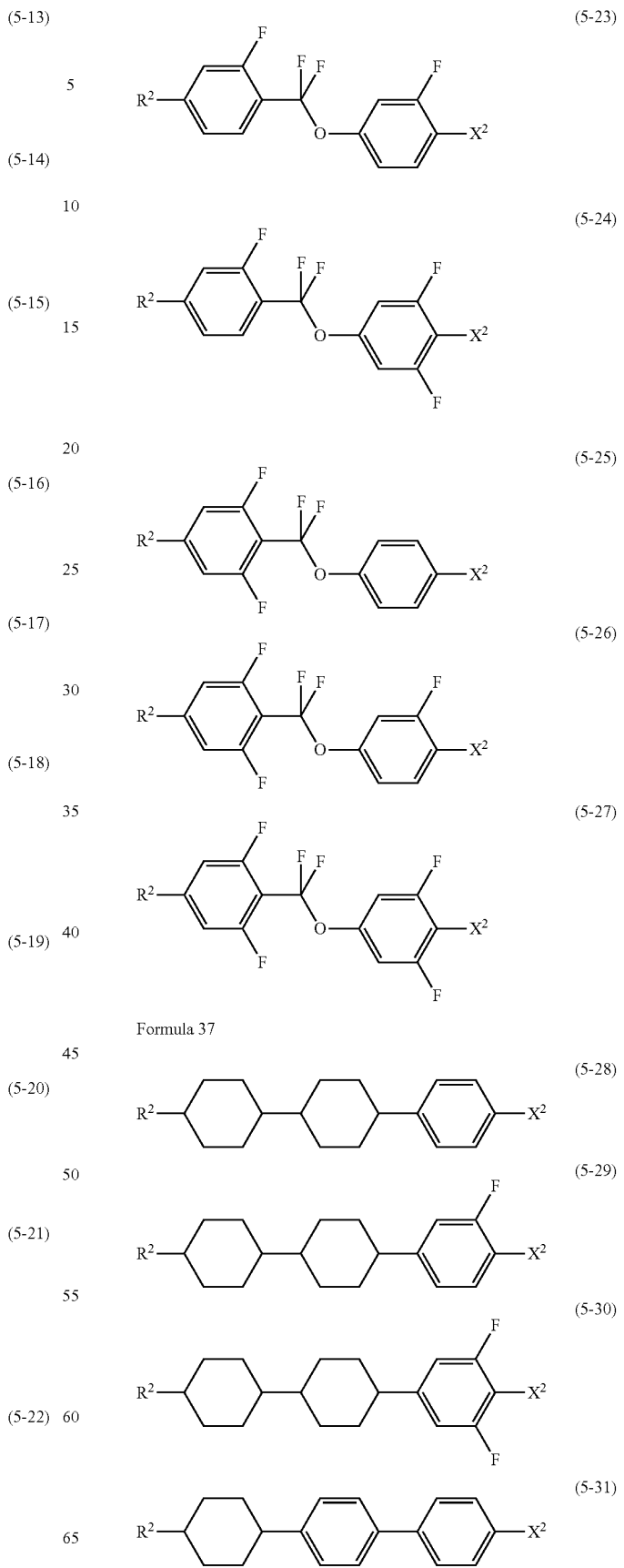
Formula 37

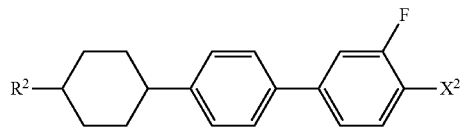 (5-32)
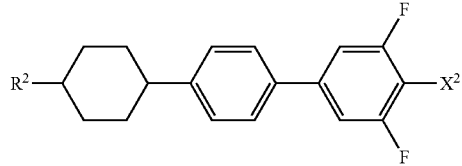 (5-33)
 (5-34)
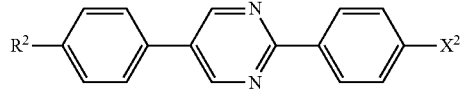 (5-35)
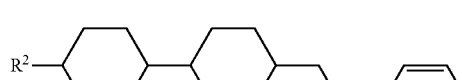 (5-36)
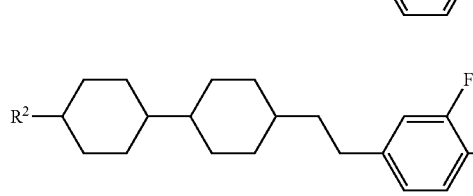 (5-37)
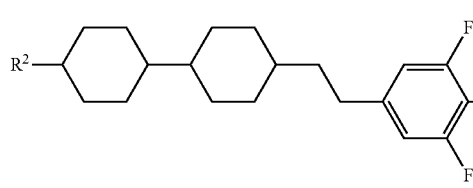 (5-38)
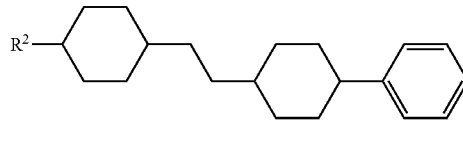 (5-39)
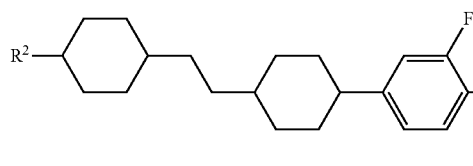 (5-40)
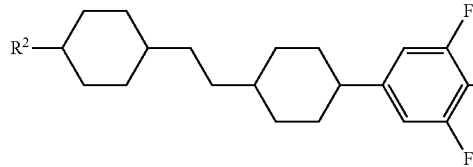 (5-41)
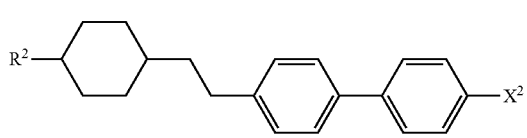 (5-42)
 (5-43)
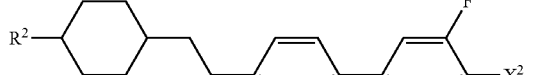 (5-44)
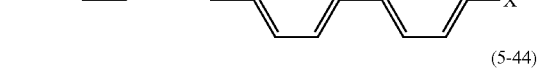 (5-45)
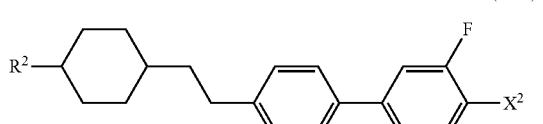 (5-46)
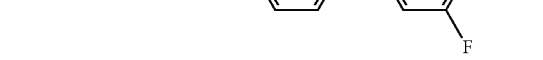 (5-47)
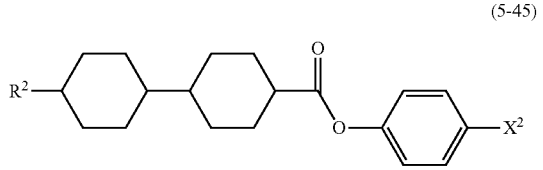 (5-48)
 (5-49)
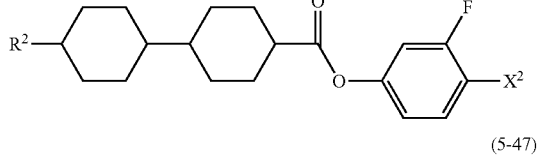 (5-50)
Formula 38

(5-51)
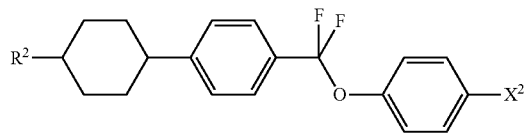
(5-52)
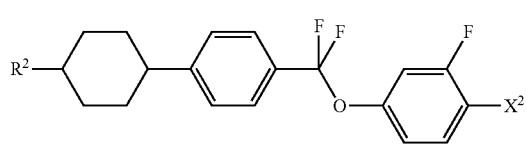
(5-53)
(5-54)
(5-55)
(5-56)
(5-57)
(5-58)
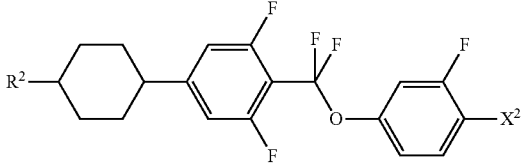
(5-59)
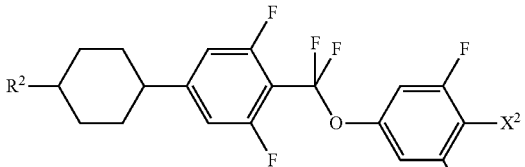
(5-60)
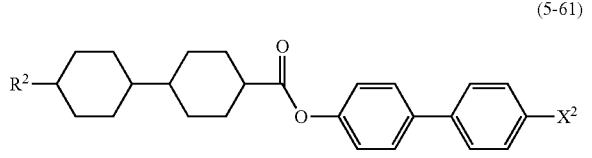
(5-61)
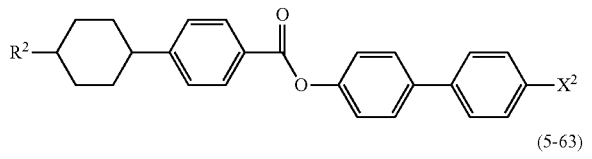
(5-62)
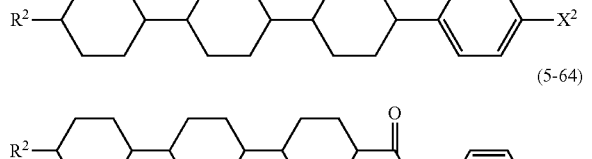
(5-63)
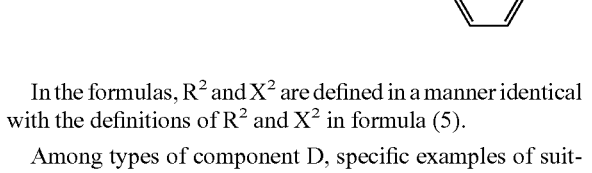
(5-64)
In the formulas, $R^2$ and $X^2$ are defined in a manner identical with the definitions of $R^2$ and $X^2$ in formula (5).
Among types of component D, specific examples of suitable compounds represented by formulas (6) to (11) include compounds represented by formulas (6-1) to (6-6), formulas (7-1) to (7-15), formula (8-1), formulas (9-1) to (9-3), formulas (10-1) to (10-11) and formulas (11-1) to (11-10), respectively.
Formula 39
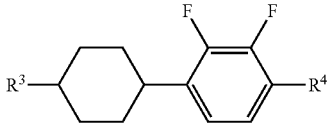
(6-1)
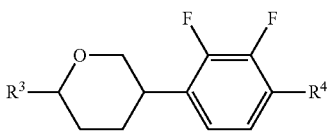
(6-2)

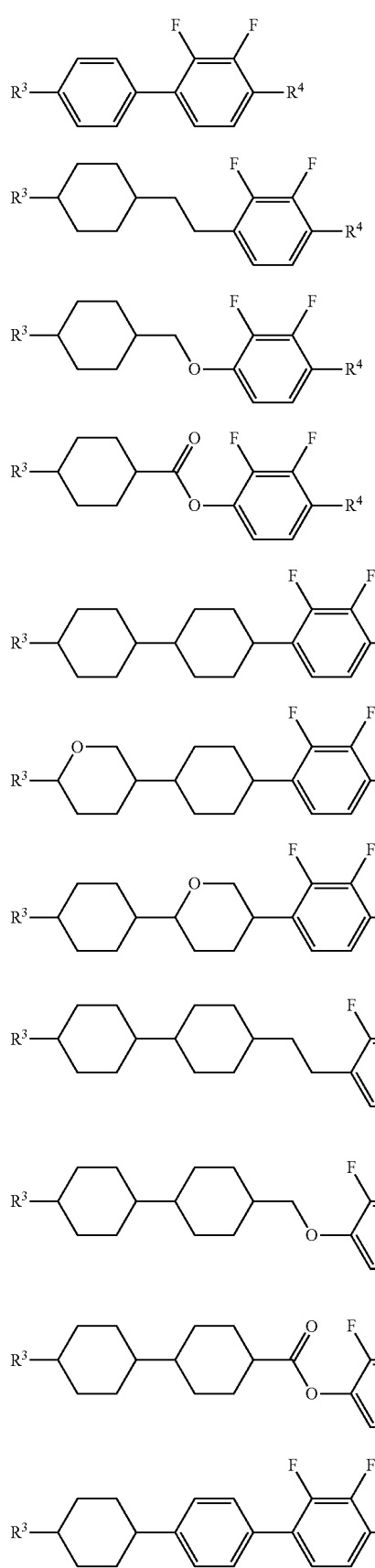
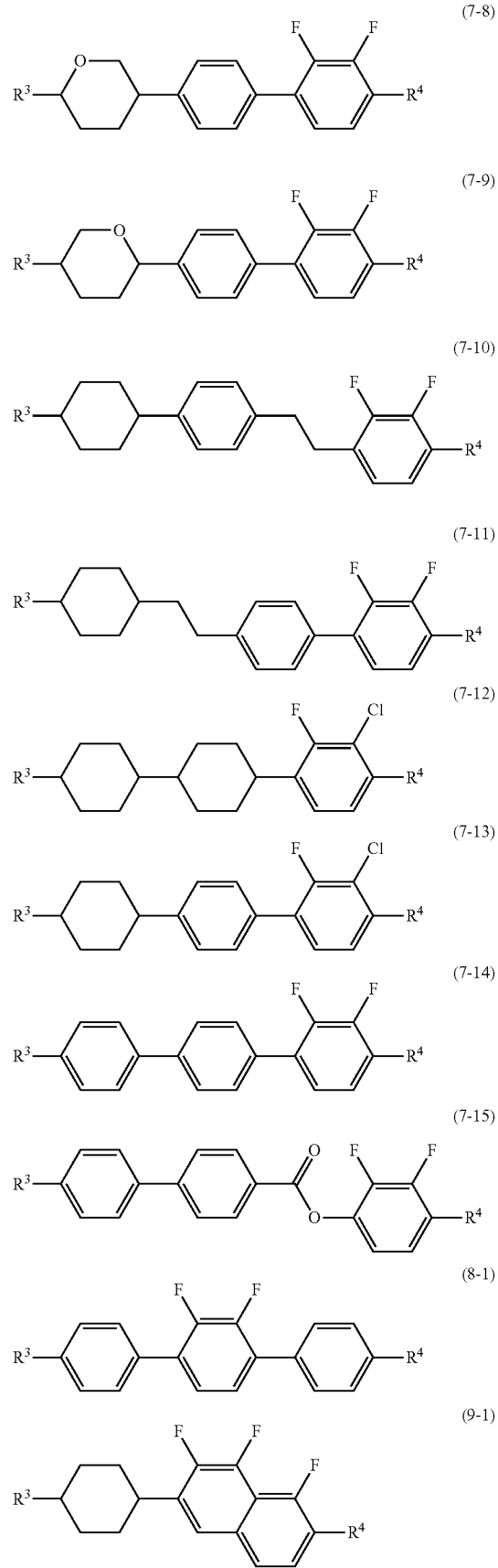

(9-2)
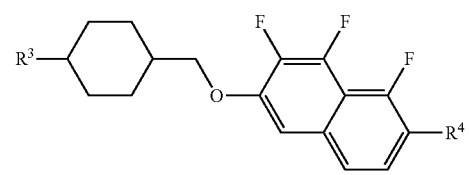
(9-3)
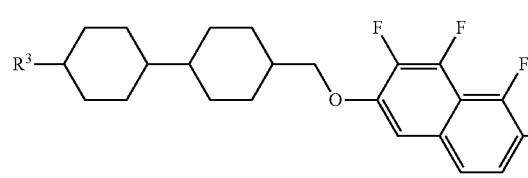
(10-1)
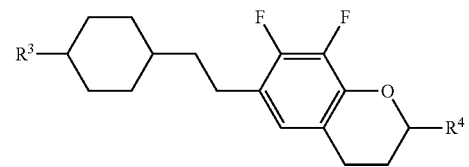
(10-2)
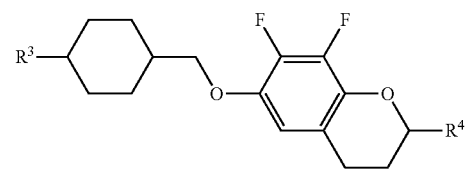
(10-3)
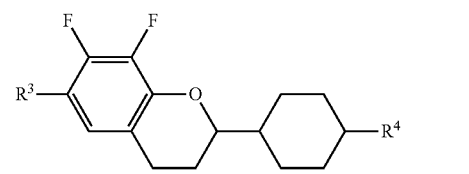
(10-4)
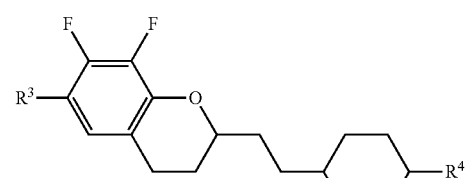
Formula 40
(10-5)
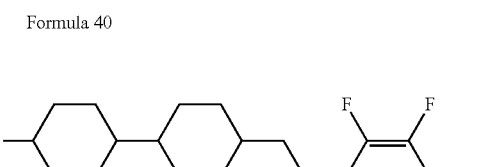
(10-6)
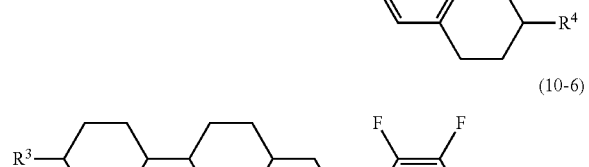
(10-7)
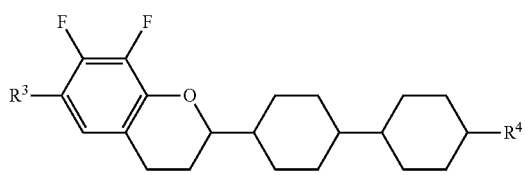
(10-8)
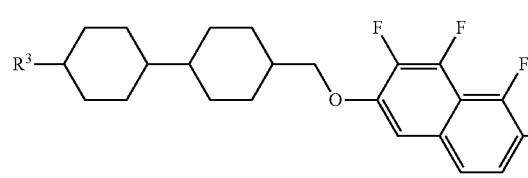
(10-9)
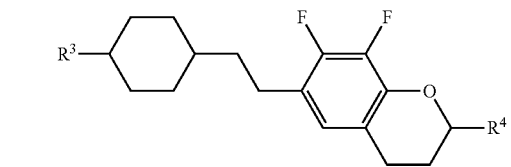
(10-10)
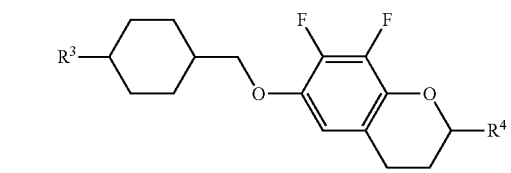
(10-11)
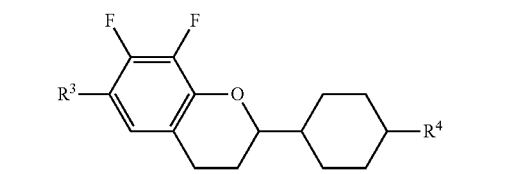
(11-1)
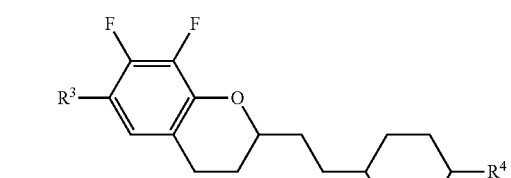
(11-2)
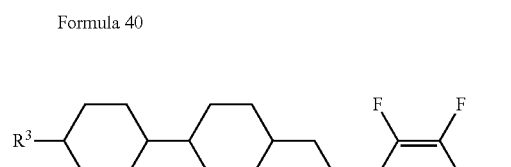
(11-3)
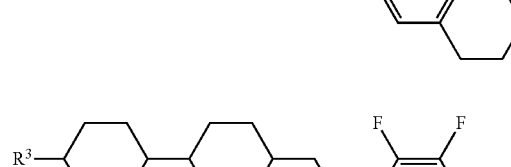

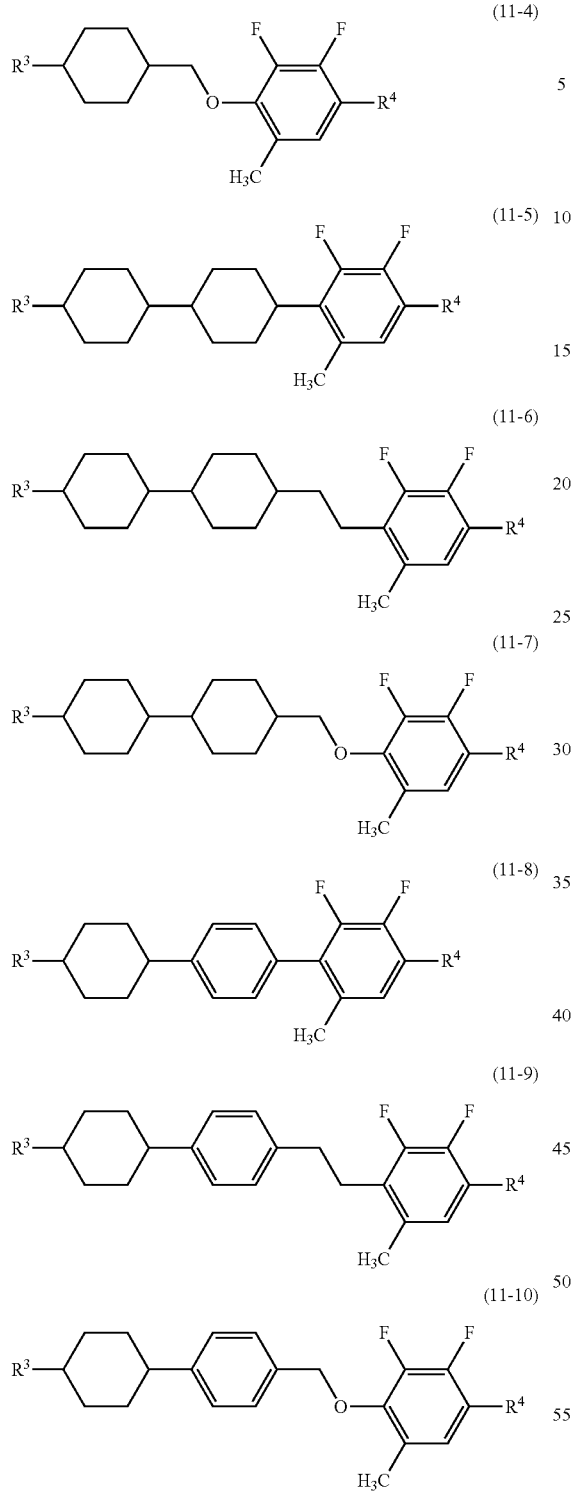
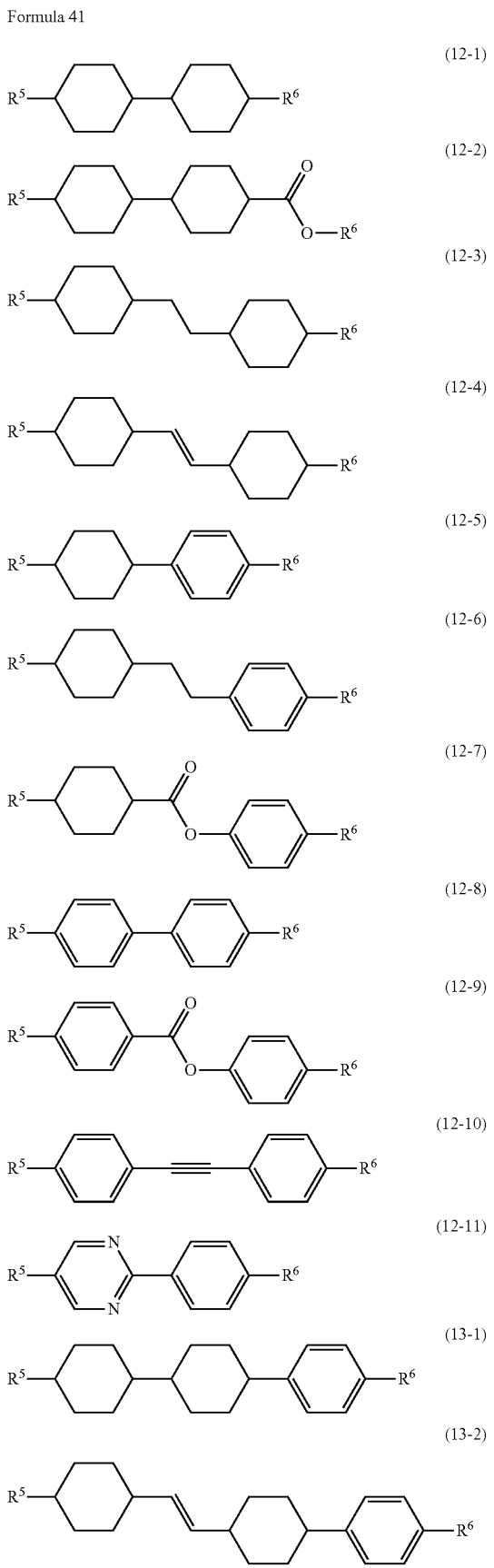
In the formulas, $R^3$ and $R^4$ are defined in a manner identical with the definitions of $R^3$ and $R^4$ in formulas (6) to (11).
Among types of component E, specific examples of suitable compounds represented by formulas (12) to (14) include compounds represented by formulas (12-1) to (12-11), formulas (13-1) to (13-19) and formulas (14-1) to (14-6), respectively.

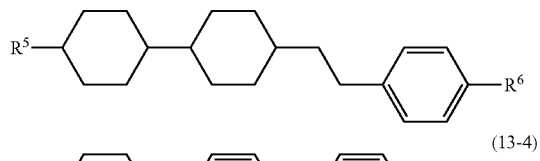 (13-3)
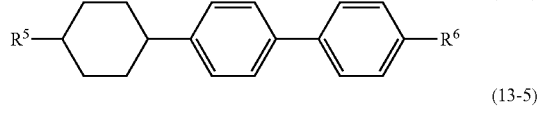 (13-4)
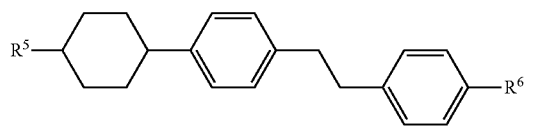 (13-5)
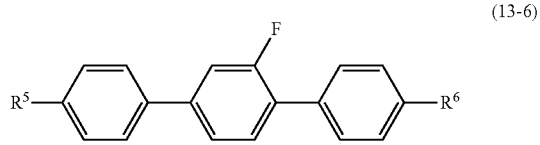 (13-6)
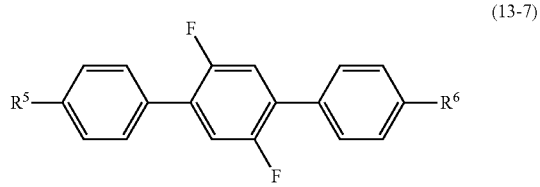 (13-7)
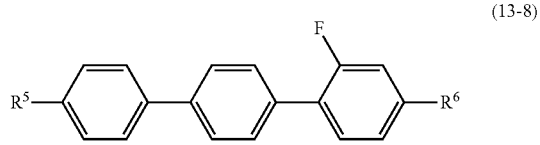 (13-8)
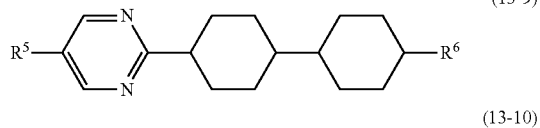 (13-9)
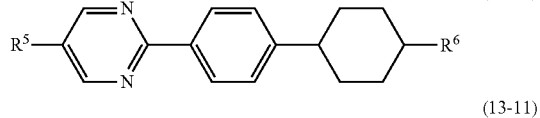 (13-10)
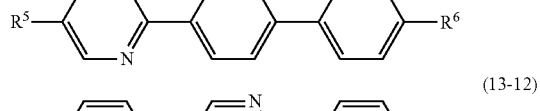 (13-11)
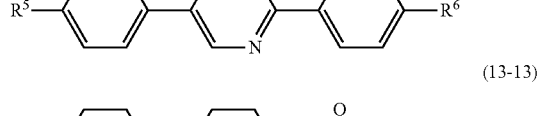 (13-12)
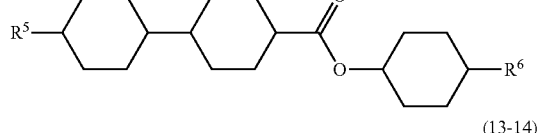 (13-13)
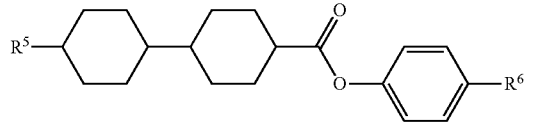 (13-14)
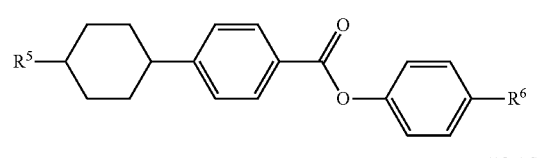 (13-15)
 (13-16)
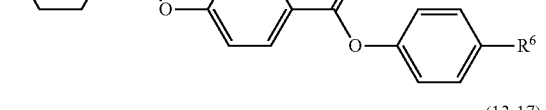 (13-17)
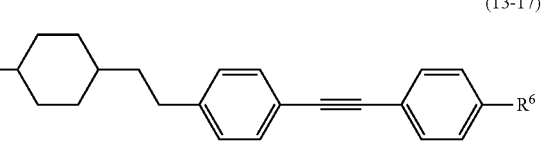 (13-18)
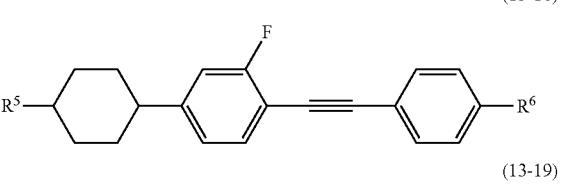 (13-19)
Formula 42
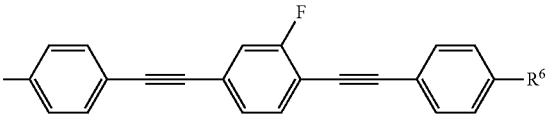 (14-1)
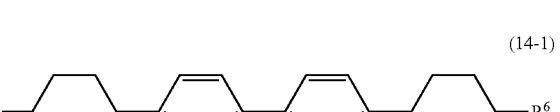 (14-2)
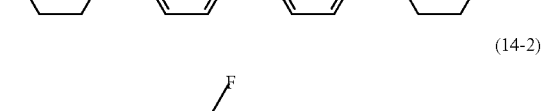 (14-3)
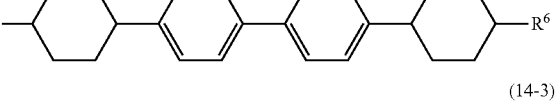 (14-4)
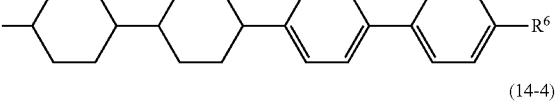 (14-5)

67

-continued

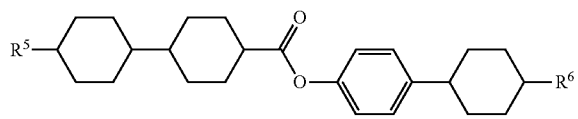
(14-6)

In the formulas, $R^5$ and $R^6$ are defined in a manner identical with the definitions of $R^5$ and $R^6$ in formulas (12) to (14).

68

Optically Active Compound

The liquid crystal composition of the invention may contain one kind of optically active compound, or two or more kinds of optically active compounds. Specific examples of the optically active compounds include a publicly known chiral dopant. The chiral dopant is effective in inducing a helical structure of liquid crystals to adjust a required twist angle, and preventing an inverted twist, or the like. Specific examples of the chiral dopants include optically active compounds represented by formulas (Op-1) to (Op-13).

Formula 43

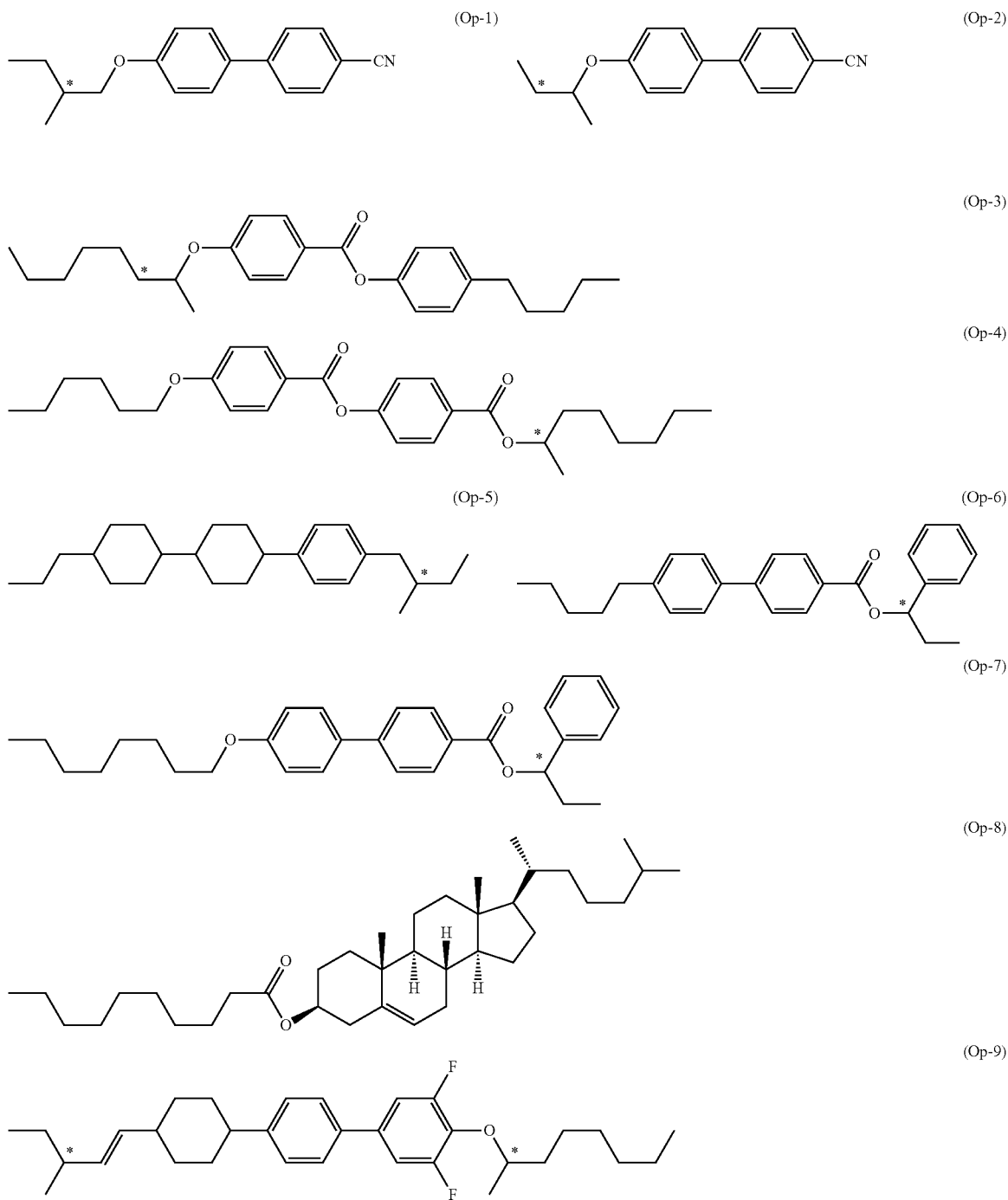

-continued

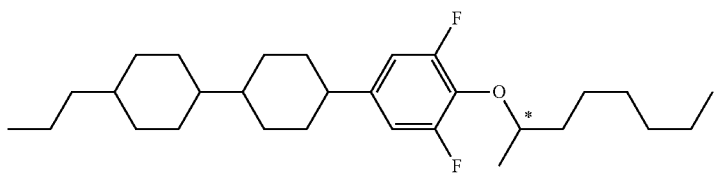
(Op-10)

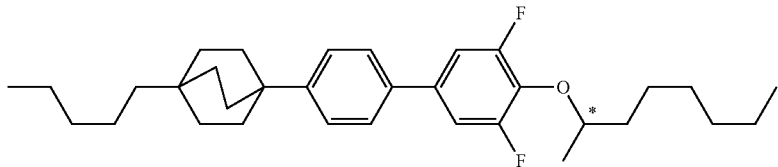
(Op-11)

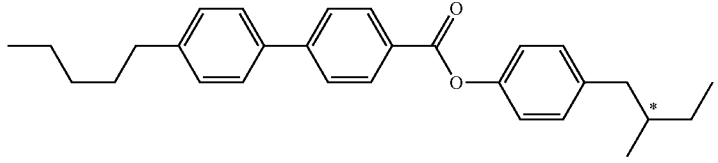
(Op-12)

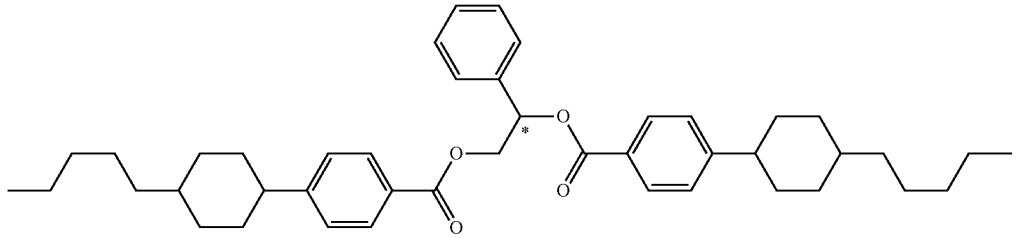
(Op-13)

When the optically active compound is added to the liquid crystal composition of the invention, a helical pitch can be adjusted. The helical pitch is preferably adjusted to the range of approximately 40 to approximately 200 micrometers for a liquid crystal composition for application to the TFT mode and the TN mode; in the range of approximately 6 to approximately 20 micrometers for a liquid crystal composition for application to the STN mode; and in the range of approximately 1.5 to approximately 4 micrometers for a liquid crystal composition for application to the BTN mode. Moreover, two or more kinds of optically active compounds may be added for the purpose of adjusting temperature dependence of the pitch.

Polymerizable Compound

The liquid crystal composition of the invention can also be used as a liquid crystal composition for application to the PSA mode by adding one kind of polymerizable compound, or two or more kinds of polymerizable compounds (however, excluding a compound corresponding to component A to component E as described above). Moreover, when adding the polymerizable compound, a polymerization initiator is preferably used. In the cases, content of the polymerizable compound is preferably in the range of approximately 0.1 to approximately 2% by mass based on the total mass of the liquid crystal composition.

Specific examples of the polymerizable compounds include a compound having a polymerizable group such as acryloyl, methacryloyl, vinyl, vinyloxy, propenyl ether, vinyl ketone, oxiranyl and oxetanyl. The polymerizable compound is preferably polymerized by irradiation with ultraviolet light or the like in the presence of a suitable polymerization initiator such as a photopolymerization initiator.

Suitable conditions for polymerization, suitable types and suitable amounts of the polymerization initiator are known to those skilled in the art and described in each literature. For example, Irgacure 651 (registered tradename; BASF), Irgacure 184 (registered tradename; BASF) or Darocure 1173 (registered tradename; BASF), each being the photopolymerization initiator, are suitable for radical polymerization.

Antioxidant and Ultraviolet Light Absorber

The liquid crystal composition of the invention may further contain at least one kind selected from the group of an antioxidant and an ultraviolet light absorber. Specific examples of the antioxidants include a phenolic antioxidant. Specific examples of the ultraviolet light absorbers include a hindered amine light stabilizer.

Any Other Component

The liquid crystal composition of the invention can also be used as a liquid crystal composition for application to a guest-host (GH) mode by adding a dye, such as a dichroic dye of a merocyanine type, a styryl type, an azo type, an azomethine type, an azoxy type, a quinophthalone type, an anthraquinone type and a tetrazine type.

Method for Preparing a Liquid Crystal Composition and Characteristics Thereof

When preparing the liquid crystal composition of the invention, various kinds of components can also be selected, for example, in consideration of the value of dielectric anisotropy of component A. The liquid crystal composition of the invention has a large value of dielectric anisotropy and a small threshold voltage. The composition has a suitable value of optical anisotropy and a suitable elastic constant $K_{33}$. A term "suitable" herein means that, for example, a suitable range of the optical anisotropy and the elastic constant is appropriately determined depending on the operating mode of the liquid crystal display device including the liquid crystal composition according to the invention. The composition has a low viscosity. The composition has a wide temperature range of the nematic phase, more specifically, a high maximum temperature of the nematic phase, and a low minimum temperature of the nematic phase.

The liquid crystal composition is generally prepared according to a publicly known method, for example, a method for dissolving necessary components under a high temperature. Moreover, liquid crystal compositions for application to various kinds of modes can be prepared by adding an additive (examples: an optically active compound, a polymerizable compound, a polymerization initiator, an antioxidant, an ultraviolet light absorber or a dye) well known to those skilled in the art according to an application. The additive is well known to those skilled in the art, and in addition to the compounds described above, is described in detail in various literatures.

3. Liquid Crystal Display Device

The liquid crystal display device of the invention includes the liquid crystal composition described above. The liquid crystal display device of the invention has a short response time, a small electric power consumption and a small driving voltage, a large contrast ratio and a high voltage holding ratio, and can be used in a wide temperature range, and therefore can be used for a liquid crystal projector, a liquid crystal television or the like.

The liquid crystal composition of the invention can also be used for an electrically controlled birefringence (ECB) mode device, a dynamic scattering (DS) mode device using a liquid crystal composition into which a conducting agent is added, a nematic curvilinear aligned phase (NCAP) device prepared by microencapsulating nematic liquid crystals, and a polymer dispersed liquid crystal display device (PDLCD) prepared by forming a three-dimensional network polymer in the liquid crystal composition, for example, a polymer network liquid crystal (PNLCD).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereafter, the invention will be explained in more detail by way of Examples, but the invention is not limited by the Examples. Unless otherwise noted, "%" is expressed in terms of "% by mass."

A liquid crystal compound obtained in Examples and so forth was identified by a nuclear magnetic resonance spectrum obtained by $^1$H-NMR analysis and a gas chromatogram obtained by gas chromatic analysis. First, analytical methods will be explained.

$^1$H-NMR Analysis

As a measuring apparatus, DRX-500 (made by Bruker BioSpin Corporation) was used. A sample manufactured in Examples and so forth was dissolved into a deuterated solvent such as $CDCl_3$ in which the sample was soluble, and measurement was carried out under the conditions of room temperature, 500 MHz and 24 times of accumulation. In addition, tetramethylsilane (TMS) was used for a reference material for a zero point of chemical shifts (δ values). Moreover, in the explanation of nuclear magnetic resonance spectra, s, d, t, q, quin, sex, m, dq and br stand for a singlet, a doublet, a triplet, a quartet, a quintet, a sextet, a multiplet, a doublet of quartet and broad, respectively.

GC Analysis

As a measuring apparatus, GC-14B Gas Chromatograph (made by Shimadzu Corporation) was used. As a column, capillary column CBP1-M25-025 (length 25 m, bore 0.22 mm, film thickness 0.25 μm; dimethylpolysiloxane as a stationary liquid phase; non-polar, made by Shimadzu Corporation) was used. Helium was used as a carrier gas, and a flow rate was adjusted at 1 milliliter per minute. Temperature in a sample injector was set at 300° C. and temperature of a detector (FID) part was set at 300° C. A sample was dissolved into toluene and prepared to be a 1% solution, and 1 microliter of the resultant solution was injected into the sample injector.

As a recorder, C-R6A Chromatopac (made by Shimadzu Corporation) or the equivalent thereof was used. The resultant gas chromatogram showed a retention time of a peak and a value of a peak area corresponding to each of component compounds.

In addition, as a solvent for diluting the sample, for example, chloroform or hexane may also be used. Moreover, as the column, capillary column DB-1 (length 30 m, bore 0.32 mm, film thickness 0.25 μm, made by Agilent Technologies Inc.), HP-1 (length 30 m, bore 0.32 mm, film thickness 0.25 μm, made by Agilent Technologies Inc.), Rtx-1 (length 30 m, bore 0.32 mm, film thickness 0.25 μm, made by Restek Corporation), BP-1 (length 30 m, bore 0.32 mm, film thickness 0.25 μm, made by SGE International Pty. Ltd.), and so forth may also be used.

A ratio of peak areas in the gas chromatogram corresponds to a ratio of component compounds. In general, weight percent of each of the component compounds in an analytical sample is not completely identical with a percentage of each of the peak areas in the analytical sample. However, when the column described above was used in the invention, the weight percent of each of the component compounds in the analytical sample substantially corresponds to the percentage of each of the peak areas in the analytical sample because a correction coefficient is essentially 1 (one).

Sample for Determining Values of Physical Properties of Liquid Crystal Compound or the Like As a sample for determining values of physical properties of a liquid crystal compound obtained in Example and so forth, two methods were applied: namely, a case where the liquid crystal compound per se was used as the sample, and a case where the compound was mixed with a base liquid crystal to be used as the sample.

In the latter case where the sample prepared by mixing the liquid crystal compound with the base liquid crystal was used, measurement was carried out according to the method described below. First, a sample was prepared by mixing 15% of liquid crystal compound obtained and 85% of base liquid crystal. Extrapolated values were calculated according to an extrapolation method represented by an extrapolation equation described below from measured values of the sample obtained. The extrapolated values were described as values of physical properties of the liquid crystal compound obtained. However, when a smectic phase was maintained at 25° C. or a crystal precipitated at 25° C. even when a mixing ratio of the liquid crystal compound to the base liquid crystal was as described above, a mixing ratio of the liquid crystal compound to the base liquid crystal (liquid crystal compound: base liquid crystal) was changed in the order of (10%:90%), (5%:95%) and (1%:99%), and values of physical properties of a sample were determined at a mixing ratio at which no smectic phase was maintained at 25° C. or no crystal precipitated at 25° C. Then, the extrapolated values were determined according to the equation and described as the values of physical properties of the liquid crystal compound.

(Extrapolated value)={100×(measured value of a sample)−(% by mass of base liquid crystal)×(measured value of the base liquid crystal)}/(% by mass of liquid crystal compound).  Equation 1

As the base liquid crystal, base liquid crystal A as described below was used for measurement.

Formula 44

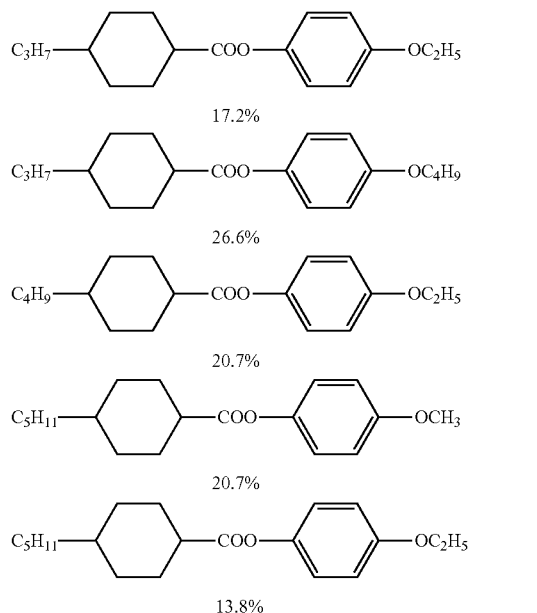

Base liquid crystal A having a nematic phase was prepared by mixing five compounds described above. Physical properties of base liquid crystal A were as described below (measuring methods were described below): maximum temperature $(T_{NI})$=74.6° C., value of dielectric anisotropy $(\Delta\in)$=−1.3, value of optical anisotropy $(\Delta n)$=0.087. In addition, as a sample for determining the values of physical properties, base liquid crystal A per se was used.

Method for Determining Values of Physical Properties of a Liquid Crystal Compound or the Like Values of physical properties of a liquid crystal compound and a liquid crystal composition obtained in Examples and so forth were determined according to the methods described below. Most of the measuring methods are applied as described in EIAJ ED-2521A of the Standard of Electronic Industries Association of Japan, or as modified thereon. Moreover, no TFT was attached to a TN device of a VA device used for measurement.

Among measured values, in the case of values obtained using a liquid crystal compound per se as a sample, and values obtained using a liquid crystal composition per se as a sample, the values obtained were described as experimental data as were. Among measured values, in the case of a sample prepared by mixing a liquid crystal compound with a base liquid crystal, values obtained according to the extrapolation method were described.

Phase Structure and Phase Transition Temperature (° C.)

A phase structure and a phase transition temperature were measured according to methods (1) and (2) as described below.

(1) A sample (liquid crystal compound) was placed on a hot plate of a melting point apparatus (FP-52 Hot Stage made by Mettler-Toledo International Inc.) equipped with a polarizing microscope, and a state of phase and a change thereof were observed with the polarizing microscope while heating the sample at a rate of 3° C. per minute, and a kind of the phase was specified.

(2) A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by an extrapolation method, and thus a phase transition temperature was determined.

Hereinafter, the crystal was expressed as C, and when the crystals were further distinguishable, each of the crystals was expressed as $C_1$ or $C_2$. The smectic phase was expressed as S and the nematic phase as N. An isotropic liquid (isotropic) was expressed as Iso. When smectic B phase or smectic A phase was distinguishable between the smectic phases, the phases were expressed as $S_B$ or $S_A$, respectively. As an expression of the phase transition temperature, for example, "C, 50.0; N, 100.0; Iso" shows that a phase transition temperature (CN) from the crystal to the nematic phase is 50.0° C., and a phase transition temperature (NI) from the nematic phase to the isotropic liquid is 100.0° C. A same rule applied to other expressions. All of units of the phase transition temperature are ° C.

Maximum Temperature of a Nematic Phase $(T_{NI}; ° C.)$

A sample (a liquid crystal composition, or a mixture of a liquid crystal compound and a base liquid crystal) was placed on a hot plate of a melting point apparatus (FP-52 Hot Stage made by Mettler-Toledo International Inc.) equipped with a polarizing microscope, and was observed with the polarizing microscope while heating the sample at a rate of 1° C. per minute. Temperature when part of the sample changed from the nematic phase to the isotropic liquid was described as a maximum temperature of the nematic phase. As described above, a higher limit of the temperature range of the nematic phase may be occasionally abbreviated simply as "maximum temperature."

Value of Dielectric Anisotropy $(\Delta\in;$ Measured at 25° C.)

A value of dielectric anisotropy $(\Delta\in)$ was determined according to a method as described below.

An ethanol (20 mL) solution of octadecyl triethoxysilane (0.16 mL) was applied onto a well-washed glass substrate. After rotating the glass substrate with a spinner, the glass substrate was heated at 150° C. for 1 hour. A VA device in which a distance (cell gap) was 20 micrometers was assembled from two glass substrates.

In a similar manner, an alignment film of polyimide was formed on the glass substrate. After rubbing treatment was applied to the alignment film obtained on the glass substrate, a TN device in which a distance (cell gap) between two glass substrates was 9 micrometers and a twist angle was 80 degrees was assembled.

A sample (a liquid crystal composition, or a mixture of a liquid crystal compound and a base liquid crystal) was put into the VA device obtained, a voltage of 0.5 V (1 kHz, sine waves) was applied to the device, and a dielectric constant (Eli) in the major axis direction of liquid crystal molecules was measured. Moreover, a sample (a liquid crystal composition, or a mixture of a liquid crystal compound and a base liquid crystal) was put into the TN device obtained, a voltage of 0.5 V (1 kHz, sine waves) was applied to the device, and a dielectric constant ($\in\perp$) in the minor axis direction of the liquid crystal molecules was measured. A value of dielectric anisotropy ($\Delta\in$) was calculated from an equation: $\Delta\in=\in\|-\in\perp$.

Value of Optical Anisotropy ($\Delta$n, Measured at 25° C.)

Determination of a value of optical anisotropy ($\Delta$n) was carried out by means of Abbe refractometer with a polarizing plate mounted on an ocular by using light at a wavelength of 589 nanometers at a temperature of 25° C. A surface of a main prism was rubbed in one direction, and then a sample (a liquid crystal composition, or a mixture of a liquid crystal compound and a base liquid crystal) was added dropwise onto the main prism. A refractive index (n‖) was measured when the direction of polarized light was parallel to the direction of rubbing. A refractive index (n⊥) was measured when the direction of polarized light was perpendicular to the direction of rubbing. A value of optical anisotropy ($\Delta$n) was calculated from an equation: $\Delta n=n\|-n\perp$.

Examples of Liquid Crystal Compounds

Example 1

Synthesis of 5-(4-ethoxy-2-fluoro-3-difluoromethylphenyl)-2-(4-propylcyclohexyl)tetrahydropyran (1-5-11)

Formula 45

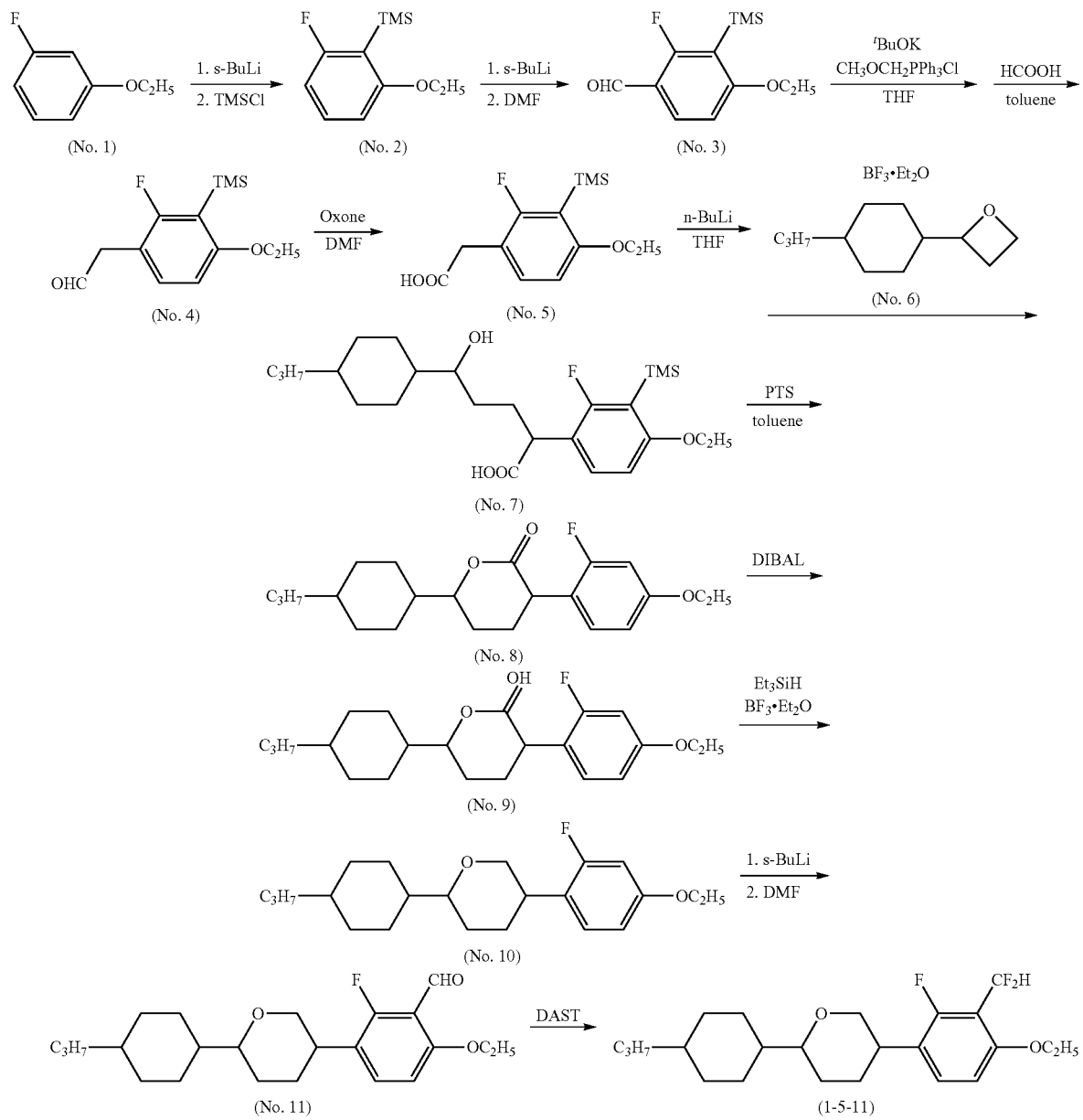

First Step

In a reaction vessel under a nitrogen atmosphere, 14.5 g (103 mmol) of 1-ethoxy-3-fluorobenzene (No. 1) was dissolved into 150 mL of THF. At a temperature of −70° C. or lower, 100 mL (102 mmol) of s-butyllithium (1.02 M cyclohexane solution) was added dropwise to the solution, and the resultant mixture was stirred for 1 hour, and then a THF (50 mL) solution of 14.0 mL (110 mmol) of trimethylsilyl chloride was added dropwise thereto. The resultant mixture was stirred for 1 hour, and then the reaction mixture was poured into 300 mL of aqueous solution of ammonium chloride subjected to ice-cooling, and then liquids were separated. An aqueous layer was extracted with 100 mL of hexane twice, organic layers were combined, washed with water and saturated brine, dried over anhydrous sodium sulfate, and then a solvent was evaporated under reduced pressure. A residue was treated on silica gel column chromatography (silica gel: 400 g, eluate:heptane), and then subjected to vacuum distillation (136° C., 50 mmHg), and thus 14.1 g (66.2 mmol, yield 64 mol %) of 1-ethoxy-3-fluoro-trimethylsilylbenzene (No. 2) was obtained.

Second Step

In a reaction vessel under a nitrogen atmosphere, 6.0 g (28.2 mmol) of 1-ethoxy-3-fluoro-2-trimethylsilylbenzene (No. 2) obtained in the first step was dissolved into 60 mL of THF, and the resultant mixture was cooled to −70° C. or lower. To the solution, 28.7 mL (31.0 mmol) of s-butyllithium (1.08 M cyclohexane solution) was added dropwise, and the resultant mixture was stirred at −70° C. or lower for 1 hour, and then a THF (10 mL) solution of 2.6 mL (33.4 mmol) of N,N-dimethylformamide (DMF) was added dropwise thereto. The resultant mixture was stirred at −70° C. or lower for 1 hour, and then the reaction mixture was poured into 50 mL of aqueous solution of ammonium chloride subjected to ice-cooling, and then liquids were separated. An aqueous layer was extracted with 50 mL of ethyl acetate twice, organic layers were combined, washed with water and saturated brine, dried over anhydrous sodium sulfate, and then a solvent was evaporated under reduced pressure. As a result, 6.7 g (27.9 mmol, yield 99 mol %) of 4-ethoxy-2-fluoro-3-trimethylsilylbenzaldehyde (No. 3) was obtained.

Third Step

In a reaction vessel under a nitrogen atmosphere, 4.7 g (42.0 mmol) of potassium t-butoxide was added little by little at −40° C. or lower into a THF (35 mL) suspension of 14.4 g (42.0 mmol) of methoxymethyltriphenylphosphine chloride. The resultant mixture was stirred at −40° C. or lower for 1 hour, and then a THF (100 mL) solution of 6.2 g (25.8 mmol) of 4-ethoxy-2-fluoro-3-trimethylsilylbenzaldehyde (No. 3) obtained in the second step was added dropwise thereto. The resultant mixture was heated to room temperature, stirred for 5 hours, and then the reaction mixture was poured into 200 mL of water, 50 mL of ethyl acetate was added thereto, and then liquids were separated. An aqueous layer was extracted with 50 mL of ethyl acetate twice, organic layers were combined, washed with water and saturated brine, dried over anhydrous sodium sulfate, and then a solvent was evaporated under reduced pressure. A residue was purified on silica gel column chromatography (silica gel:100 g, eluate:heptane/ethyl acetate=95/5 (in a volume ratio)), a solvent was evaporated under reduced pressure, and then an intermediate was obtained. The intermediate was dissolved into 30 mL of toluene, 9 mL of formic acid was added thereto, and the resultant mixture was subjected to heating reflux for 1 hour. The resultant mixture subjected to standing to cool to room temperature was poured into 100 mL of saturated aqueous solution of sodium hydrogencarbonate, liquids were separated, and then an aqueous layer was extracted with 50 mL of toluene twice. Organic layers were combined, washed with water and saturated brine, and then dried over anhydrous sodium sulfate. A solvent was evaporated under reduced pressure, and thus 3.6 g (14.1 mmol, yield 55 mol %) of 2-(4-ethoxy-2-fluoro-3-trimethylsilylphenyl)acetaldehyde (No. 4) was obtained.

Fourth Step

In a reaction vessel under a nitrogen atmosphere, 3.6 g (14.1 mmol) of 2-(4-ethoxy-2-fluoro-3-trimethylsilylphenyl)acetaldehyde (No. 4) obtained in the third step was dissolved into 50 mL of DMF. To the resultant mixture, 10.4 g (16.9 mmol) of Oxone was added under ice-cooling, and then the resultant mixture was stirred at room temperature for 3 hours. Subsequently, the reaction mixture was poured into 100 mL of saturated aqueous solution of ammonium chloride, 50 mL of ethyl acetate was added thereto, and then liquids were separated. An aqueous layer was extracted with 50 mL of ethyl acetate twice, organic layers were combined, washed with water and saturated brine, dried over anhydrous sodium sulfate, and then a solvent was evaporated under reduced pressure. A residue was purified on silica gel column chromatography (silica gel:100 g, eluate:heptane/ethyl acetate=50/50 (in a volume ratio)) and by recrystallization (heptane/toluene=75/25 (in a volume ratio)) and thus 1.7 g (6.3 mmol, yield 45 mol %) of 2-(4-ethoxy-2-fluoro-trimethylsilylphenyl)acetate (No. 5) was obtained.

Fifth Step

In a reaction vessel under a nitrogen atmosphere, 1.7 g (6.3 mmol) of 2-(4-ethoxy-2-fluoro-3-trimethylsilylphenyl)acetate (No. 5) obtained in the fourth step was dissolved into 20 mL of THF. The solution was cooled to 0° C., and 7.7 mL (12.8 mmol) of n-butyllithium (1.67 M n-hexane solution) was added dropwise thereto, and then the reaction mixture was heated to room temperature and stirred for 30 minutes. Subsequently, the resultant reaction mixture was cooled to −70° C. and a THF (3 mL) solution of 1.15 g (6.3 mmol) of 2-(trans-4-propyl-cyclohexyl) oxetane (No. 6) obtained according to a method described in JP 2000-8040 A, and subsequently a THF (3 mL) solution of 0.94 mL (7.5 mmol) of boron trifluoride-diethyl ether complex were added dropwise thereto. The resultant mixture was heated to room temperature, and then the reaction mixture was poured into 100 mL of 10% formic acid aqueous solution, liquids were separated, and then an aqueous layer was extracted with 100 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:100 g, eluate:heptane/ethyl acetate=90/10 (in a volume ratio)), and thus 2.46 g (5.7 mmol, yield 91 mol %) of 2-(4-ethoxy-2-fluoro-3-(trimethylsilyl)phenyl)-5-hydroxy-5-(4-propylcyclohexyl)-pentanoic acid (No. 7) was obtained.

Sixth Step 2.46 g (5.7 mmol) of 2-(4-ethoxy-2-fluoro-3-(trimethylsilyl)phenyl)-5-hydroxy-5-(4-propylcyclohexyl)-pentanoic acid (No. 7) obtained in the fifth step was dissolved into 25 mL of toluene. Thereto, 1.08 g (5.7 mmol) of p-toluenesulfonic acid monohydrate was added, and the resultant mixture was subjected to heating reflux for 1 hour. The reaction mixture subjected to standing to cool to room temperature was poured into a saturated aqueous solution of sodium hydrogencarbonate, liquids were separated, and then an aqueous layer was extracted with 20 mL of toluene twice. Organic layers were combined, washed with water and saturated brine, dried over anhydrous sodium sulfate, and then a solvent was evaporated. A residue was purified on silica gel column chromatography (silica gel:50 g, eluate:heptane/ethyl acetate=90/10 (in a volume ratio)), and thus 1.7 g (4.7 mmol, yield 82 mol %) of 3-(4-ethoxy-2-fluorophenyl)-6-(4-propylcyclohexyl)tetrahydropyran-2-one (No. 8) was obtained.

Seventh Step 1.7 g (4.7 mmol) of 3-(4-ethoxy-2-fluorophenyl)-6-(4-propylcyclohexyl)tetrahydropyran-2-one (No. 8) obtained in the sixth step was dissolved into 40 mL of THF, and the resultant mixture was cooled to −70° C. or lower. Thereto, 10.2 mL (10.3 mmol) of diisobutylaluminum hydride (1.01 M toluene solution) was added, and the resultant mixture was stirred at −70° C. for 2 hours. The reaction mixture was poured into 80 mL of 10% formic acid aqueous solution subjected to ice-cooling, and then liquids were separated. An aqueous layer was extracted with 50 mL of toluene twice, and organic layers were combined, washed with water and saturated brine, and then dried over anhydrous sodium sulfate. A solvent was evaporated under reduced pressure, and thus 1.7 g (4.7 mmol, yield mol %) of 3-(4-ethoxy-2-fluorophenyl)-6-(4-propylcyclohexyl)tetrahydropyran-2-ol (No. 9) was obtained.

Eighth Step 1.74 g (4.7 mmol) of 3-(4-ethoxy-2-fluorophenyl)-6-(4-propylcyclohexyl)tetrahydropyran-2-ol (No. 9) obtained in the seventh step was dissolved into 30 mL of dichloromethane. At −70° C., a dichloromethane (5 mL) solution of 2.4 mL (15.1 mmol) of triethyl silane, and subsequently a dichloromethane (5 mL) solution of 1.9 mL (15.1 mmol) of boron trifluoride-diethyl ether complex were added dropwise thereto. The resultant mixture was heated to room temperature, and then stirred for 2 hours, the reaction mixture was poured into 50 mL of ice water, liquids were separated, and then an aqueous layer was extracted with 10 mL of dichloromethane twice. Organic layers were combined, washed with water and saturated brine, dried over anhydrous sodium sulfate, and then a solvent was evaporated under reduced pressure. A residue was purified on silica gel column chromatography (silica gel:50 g, eluate:heptane/ethyl acetate=95/5 (in a volume ratio)) and by recrystallization (heptane/ethanol=50/50 (in a volume ratio)), and thus 1.15 g (3.3 mmol, yield 73 mol %) of 5-(4-ethoxy-2-fluorophenyl)-2-(4-propylcyclohexyl)tetrahydropyran (No. 10) was obtained.

Ninth Step 1.05 g (3.0 mmol) of 5-(4-ethoxy-2-fluorophenyl)-2-(4-propylcyclohexyl)tetrahydropyran (No. 10) obtained in the eighth step was dissolved into 30 mL of THF, and the resultant mixture was cooled to −70° C. Then, 3.8 mL (4.1 mmol) of s-butyllithium (1.08 M cyclohexane solution) was added dropwise thereto, and the resultant mixture was stirred at −70° C. for 1 hour. Subsequently, a THF (3 mL) solution of 0.32 mL (4.0 mmol) of N,N-dimethylformamide (DMF) was added dropwise thereto, and the resultant mixture was stirred at −70° C. for 2 hours. The reaction mixture was poured into 100 mL of ice water, and then an aqueous layer was extracted with 50 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:30 g, eluate:heptane/ethyl acetate=90/10 (in a volume ratio)), and thus 0.96 g (2.5 mmol, yield 85 mol %) of 5-(4-ethoxy-2-fluoro-3-formylphenyl)-2-(4-propylcyclohexyl)tetrahydropyran (No. 11) was obtained.

Tenth Step 0.96 g (2.5 mmol) of 5-(4-ethoxy-2-fluoro-3-formylphenyl)-2-(4-propylcyclohexyl)tetrahydropyran (No. 11) obtained in the ninth step was dissolved into 10 mL of dichloromethane, and subjected to ice-cooling. Then, 0.73 mL (5.5 mmol) of diethylaminosulfurtrifluoride (DAST) was added thereto, and the resultant mixture was stirred at room temperature for 4 hours. The reaction mixture was poured into 50 mL of saturated aqueous solution of sodium hydrogencarbonate, liquids were separated, and then an aqueous layer was extracted with 20 mL of dichloromethane twice. Organic layers were combined, washed with water and saturated brine, dried over anhydrous sodium sulfate, and then a solvent was evaporated under reduced pressure. A residue was purified on silica gel column chromatography (silica gel:30 g, eluate:heptane/ethyl acetate=95/5 (in a volume ratio)) and by recrystallization (ethanol), and thus 0.5 g (1.25 mmol, yield 62 mol %) of 5-(4-ethoxy-2-fluoro-3-difluoromethylphenyl)-2-(4-propylcyclo hexyl)tetrahydropyran (1-5-11) was obtained.

Chemical shifts (δ (ppm)) by $^1$H-NMR analysis were as described below, and compound (1-5-11) obtained was identified to be 5-(4-ethoxy-2-fluoro-3-difluoromethylphenyl)-2-(4-propylcyclohexyl)tetrahydropyran. In addition, a measurement solvent was CDCl$_3$.

Chemical shifts (δ (ppm)): 7.19 (t, 1H), 7.03 (t, 1H, J=53.6, CF$_2$H), 6.65 (d, 1H), 4.05 (q, 2H), 3.99 (dq, 1H), 3.37 (t, 1H), 3.09-3.04 (m, 2H), 1.99 (t, 2H), 1.78-0.90 (m, 19H), 0.88 (t, 3H).

A phase transition temperature of compound (1-5-11) obtained was as described below.

Phase transition temperature: S$_B$, 62.6; N, 66.2; Iso.

Example 2

Synthesis of 2-(4-ethoxy-2-fluoro-3-difluoromethylphenyl)-5-(4-propylcyclohexyl)tetrahydropyran (1-4-11)

Formula 46

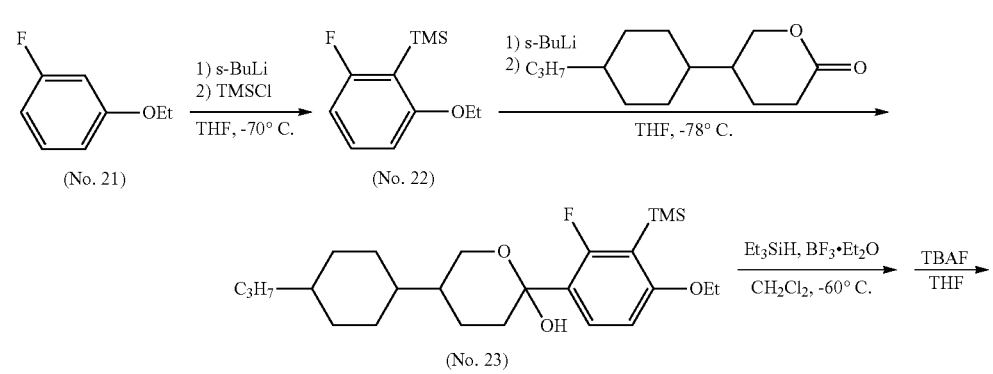

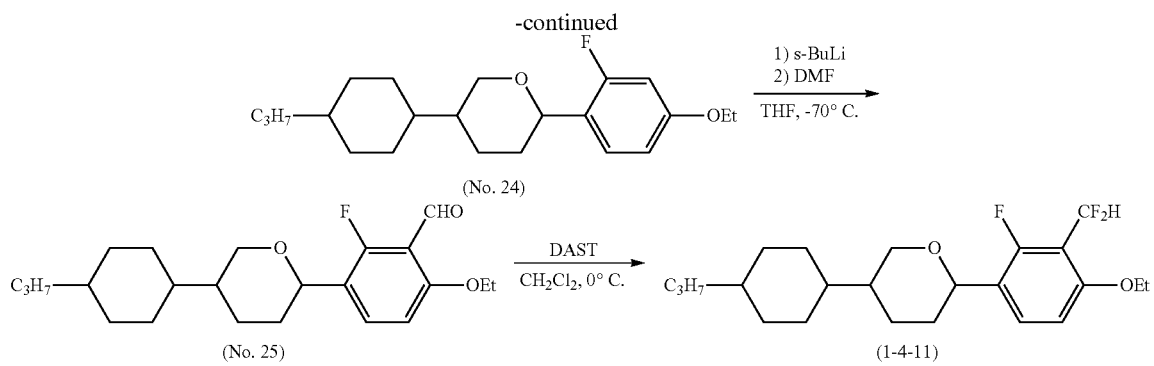

First Step 14.1 g (66.2 mmol, yield 64 mol %) of 1-ethoxy-3-fluoro-2-trimethylsilylbenzene (No. 22) was obtained in a manner similar to the first step in Example 1.

Second Step

In a reaction vessel under a nitrogen atmosphere, 4.0 g (18.8 mmol) of 1-ethoxy-3-fluoro-2-trimethylsilylbenzene (No. 22) obtained in the first step was dissolved into 30 mL of THF, and the resultant mixture was cooled to −70° C. or lower. To the solution, 19.0 mL (20.5 mmol) of s-butyllithium (1.08 M cyclohexane solution) was added dropwise, and the resultant mixture was stirred at −70° C. or lower for 1 hour, and then a THF (10 mL) solution of 3.84 g of 5-(4-propylcyclohexyl)tetrahydropyran-2-one was added dropwise thereto. The resultant mixture was stirred at −70° C. or lower for 1 hour, and then the reaction mixture was poured into 50 mL of aqueous solution of ammonium chloride subjected to ice-cooling, liquids were separated, and then an aqueous layer was extracted with 50 mL of toluene three times. Organic layers were combined, washed with water and saturated brine, dried over anhydrous sodium sulfate, and then a solvent was evaporated under reduced pressure, and thus 4.5 g (10.3 mmol, yield 60 mol %) of 2-(4-ethoxy-2-fluoro-3-trimethylsilylphenyl)-5-(4-propylcyclohexyl)tetrahydropyran-2-ol (No. 23) was obtained.

Third Step 4.0 g (9.2 mmol) of 2-(4-ethoxy-2-fluoro-3-trimethylsilylphenyl)-5-(4-propylcyclohexyl)tetrahydropyran-2-ol (No. 23) obtained in the second step was dissolved into 80 mL of dichloromethane. At −60° C., a dichloromethane (5 mL) solution of 3.0 mL (18.4 mmol) of triethyl silane, and subsequently a dichloromethane (5 mL) solution of 2.3 mL (18.4 mmol) of boron trifluoride-diethyl ether complex were added dropwise thereto. The resultant mixture was heated to room temperature, and stirred for 2 hours, and the reaction mixture was poured into 150 mL of ice water, liquids were separated, and then an aqueous layer was extracted with 20 mL of dichloromethane three times. Organic layers were combined, washed with water and saturated brine, dried over anhydrous sodium sulfate, and then a solvent was evaporated. A residue was dissolved into 10 mL of THF, and 9.2 mL (9.2 mmol) of tetra-n-butylammonium fluoride was added dropwise thereto at 0° C. The resultant mixture was stirred for 10 minutes, and then slowly heated to room temperature. The reaction mixture was poured into 150 mL of ice water, liquids were separated, and then an aqueous layer was extracted with 50 mL of toluene three times. Organic layers were combined, washed with water and saturated brine, dried over anhydrous sodium sulfate, and then a solvent was evaporated under reduced pressure. A residue was purified on silica gel column chromatography (silica gel:80 g, eluate:heptane), and thus 1.9 g (5.5 mmol, yield 60 mol %) of 2-(4-ethoxy-2-fluorophenyl)-5-(4-propylcyclohexyl)tetrahydropyran (No. 24) was obtained.

Fourth Step 1.4 g (3.2 mmol) of 2-(4-ethoxy-2-fluorophenyl)-5-(4-propylcyclohexyl)tetrahydropyran (No. 24) obtained in the third step was dissolved into 70 mL of THF, and the resultant mixture was cooled to −70° C. Thereto, 3.6 mL (3.8 mmol) of s-buthyllithium (1.08 M cyclohexane solution) was added dropwise, and the resultant mixture was stirred at −70° C. for 1 hour. Subsequently, a THF (1.0 mL) solution of 0.36 mL (3.8 mmol) of N, N-dimethylformamide (DMF) was added dropwise, and the resultant mixture was stirred at −70° C. for 2 hours. The reaction mixture was poured into 100 mL of aqueous solution of ammonium chloride subjected to ice-cooling, liquids were separated, and then an aqueous layer was extracted with 50 mL of toluene three times. Organic layers were combined, washed with water and saturated brine, and then dried over anhydrous sodium sulfate. A residue was purified on silica gel column chromatography (silica gel:20 g, eluate:heptane/ethyl acetate=9/1 (in a volume ratio)), and thus 0.57 g (1.5 mmol, yield 48 mol %) of 2-(4-ethoxy-2-fluoro-3-formylphenyl)-5-(4-propylcyclohexyl)tetrahydropyran (No. 25) was obtained.

Fifth Step 0.57 g (1.5 mmol) of 2-(4-ethoxy-2-fluoro-3-formylphenyl)-5-(4-propylcyclohexyl)tetrahydropyran (No. 25) obtained in the fourth step was dissolved into 10 mL of dichloromethane, and subjected to ice-cooling. Then, 0.4 mL (3.0 mmol) of diethylaminosulfurtrifluoride (DAST) was added thereto, and the resultant mixture was stirred at room temperature for 4 hours. The reaction mixture was poured into 50 mL of saturated aqueous solution of sodium hydrogencarbonate subjected to ice-cooling, liquids were separated, and then an aqueous layer was extracted with 20 mL of dichloromethane three times. Organic layers were combined, washed with water and saturated brine, dried over anhydrous sodium sulfate, and then a solvent was evaporated under reduced pressure. A residue was purified on silica gel column chromatography (silica gel:15 g, eluate:heptane/ethyl acetate=20/1 (in a volume ratio)) and by recrystallization (heptane/Solmix (registered tradename) A-11), and thus 0.29 g (0.72 mmol, yield 48 mol %) of 2-(4-ethoxy-2-fluoro-3-difluoromethylphenyl)-5-(4-propylcyclohexyl)tetrahydropyran (1-4-11) was obtained.

Chemical shifts (δ (ppm)) by $^1$H-NMR analysis were as described below, and compound (1-4-11) obtained was identified to be 2-(4-ethoxy-2-fluoro-3-difluoromethylphenyl)-5-(4-propylcyclohexyl)tetrahydropyran. In addition, a measurement solvent was $CDCl_3$.

Chemical shifts (δ (ppm)): 7.49 (t, 1H), 7.04 (t, 1H, J=53.8, $CF_2H$), 6.70 (d, 1H), 4.51 (q, 1H), 4.15 (dq, 1H), 4.07 (q, 2H), 3.34 (t, 1H), 1.95-1.99 (m, 1H), 1.88-1.91 (m, 1H), 1.78-0.80 (m, 23H).

A phase transition temperature of compound (1-4-11) obtained was as described below.

Phase transition temperature: $S_E$, 92.3; N, 96.1; Iso.

Example 3

Synthesis of 5-(4-ethoxy-2-fluoro-3-difluoromethylphenyl)-2-(4-propyl-cyclohexyl)cyclohexyl-tetrahydropyran (1-15-15)

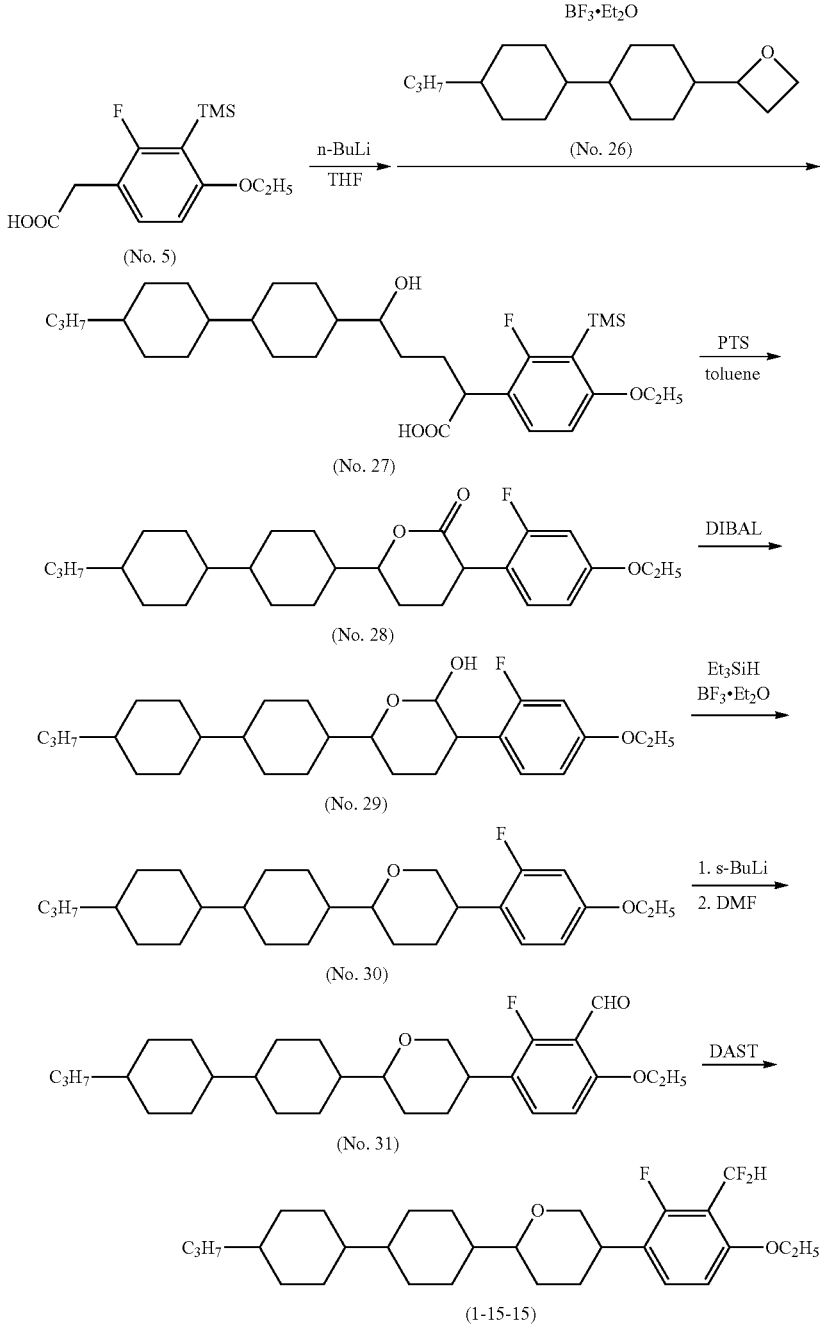

Formula 47

First Step

In a reaction vessel under a nitrogen atmosphere, 1.94 g (7.2 mmol) of 2-(4-ethoxy-2-fluoro-3-trimethylsilylphenyl)acetate (No. 5) obtained in the fourth step in Example 1 was dissolved into 25 mL of THF. The solution was cooled to 0° C., 8.6 mL (14.4 mmol) of s-butyllithium (1.67 M n-hexane solution) was added dropwise thereto, and subsequently the reaction mixture was heated to room temperature and stirred for 30 minutes. Subsequently, the resultant reaction mixture was cooled to −70° C., a THF (15 mL) solution of 1.9 g (7.2 mmol) of 2-(trans-4-propyl-cyclohexyl)cyclohexyl-oxetane (No. 26) obtained according to a method described in JP 2000-8040 A, and subsequently a THF (3 mL) solution of 1.08 mL (8.6 mmol) of boron trifluoride-diethyl ether complex were added dropwise thereto. The reaction mixture was heated to room temperature, and then the reaction mixture was poured into 100 mL of 10% formic acid aqueous solution, liquids were separated, and then an aqueous layer was extracted with 150 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:100 g, eluate:heptane/ethyl acetate=90/10 (in a volume ratio)), and thus 2.89 g (5.4 mmol, yield 75 mol %) of 2-(4-ethoxy-2-fluoro-3-(trimethylsilyl)phenyl)-5-hydroxy-5-(4-propylcyclohexyl)cyclohexyl-pentanoic acid (No. 27) was obtained.

Second Step 2.89 g (5.4 mmol) of 2-(4-ethoxy-2-fluoro-3-(trimethylsily)phenyl)-5-hydroxy-5-(4-propylcyclohexyl)cyclohexyl-pentanoic acid (No. 27) obtained in the first step was dissolved into 50 mL of toluene, 1.03 g (5.4 mmol) of p-toluenesulfonic acid monohydrate was added thereto, and the resultant mixture was subjected to heating reflux for 1 hour. The reaction mixture subjected to standing to cool to room temperature was poured into a saturated aqueous solution of sodium hydrogencarbonate, liquids were separated, and then an aqueous layer was extracted with 50 mL of toluene twice. Organic layers were combined, washed with water and saturated brine, dried over anhydrous sodium sulfate, and then a solvent was evaporated. A residue was purified on silica gel column chromatography (silica gel:50 g, eluate:heptane/ethyl acetate=90/10 (in a volume ratio)), and thus 1.9 g (4.3 mmol, yield 79 mol %) of 3-(4-ethoxy-2-fluorophenyl)-6-(4-propylcyclohexyl)cyclohexyl-tetrahydropyran-2-one (No. 28) was obtained.

Third Step 1.9 g (4.3 mmol) of 3-(4-ethoxy-2-fluorophenyl)-6-(4-propylcyclohexyl)cyclohexyl-tetrahydropyran-2-one (No. 28) obtained in the second step was dissolved into 150 mL of THF, and the resultant mixture was cooled to −70° C. or lower. Thereto, 9.4 mL (9.5 mmol) of diisobutylaluminum hydride (1.01 M toluene solution) was added, and the resultant mixture was stirred at −70° C. for 2 hours. The reaction mixture was poured into 100 mL of 10% formic acid aqueous solution subjected to ice-cooling, and then liquids were separated. An aqueous layer was extracted with 100 mL of ethyl acetate twice, organic layers were combined, washed with water and saturated brine, and then dried over anhydrous sodium sulfate. A solvent was evaporated under reduced pressure, and thus 1.86 g (4.2 mmol, yield 98 mol %) of 3-(4-ethoxy-2-fluorophenyl)-6-(4-propylcyclohexyl)cyclohexyl-tetrahydropyran-2-ol (No. 29) was obtained.

Fourth Step 1.86 g (4.2 mmol) of 3-(4-ethoxy-2-fluorophenyl)-6-(4-propylcyclohexyl)cyclohexyl-tetrahydropyran-2-ol (No. 29) obtained in the third step was dissolved into 50 mL of dichloromethane. At −70° C., a dichloromethane (5 mL) solution of 1.34 mL (8.4 mmol) of triethyl silane, and subsequently a dichloromethane (5 mL) solution of 1.06 mL (8.4 mmol) of boron trifluoride-diethyl ether complex were added dropwise thereto. The resultant mixture was heated to room temperature, and then stirred for 2 hours, and the reaction mixture was poured into 50 mL of ice water, liquids were separated, and then an aqueous layer was extracted with 50 mL of dichloromethane twice. Organic layers were combined, washed with water and saturated brine, dried over anhydrous sodium sulfate, and then a solvent was evaporated under reduced pressure. A residue was purified on silica gel column chromatography (silica gel:50 g, eluate:heptane/ethyl acetate=95/5 (in a volume ratio)) and by recrystallization (heptane/ethanol=50/50 (in a volume ratio), and thus 1.3 g (3.0 mmol, yield 71 mol %) of 5-(4-ethoxy-2-fluorophenyl)-2-(4-propylcyclohexyl)cyclohexyl-tetrahydropyran (No. 30) was obtained.

Fifth Step 1.3 g (3.0 mmol) of 5-(4-ethoxy-2-fluorophenyl)-2-(4-propylcyclohexyl)cyclohexyl-tetrahydropyran (No. 30) obtained in the fourth step was dissolved into 130 mL of THF, and the resultant mixture was cooled to −70° C. Then, 3.4 mL (3.6 mmol) of s-butyllithium (1.06M cyclohexane solution) was added dropwise thereto, and the resultant mixture was stirred at −70° C. for 1 hour. Subsequently, a THF (2 mL) solution of 0.28 mL (3.6 mmol) of N,N-dimethylformamide (DMF) was added dropwise thereto, and the resultant mixture was stirred at −70° C. for 2 hours. The reaction mixture was poured into 80 mL of ice water, and then an aqueous layer was extracted with 50 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:50 g, eluate:heptane/ethyl acetate=90/10 (in a volume ratio)), and thus 1.1 g (2.4 mmol, yield 73 mol %) of 5-(4-ethoxy-2-fluoro-3-formylphenyl)-2-(4-propylcyclohexyl)cyclohexyl-tetrahydropyran (No. 31) was obtained.

Sixth Step 1.1 g (2.4 mmol) of 5-(4-ethoxy-2-fluoro-3-formylphenyl)-2-(4-propylcyclohexyl)cyclohexyl-tetrahydropyran (No. 31) obtained in the fifth step was dissolved into 10 mL of dichloromethane, and subjected to ice-cooling. Then, 0.63 mL (4.8 mmol) of diethylaminosulfurtrifluoride (DAST) was added thereto, and the resultant mixture was stirred at room temperature overnight. The reaction mixture was poured into 50 mL of saturated aqueous solution of sodium hydrogencarbonate, liquids were separated, and then an aqueous layer was extracted with 20 mL of dichloromethane twice. Organic layers were combined, washed with water and saturated brine, dried over anhydrous sodium sulfate, and then a solvent was evaporated under reduced pressure. A residue was purified on silica gel column chromatography (silica gel:50 g, eluate:heptane/ethyl acetate=95/5 (in a volume ratio)) and by recrystallization (heptane), and thus 0.6 g (1.25 mmol, yield 52 mol %) of 5-(4-ethoxy-2-fluoro-3-difluoromethylphenyl)-2-(4-propylcyclo hexyl)cyclohexyl-tetrahydropyran (1-15-15) was obtained.

Chemical shifts (δ (ppm)) by $^1$H-NMR analysis were as described below, and compound (1-15-15) obtained was identified to be 5-(4-ethoxy-2-fluoro-3-difluoromethylphenyl)-2-(4-propylcyclo hexyl)cyclohexyl-tetrahydropyran. In addition, a measurement solvent was $CDCl_3$.

Chemical shifts (δ (ppm)): 7.18 (t, 1H), 7.02 (t, 1H, J=53.7, CF$_2$H), 6.65 (d, 1H), 4.06 (q, 2H), 3.98 (dq, 1H), 3.37 (t, 1H), 3.09-3.02 (m, 2H), 1.99 (t, 2H), 1.77-0.89 (m, 29H), 0.87 (t, 3H).

A phase transition temperature of compound (1-15-15) obtained was as described below.

Phase transition temperature: C 72.5 S$_B$, 241.5; N, 248.2; Iso.

Comparative Example 1

Synthesis of 2-(4-ethoxy-3-fluoro-2-difluoromethylphenyl)-5-(4-propylcyclohexyl)tetrahydropyran (No. 36)

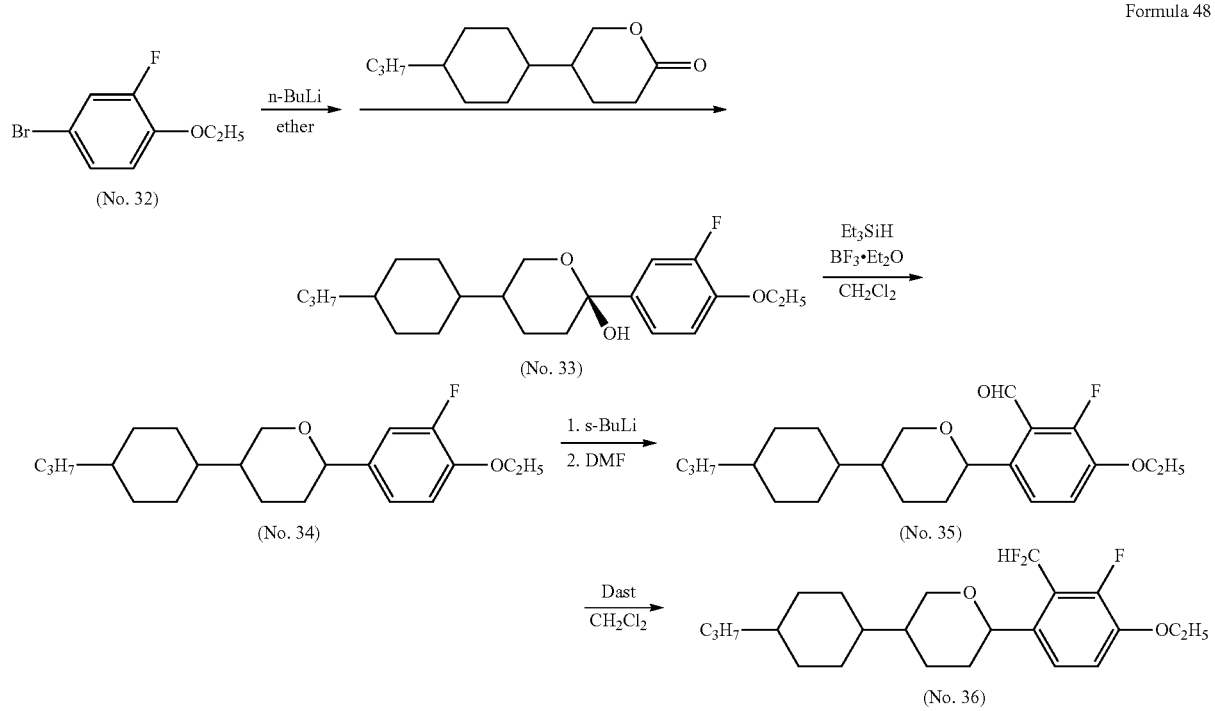

Formula 48

First Step

In a reaction vessel under a nitrogen atmosphere, 2.77 g (12.6 mmol) of 4-ethoxy-3-fluorobromobenzene (No. 32) was dissolved into 40 mL of THF, and the resultant mixture was cooled to −70° C. or lower. Then, 7.6 mL (12.6 mmol) of n-butyllithium (1.65 M n-hexane solution) was added dropwise to the solution, and subsequently the resultant mixture was stirred at −70° C. or lower for 1 hour. Then, a THF (10 mL) solution of 2.36 g (10.5 mmol) of 5-(4-propylcyclohexyl)tetrahydropyran-2-one was added dropwise thereto. The resultant mixture was stirred at −70° C. or lower for 1 hour, and then the reaction mixture was poured into 50 mL of aqueous solution of ammonium chloride subjected to ice-cooling, liquids were separated, and then an aqueous layer was extracted 50 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:100 g, eluate:heptane/ethyl acetate=75/25 (in a volume ratio)), and thus 3.0 g (8.2 mmol, yield 78 mol %) of 2-(4-ethoxy-3-fluorophenyl)-5-(4-propylcyclohexyl)tetrahydropyran-2-ol (No. 33) was obtained.

Second Step 3.0 g (8.2 mmol, yield 78 mol %) of 2-(4-ethoxy-3-fluorophenyl)-5-(4-propylcyclohexyl)tetrahydropyran-2-ol (No. 33) obtained in the first step was dissolved into 30 mL of dichloromethane. At −70° C., a dichloromethane (5 mL) solution of 1.34 mL (8.4 mmol) of triethyl silane, and subsequently a dichloromethane (5 mL) solution of 1.06 mL (8.4 mmol) of boron trifluoride-diethyl ether complex were added dropwise thereto. The resultant mixture was heated to room temperature, and then stirred for 3 hours, and the reaction mixture was poured into 50 mL of ice water, liquids were separated, and then an aqueous layer was extracted with 20 mL of dichloromethane three times. Organic layers were combined, washed with water and saturated brine, dried over anhydrous sodium sulfate, and then a solvent was evaporated under reduced pressure. A residue was purified on silica gel column chromatography (silica gel:50 g, eluate:heptane/ethyl acetate=95/5 (in a volume ratio)) and by recrystallization (heptane/ethanol=50/50 (in a volume ratio), and thus 1.3 g (3.7 mmol, yield 45 mol %) of 2-(4-ethoxy-3-fluorophenyl)-5-(4-propylcyclohexyl)tetrahydropyran (No. 34) was obtained.

Third Step 1.3 g (3.7 mmol) of 2-(4-ethoxy-3-fluorophenyl)-5-(4-propylcyclohexyl)tetrahydropyran (No. 34) obtained in the second step was dissolved into 25 mL of THF, and the resultant mixture was cooled to −70° C. Thereto, 3.8 mL (4.1 mmol) of s-butyllithium (1.08 M cyclohexane solution) was added dropwise, and the resultant mixture was stirred at −70° C. for 1 hour. Subsequently, a THF (1 mL) solution of 0.34 mL (4.4 mmol) of N,N-dimethylformamide (DMF) was added dropwise thereto, and the resultant mixture was stirred at −70° C. for 3 hours. The reaction mixture was poured into 50 mL of aqueous solution of ammonium chloride subjected to ice-cooling, liquids were separated, and then an aqueous layer was extracted with 30 mL of ethyl acetate three times. Organic layers were combined, washed with water and saturated brine, dried over anhydrous sodium sulfate, and then a solvent was evaporated under reduced pressure. A residue was purified on silica gel column chromatography (silica gel:20 g, eluate:heptane/ethyl acetate=9/1 (in a volume ratio)), 0.7 g (1.7 mmol, yield 46 mol %) of 2-(4-ethoxy-3-fluoro-2-formylphenyl)-5-(4-propylcyclohexyl)tetrahydropyran (No. 35) was obtained.

Fourth Step 0.7 g (1.7 mmol, yield 46 mol %) of 2-(4-ethoxy-3-fluoro-2-formylphenyl)-5-(4-propylcyclohexyl)tetrahydropyran (No. 35) obtained in the third step was dissolved into 10 mL of dichloromethane, and subjected to ice-cooling. Then, a dichloromethane (2 mL) solution of 0.45 mL (3.4 mmol) of diethylaminosulfurtrifluoride (DAST) was added thereto, and the resultant mixture was stirred at room temperature overnight. The reaction mixture was poured into 30 mL of saturated aqueous solution of sodium hydrogencarbonate, liquids were separated, and then an aqueous layer was extracted with 10 mL of dichloromethane three times. Organic layers were combined, washed with water and saturated brine, dried over anhydrous sodium sulfate, and then a solvent was evaporated under reduced pressure. A residue was dissolved into a THF (3 mL)/methanol (3 mL) mixed solvent, and subjected to ice-cooling. Then, 64 mg (1.7 mmol) of sodium borohydride was added thereto, and then the resultant mixture was stirred at room temperature for 1 hour. The reaction mixture was poured into 10 mL water, liquids were separated, and then an aqueous layer was extracted with 10 mL of ethyl acetate twice. Organic layers were combined, washed with water and saturated brine, dried over anhydrous sodium sulfate, and then a solvent was evaporated under reduced pressure. A residue was purified on silica gel column chromatography (silica gel:15 g, eluate:heptane/ethyl acetate=90/10 (in a volume ratio)) and by recrystallization (heptane/ethanol=50/50 (in a volume ratio)), and thus 0.35 g (0.88 mmol, yield 52 mol %) of 2-(4-ethoxy-3-fluoro-2-difluoromethylphenyl)-5-(4-propylcyclohexyl)tetrahydropyran (No. 36) was obtained.

Chemical shifts ($\delta$ (ppm)) by $^1$H-NMR analysis were as described below, and compound (No. 36) obtained was identified to be 2-(4-ethoxy-3-fluoro-2-difluoromethylphenyl)-5-(4-propylcyclohexyl)tetrahydropyran. In addition, a measurement solvent was $CDCl_3$.

Chemical shifts ($\delta$ (ppm)): 7.27 (d, 1H), 7.10 (t, 1H, J=53.8, $CF_2H$), 7.03 (t, 1H), 4.60 (d, 1H), 4.14 (dq, 1H), 4.09 (q, 2H), 3.34 (t, 1H), 1.98-0.99 (m, 22H), 0.87 (t, 3H).

A phase transition temperature of compound (No. 36) obtained was as described below, and no nematic phase was observed.

Phase transition temperature: C 100.6 Iso.

Physical Properties of Liquid Crystal Compound (1) A sample (liquid crystal composition) including 85% of base liquid crystal A and 15% of liquid crystal compound (1-5-11) was prepared. The physical properties of the sample were as described below: maximum temperature ($T_{NI}$)=73.5° C.; value of dielectric anisotropy ($\Delta\epsilon$)=−2.53; value of optical anisotropy ($\Delta n$)=0.0858. Values of physical properties of liquid crystal compound (1-5-11) calculated according to the extrapolation method from values of physical properties of base liquid crystal A and the sample, and a mixing ratio of the liquid crystal compound were as described below: maximum temperature ($T_{NI}$)=67.3° C.; value of dielectric anisotropy ($\Delta\epsilon$)=−9.16; value of optical anisotropy ($\Delta n$)=0.079.

(2) A sample (liquid crystal composition) was prepared in a manner similar to (1) described above except that kinds of liquid crystal compounds and mixing ratios thereof were changed as described in Table 1, and physical properties were evaluated.

Table 1 shows the results of evaluation of physical properties.

TABLE 1

| | | | Example 1 | Example 2 | Example 3 | Comparative Example 1 |
|---|---|---|---|---|---|---|
| Composition of sample (liquid crystal composition) (unit: % by mass) | Title compound | Liquid crystal compound (1-5-11) | 15 | | | |
| | | Liquid crystal compound (1-4-11) | | 15 | | |
| | | Liquid crystal compound (1-15-15) | | | 10 | |
| | | Compound (No. 36) | | | | 15 |
| | Base liquid crystal A | | 85 | 85 | 90 | 85 |
| physical properties of sample (liquid crystal composition) | Maximum temperature ($T_{NI}$) (° C.) | | 73.5 | 77.0 | 85.9 | 73.4 |
| | Value of dielectric anisotropy ($\Delta\epsilon$) | | −2.53 | −1.95 | −2.10 | −1.86 |
| | Value of optical anisotropy ($\Delta n$) | | 0.0858 | 0.0867 | 0.0890 | 0.0860 |
| Physical properties of title compounds as calculated according to the extrapolation method | Maximum temperature ($T_{NI}$) (° C.) | | 67.3 | 90.6 | 187.6 | 66.6 |
| | Value of dielectric anisotropy ($\Delta\epsilon$) | | −9.16 | −5.18 | −8.30 | −4.60 |
| | Value of optical anisotropy ($\Delta n$) | | 0.079 | 0.085 | 0.105 | 0.080 |

The findings show that liquid crystal compound (1-5-11) and liquid crystal compound (1-4-11) have a larger maximum temperature ($T_{NI}$) and a larger absolute value of dielectric anisotropy (As) in comparison with compound (No. 36) being a tricyclic compound.

SYNTHESIS EXAMPLES

Compounds (1-1-1) to (1-20-12) can be prepared by applying the synthetic processes and Examples 1 to 3 as described above. Specific examples of compounds (1-4-11), (1-5-11) and (1-15-15) in Examples 1 to 3 are also described.

Formula 49

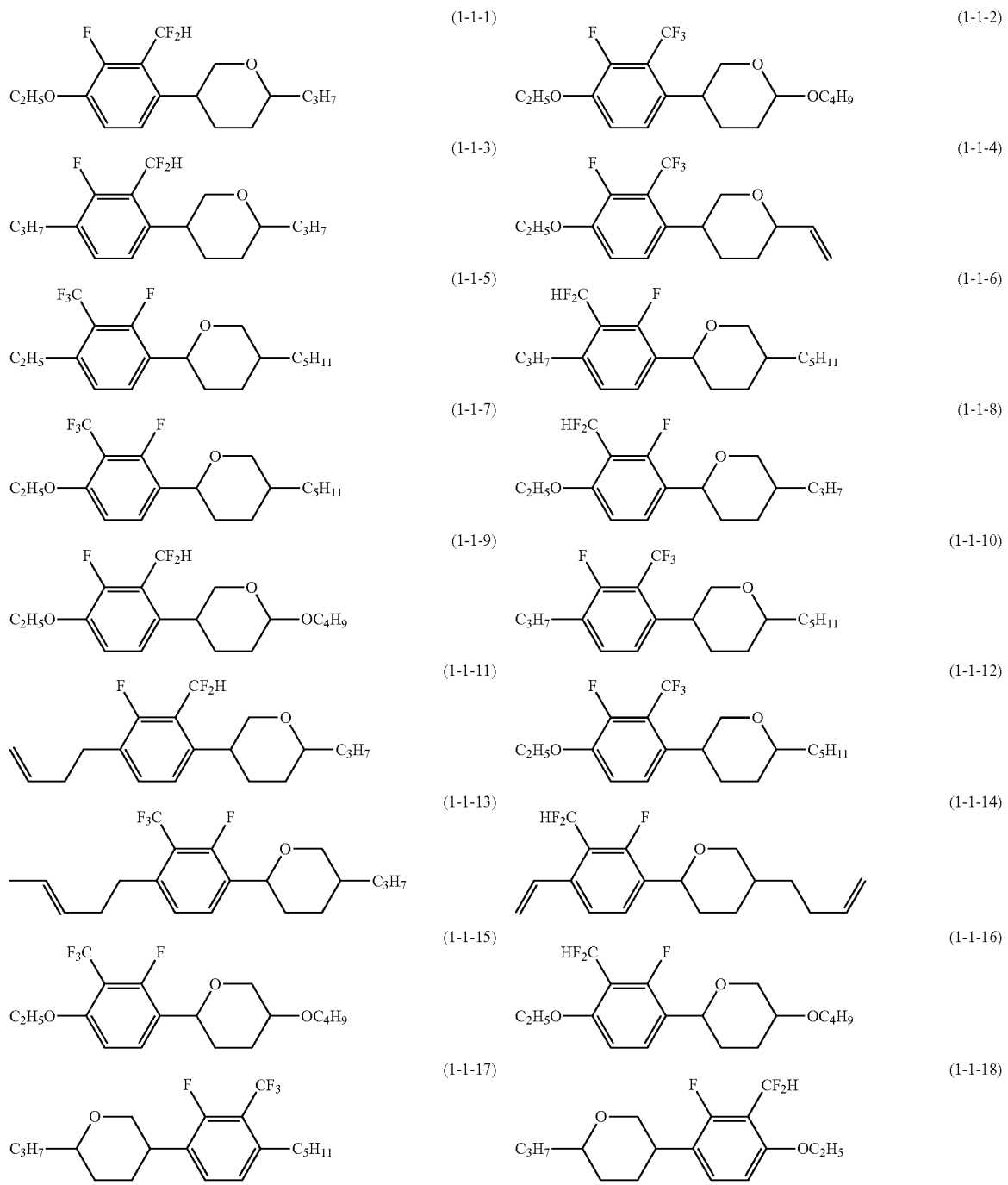

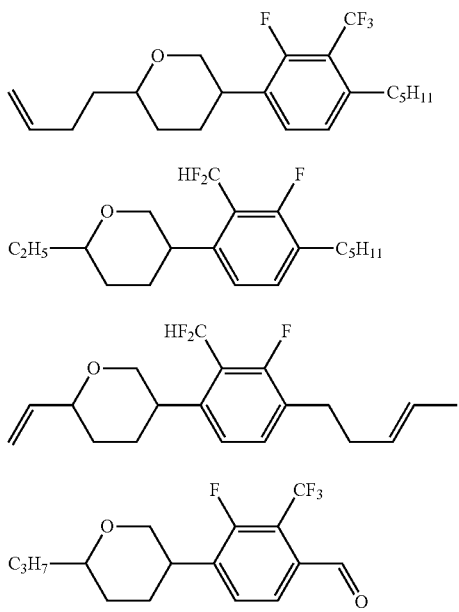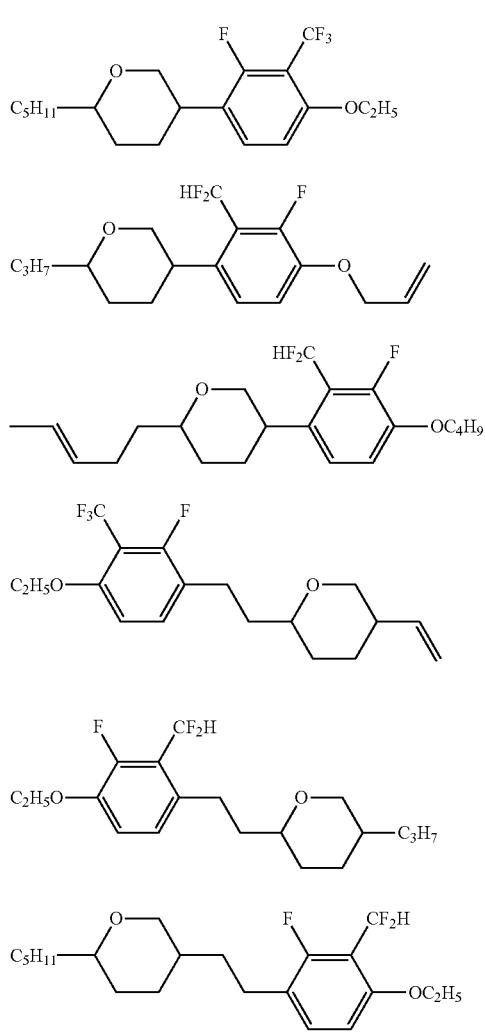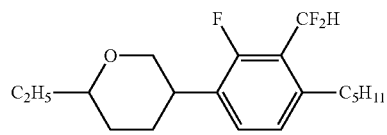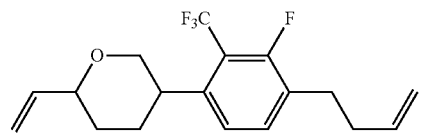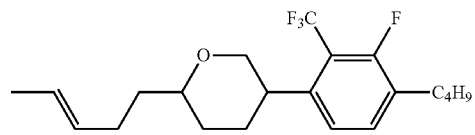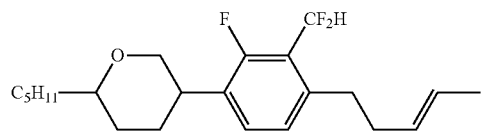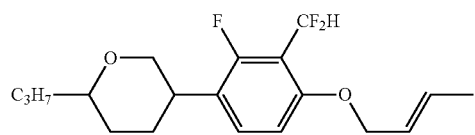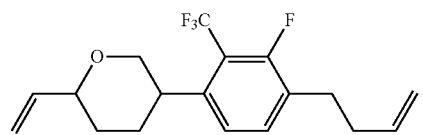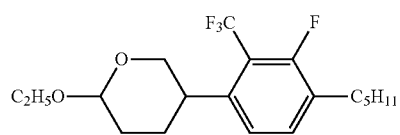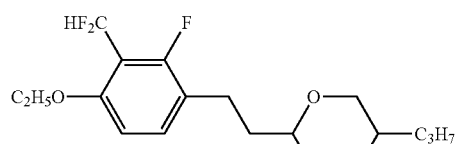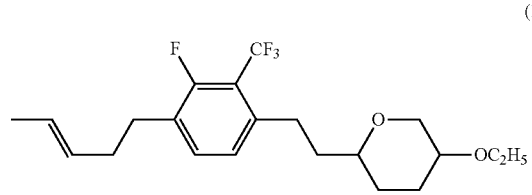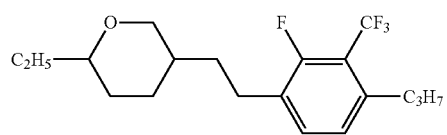

-continued
(1-2-7)
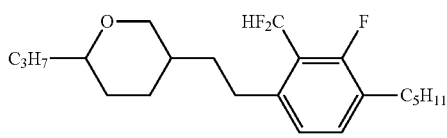
(1-2-8)
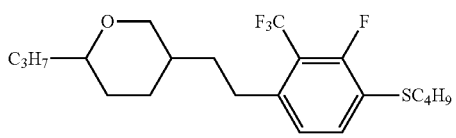
(1-2-9)
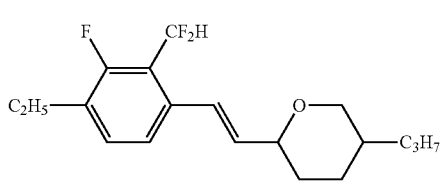
(1-2-10)
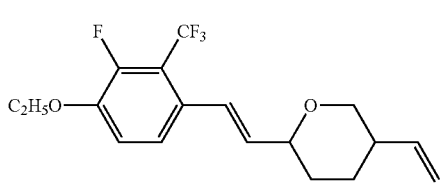
(1-2-11)
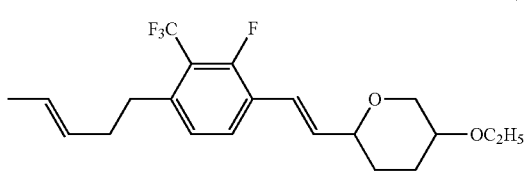
(1-2-12)
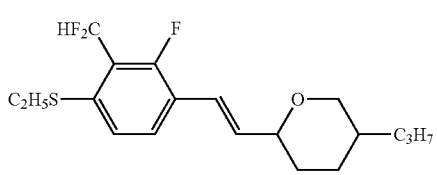
(1-2-13)
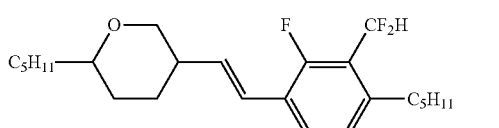
(1-2-14)
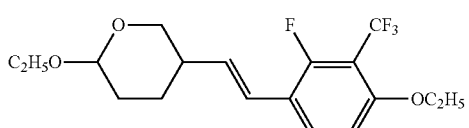
(1-2-15)
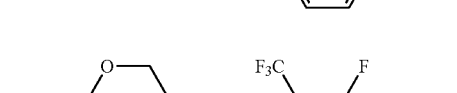
(1-2-16)
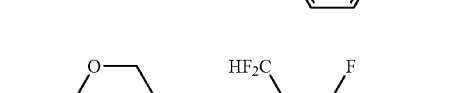
(1-2-17)
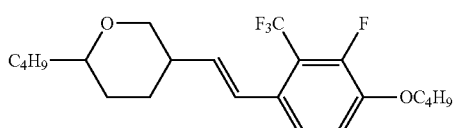
(1-2-18)
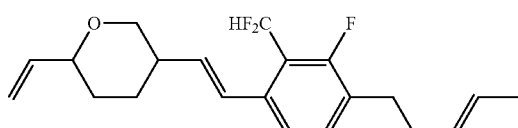
(1-2-19)
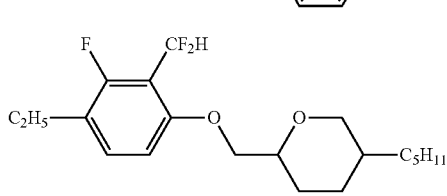
(1-2-20)
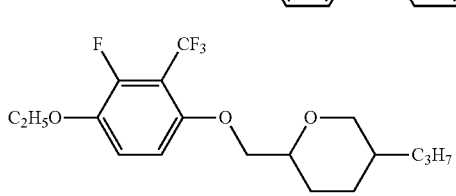
Formula 51
(1-2-21)
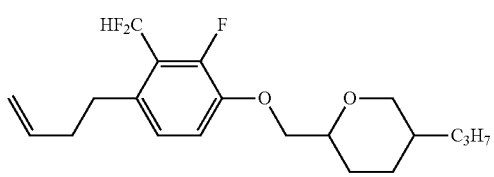
(1-2-22)
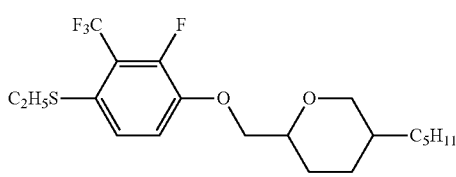
(1-2-23)
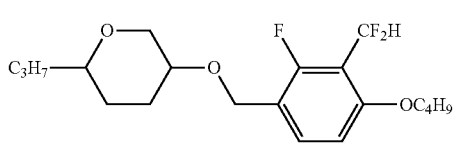
(1-2-24)
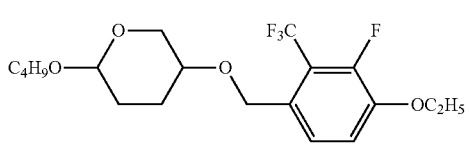
(1-3-1)
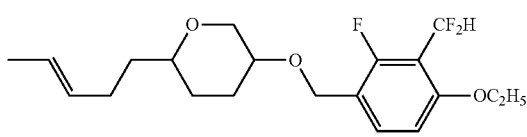
(1-3-2)
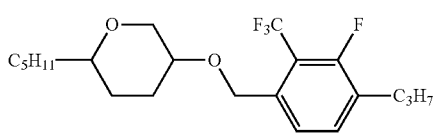

-continued
(1-3-3)
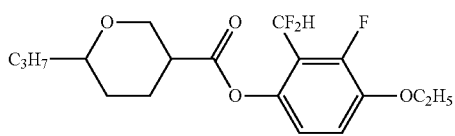
(1-3-4)
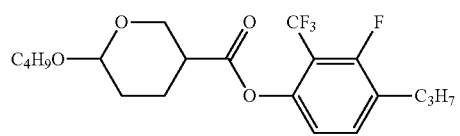
(1-3-5)
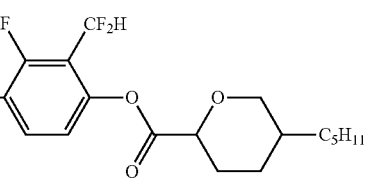
(1-3-6)
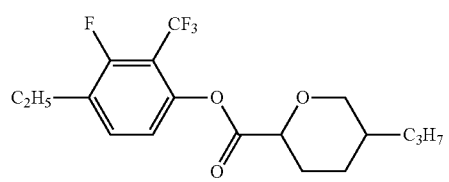
(1-3-7)
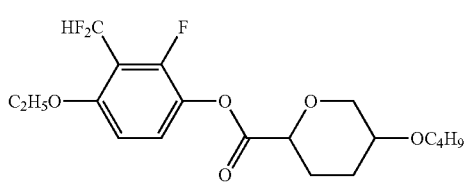
(1-3-8)
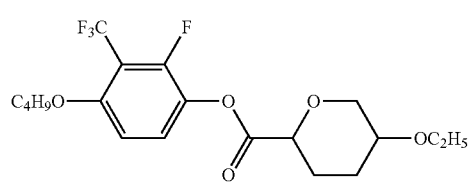
(1-3-9)
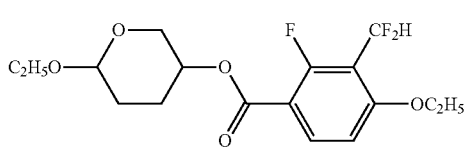
(1-3-10)
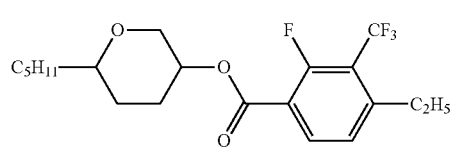
(1-3-11)
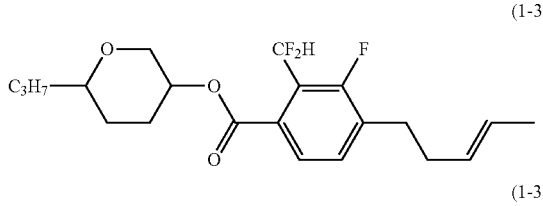
(1-3-12)
(1-3-13)
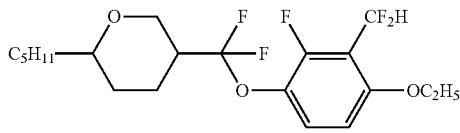
(1-3-14)
(1-3-15)
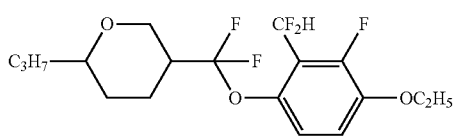
(1-3-16)
(1-3-17)
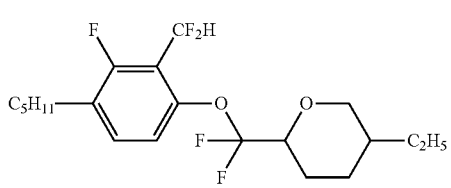
(1-3-18)
(1-3-19)
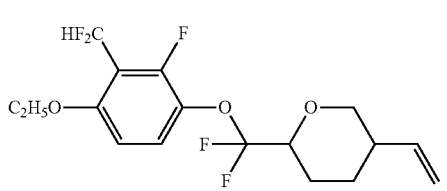
(1-3-20)
(1-3-21)
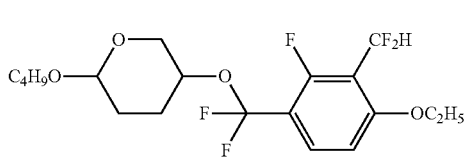
(1-3-22)

-continued
(1-3-23)
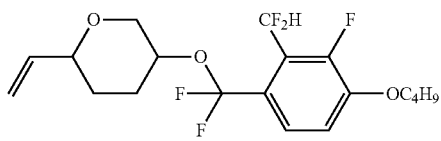
Formula 52
(1-3-24)
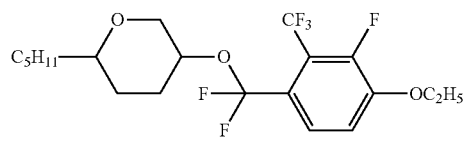
(1-4-1)
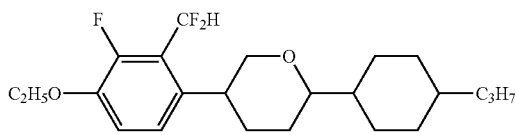
(1-4-2)
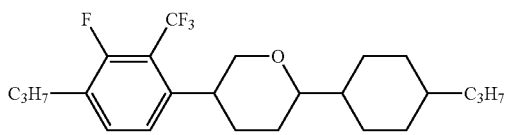
(1-4-3)
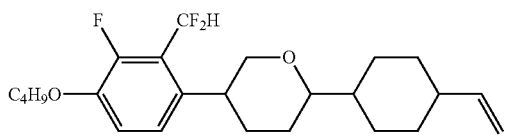
(1-4-4)
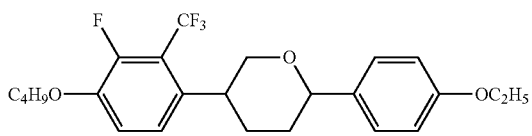
(1-4-5)
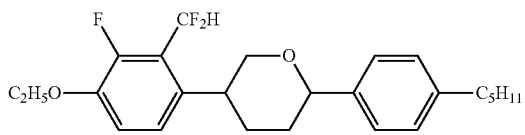
(1-4-6)
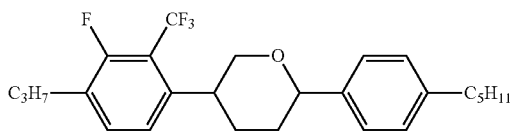
(1-4-7)
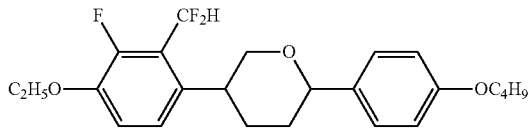
(1-4-8)
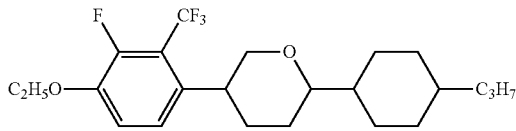
(1-4-9)
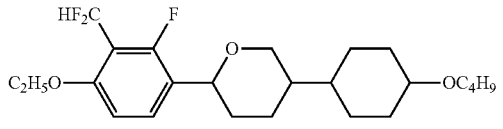
(1-4-10)
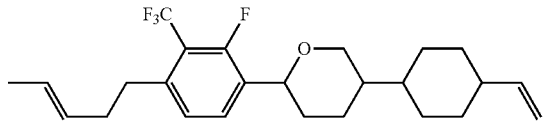
(1-4-11)
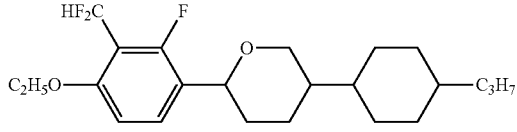
$T_{NI}$: 90.6, Δε: -5.18, Δn: 0.085.
(1-4-12)
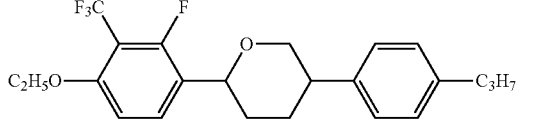
(1-4-13)
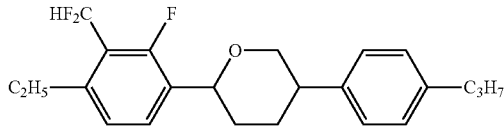
(1-4-14)
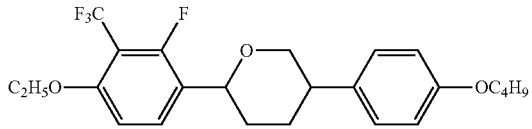
(1-4-15)
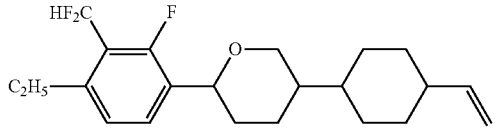
(1-4-16)
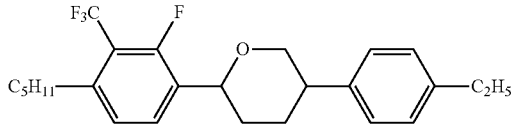

-continued
(1-4-17)
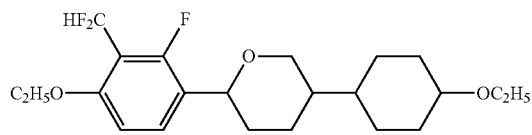
(1-4-18)
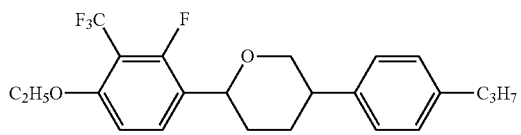
(1-5-1)
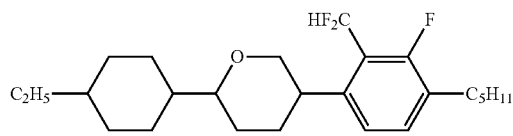
(1-5-2)
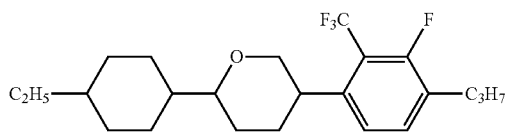
(1-5-3)
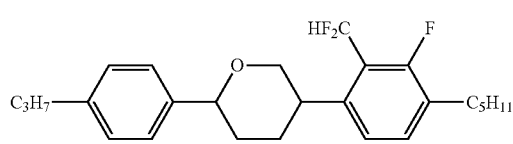
(1-5-4)
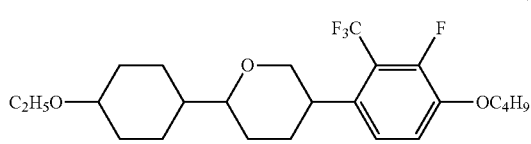
(1-5-5)
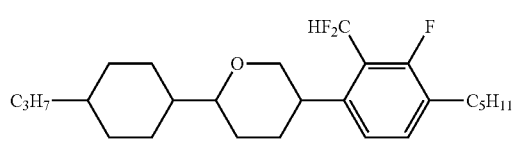
(1-5-6)
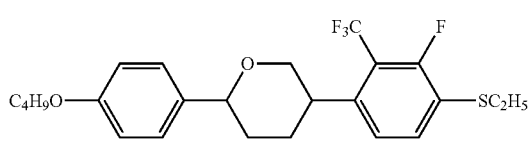
(1-5-7)
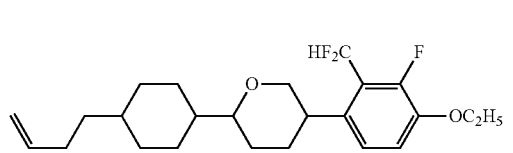
Formula 53
(1-5-8)
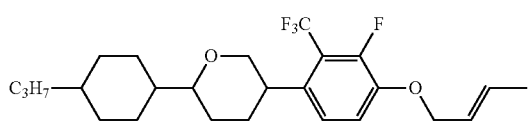
(1-5-9)
(1-5-10)
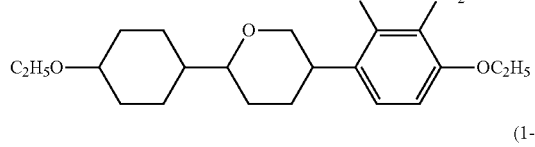
(1-5-11)
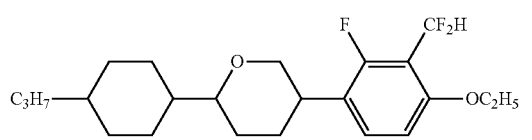
$T_{NI}$: 67.3, $\Delta\epsilon$: -9.16, $\Delta n$: 0.079.
(1-5-12)
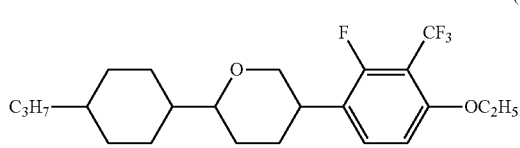
(1-5-13)
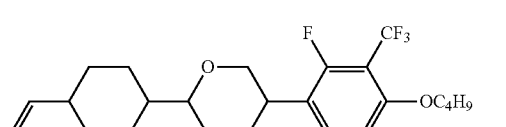
(1-5-14)
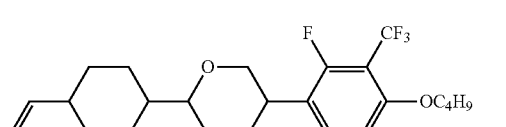
(1-5-15)
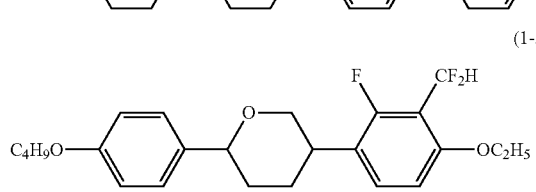
(1-5-16)
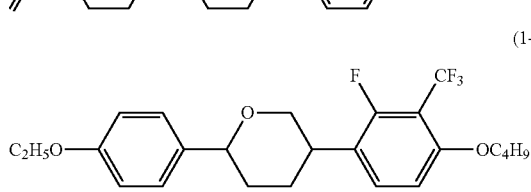

-continued
(1-5-17)
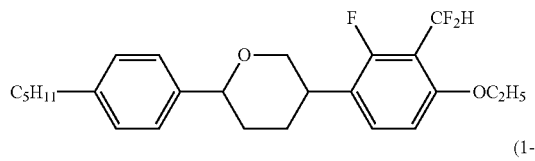
(1-5-18)
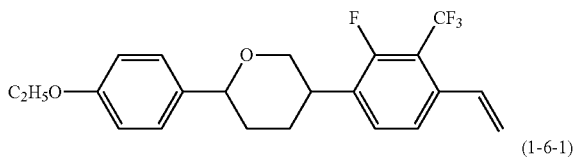
(1-5-19)
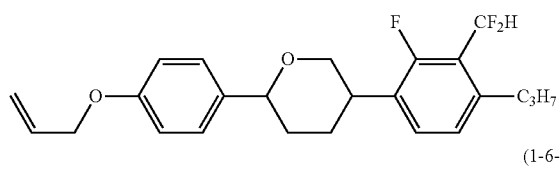
(1-6-1)
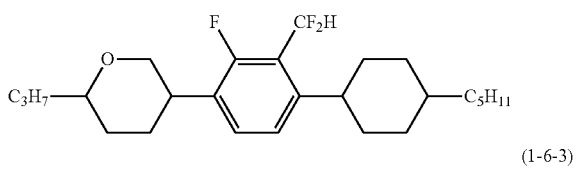
(1-6-2)
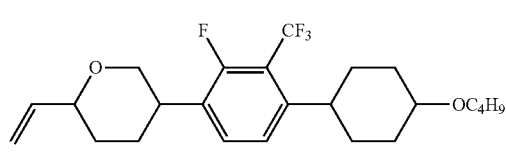
(1-6-3)
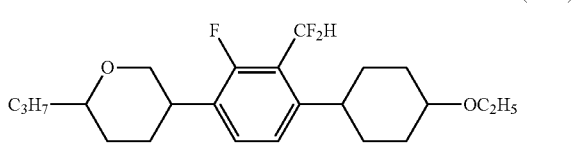
(1-6-4)
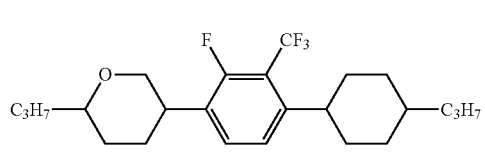
(1-6-5)
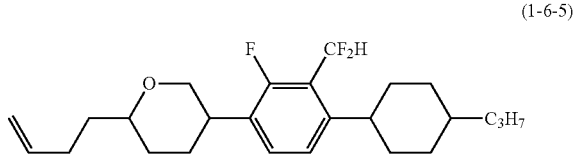
(1-6-6)
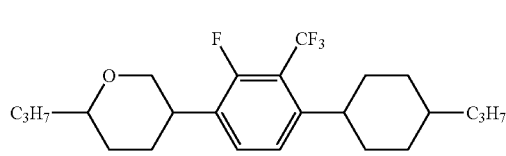
(1-6-7)
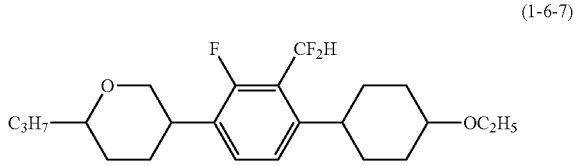
(1-6-8)
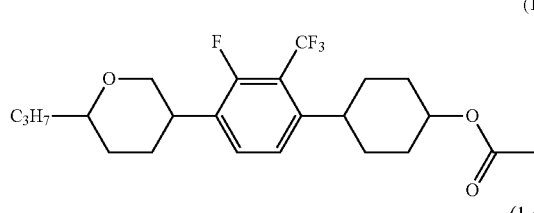
(1-6-9)
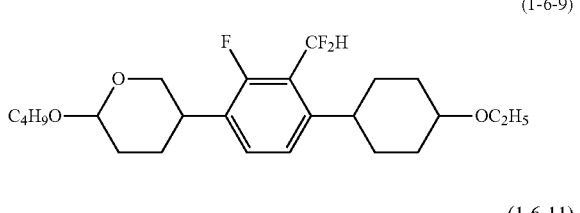
(1-6-10)
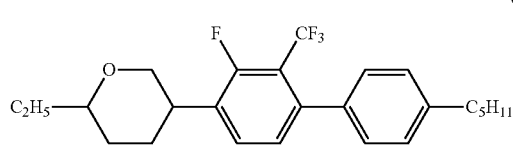
(1-6-11)
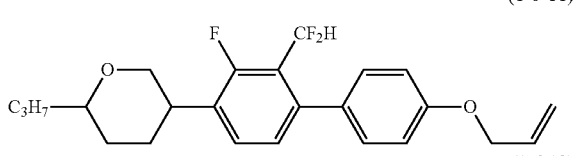
(1-6-12)
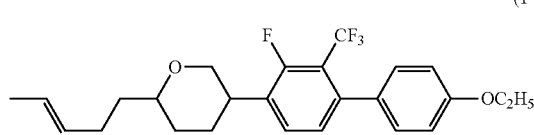
(1-6-13)
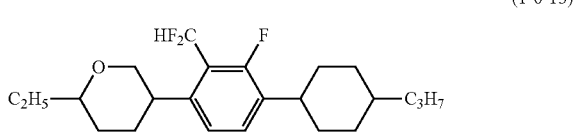
(1-6-14)
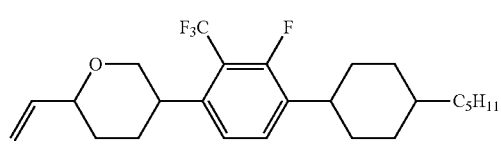
Formula 54
(1-6-15)
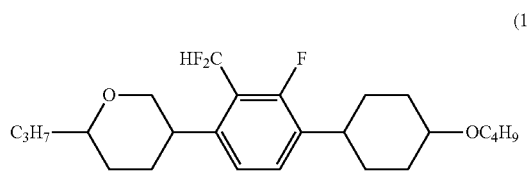
(1-6-16)
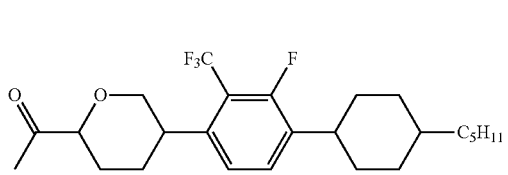

-continued
(1-6-17)
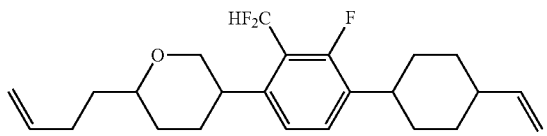
(1-6-18)
(1-6-19)
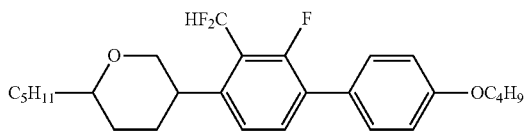
(1-6-20)
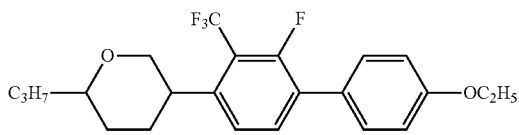
(1-6-21)
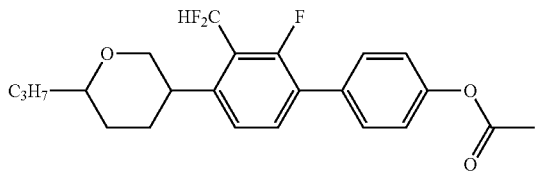
(1-6-22)
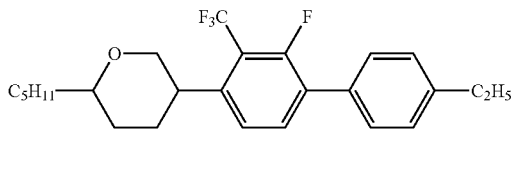
(1-6-23)
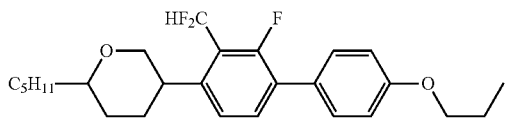
(1-6-24)
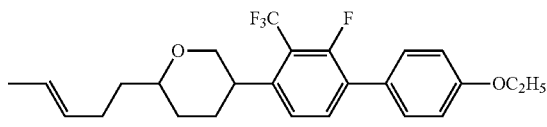
(1-7-1)
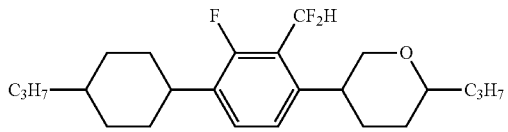
(1-7-2)
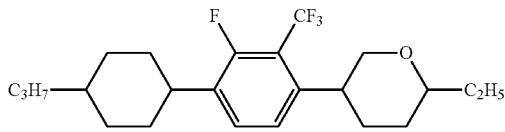
(1-7-3)
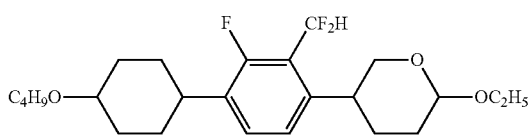
(1-7-4)
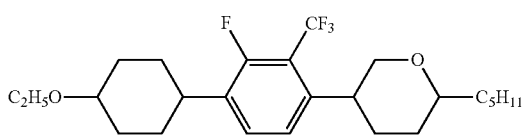
(1-7-5)
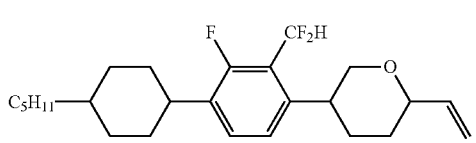
(1-7-6)
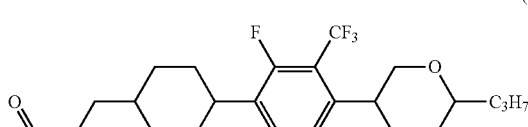
(1-7-7)
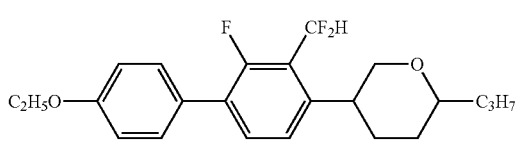
(1-7-8)
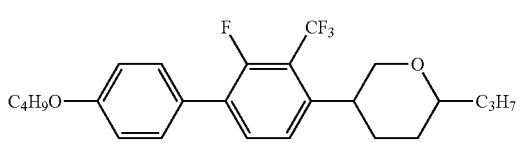
(1-7-9)
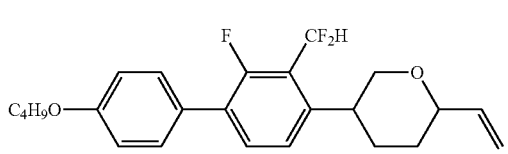
(1-7-10)
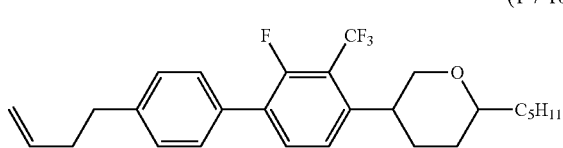

-continued
(1-7-11)
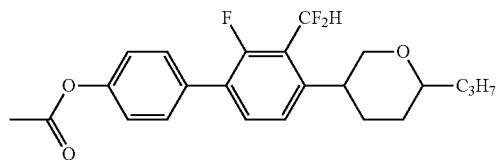
(1-7-12)
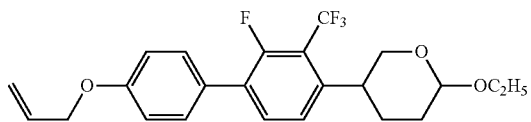
(1-7-13)
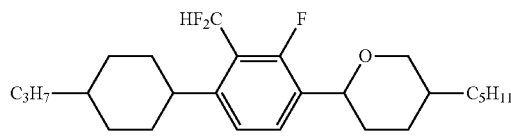
(1-7-14)
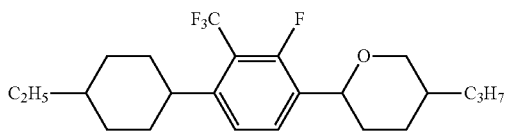
(1-7-15)
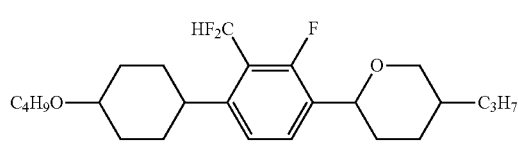
(1-7-16)
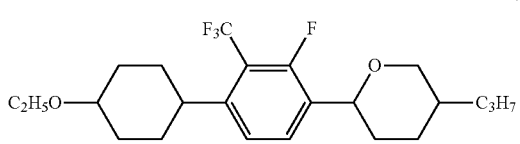
Formula 55
(1-7-17)
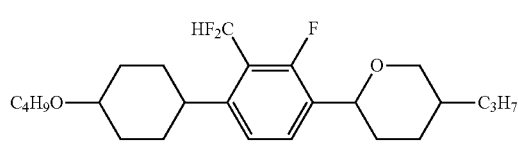
(1-7-18)
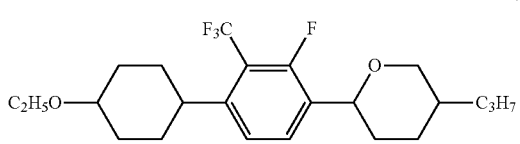
(1-7-19)
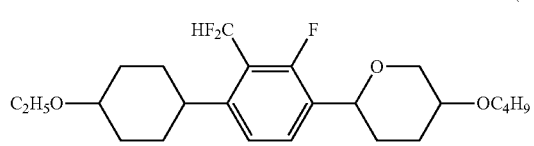
(1-7-20)
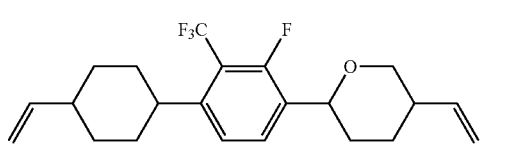
(1-7-21)
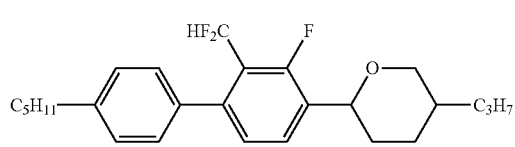
(1-7-22)
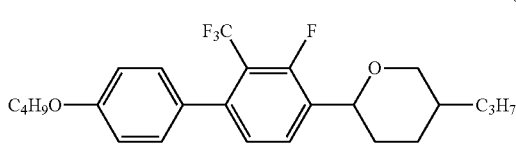
(1-7-23)
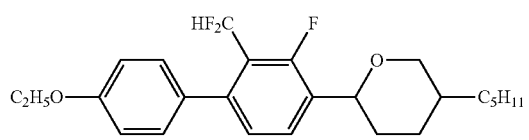
(1-7-24)
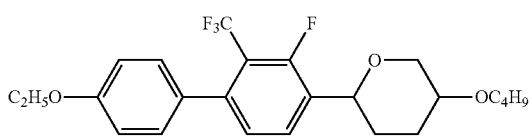
(1-8-1)
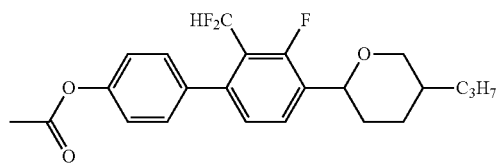
(1-8-2)
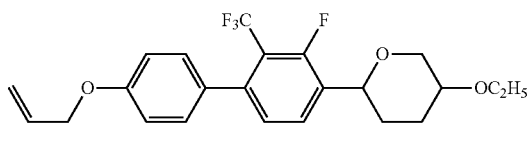
(1-8-3)
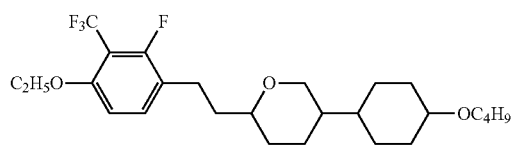
(1-8-4)
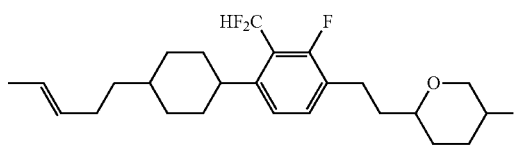
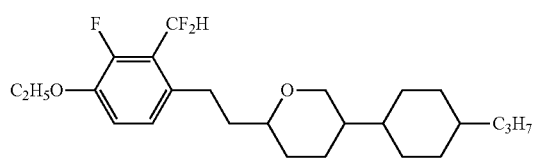
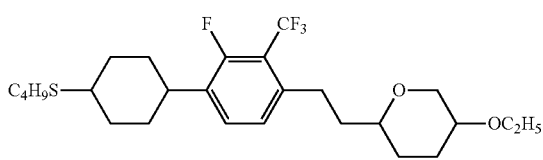

-continued
(1-8-5)
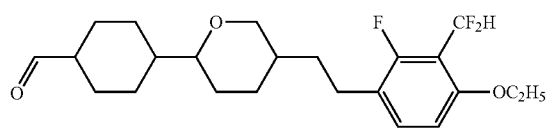
(1-8-6)
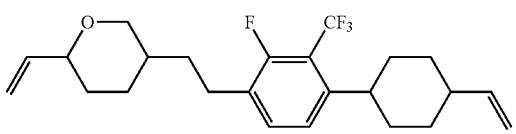
(1-8-7)
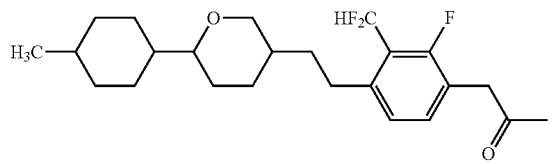
(1-8-8)
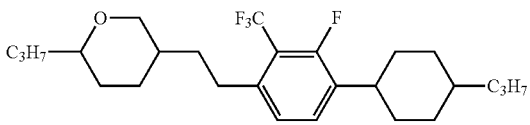
(1-8-9)
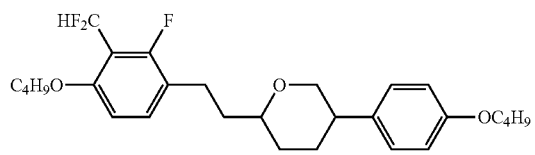
(1-8-10)
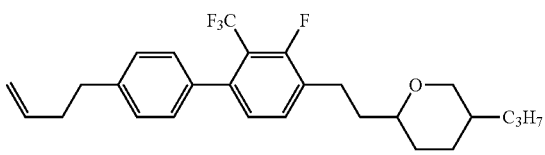
(1-8-11)
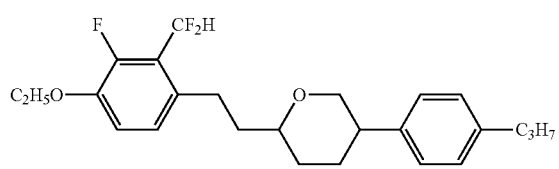
(1-8-12)
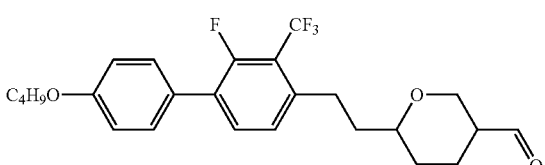
(1-8-13)
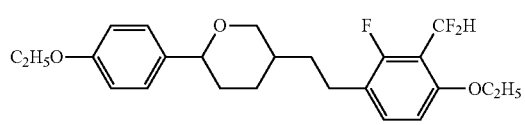
(1-8-14)
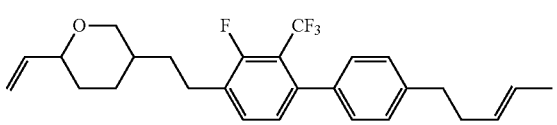
(1-8-15)
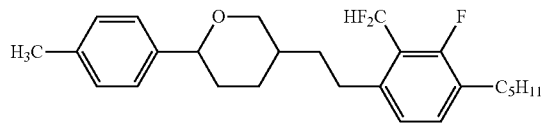
(1-8-16)
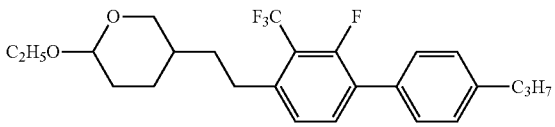
(1-8-17)
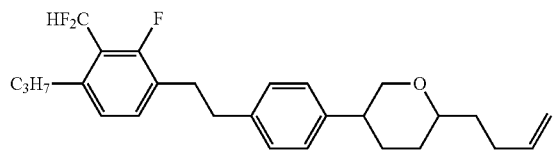
(1-8-18)
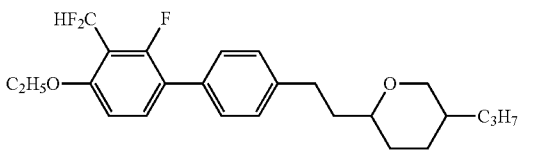
(1-8-19)
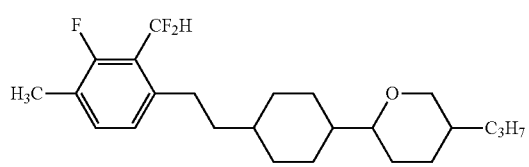
(1-8-20)
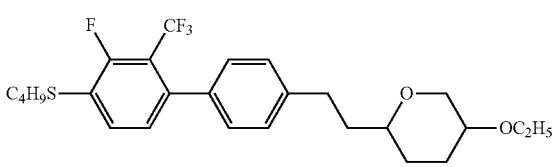
Formula 56
(1-8-21)
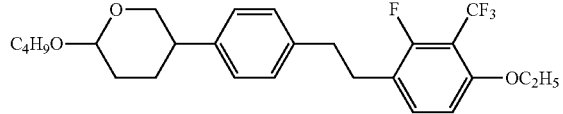
(1-8-22)
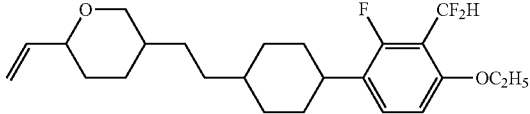

-continued
(1-8-23)
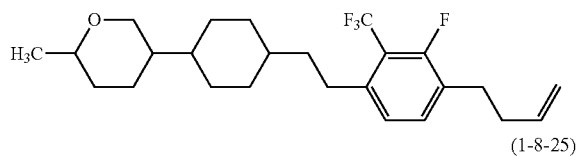
(1-8-24)
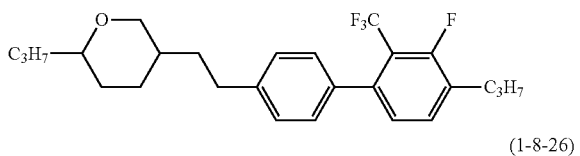
(1-8-25)
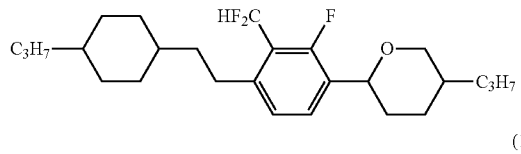
(1-8-26)
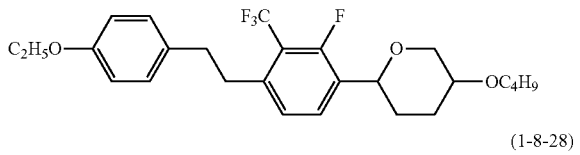
(1-8-27)
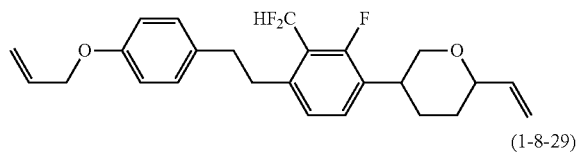
(1-8-28)
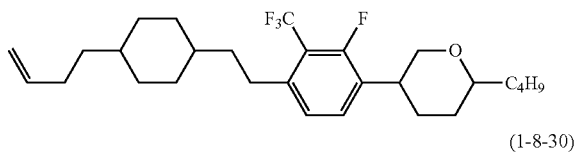
(1-8-29)
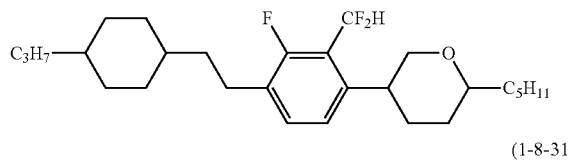
(1-8-30)
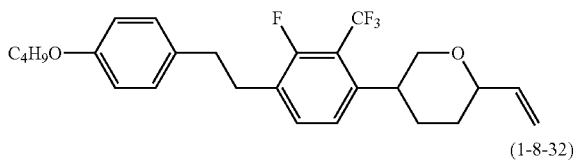
(1-8-31)
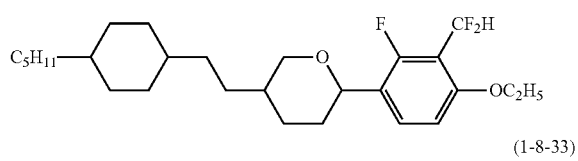
(1-8-32)
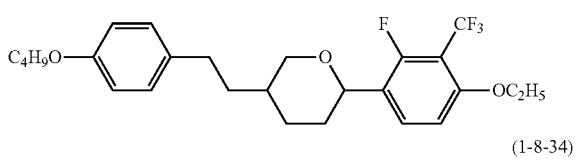
(1-8-33)
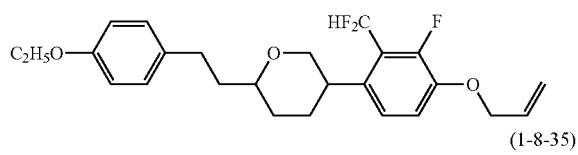
(1-8-34)
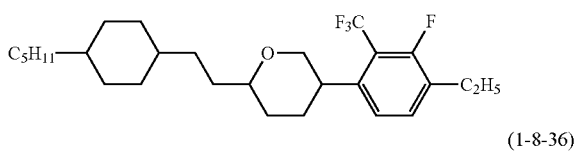
(1-8-35)
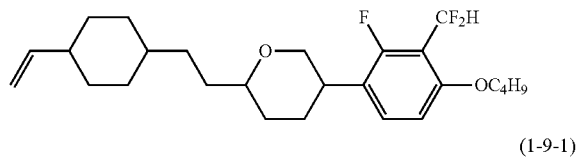
(1-8-36)
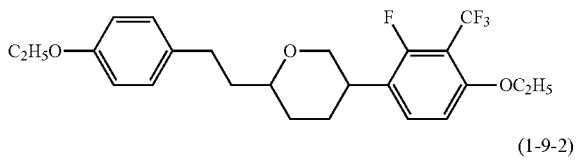
(1-9-1)
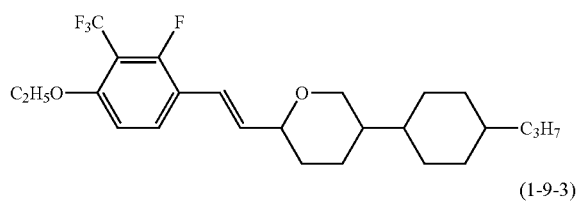
(1-9-2)
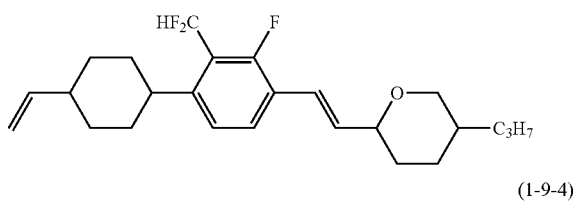
(1-9-3)
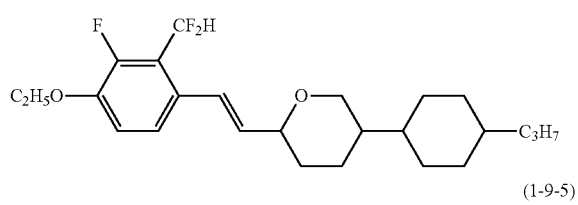
(1-9-4)
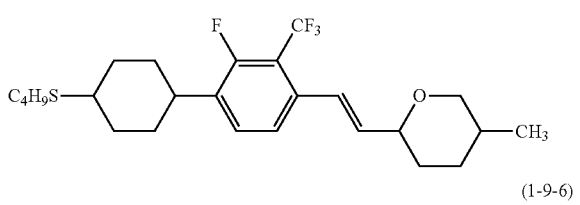
(1-9-5)
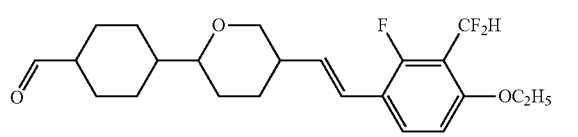
(1-9-6)
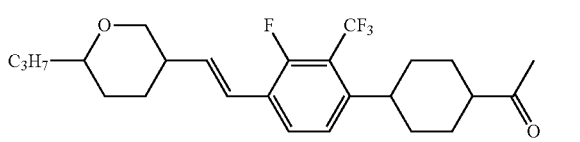

-continued
(1-9-7)
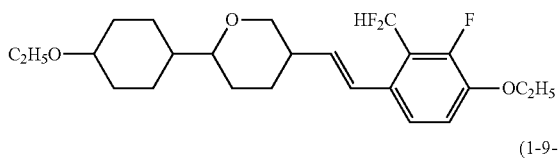
(1-9-8)
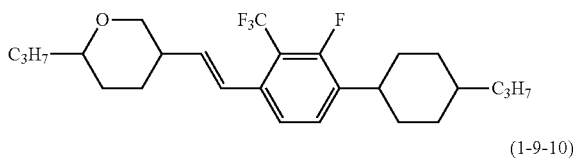
(1-9-9)
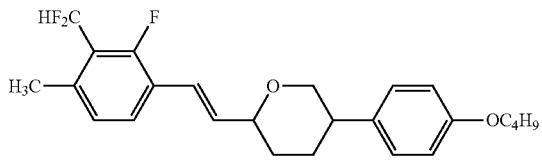
Formula 57
(1-9-10)
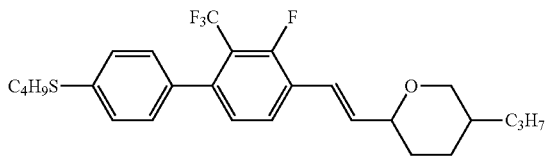
(1-9-11)
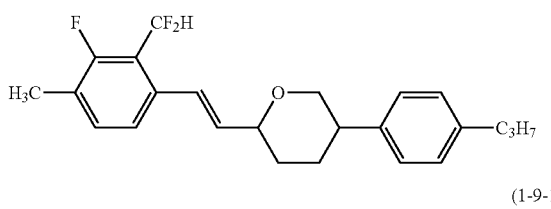
(1-9-12)
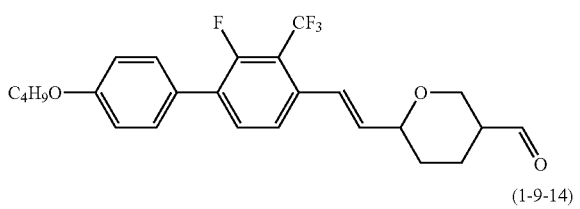
(1-9-13)
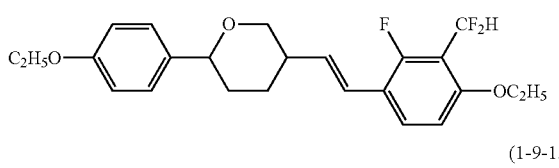
(1-9-14)
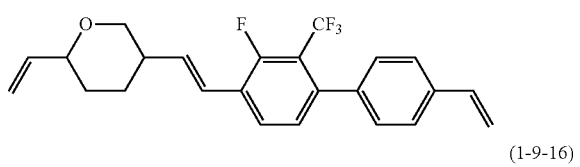
(1-9-15)
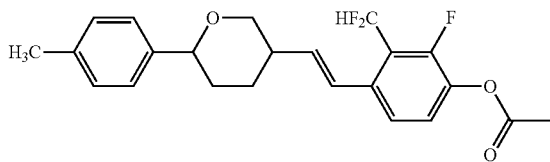
(1-9-16)
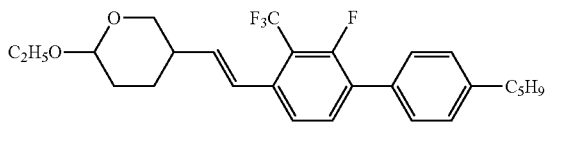
(1-9-17)
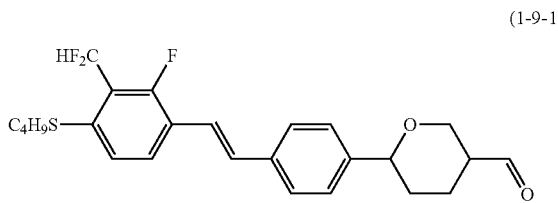
(1-9-18)
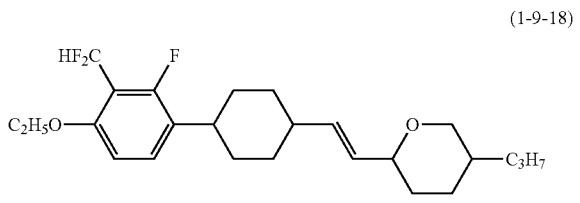
(1-9-19)
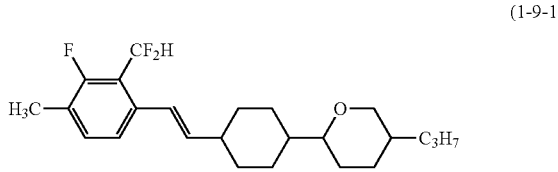
(1-9-20)
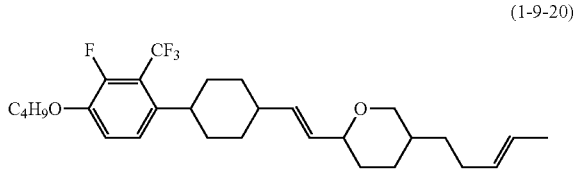
(1-9-21)
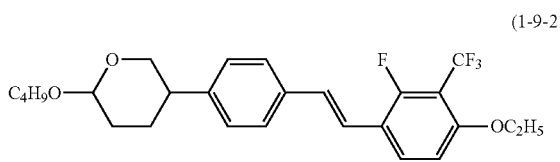
(1-9-22)
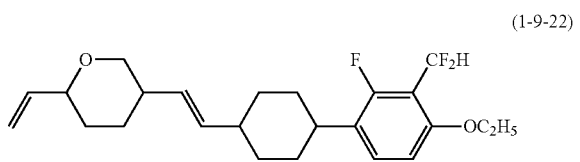
(1-9-23)
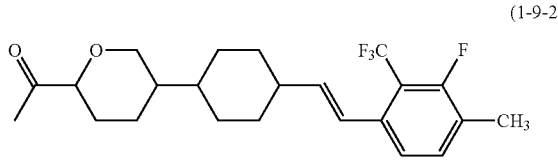
(1-9-24)
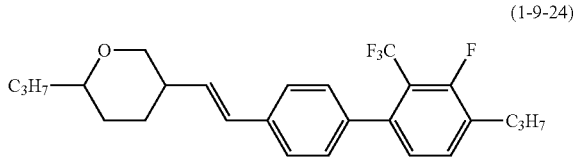

-continued
(1-9-25)
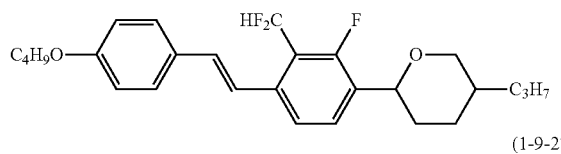
(1-9-26)
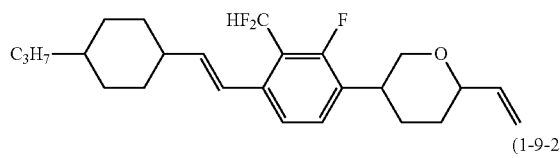
(1-9-27)
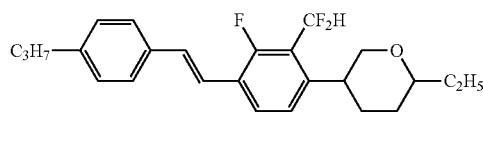
(1-9-28)
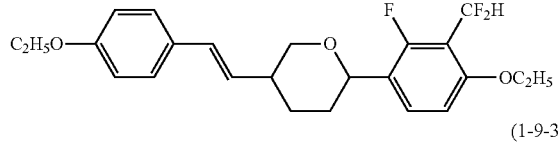
(1-9-29)
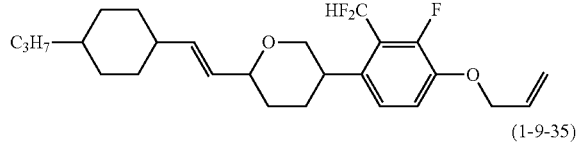
(1-9-30)
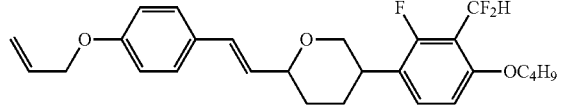
(1-9-31)
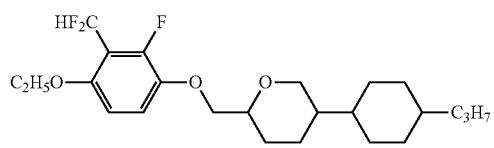
(1-9-32)
(1-9-33)
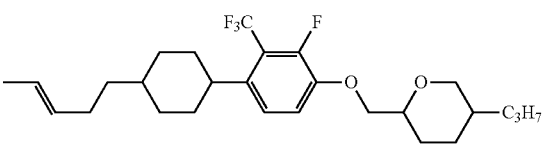
(1-9-34)
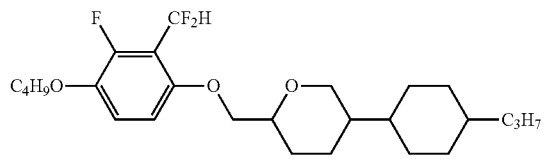
(1-9-35)
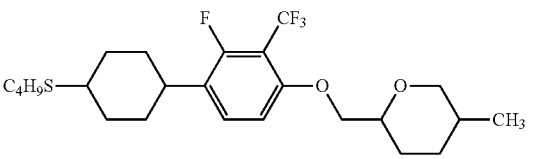
(1-9-36)
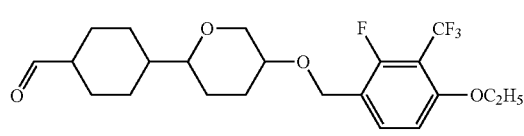
Formula 58
(1-10-1)
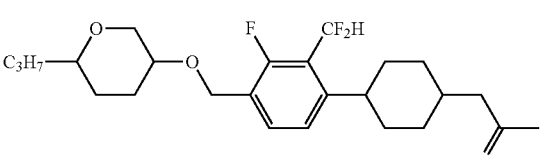
(1-10-2)
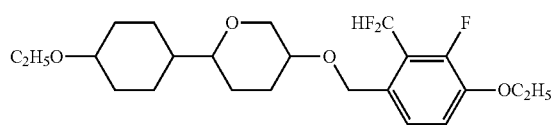
(1-10-3)
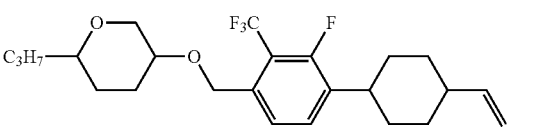
(1-10-4)
(1-10-5)
(1-10-6)
(1-10-7)
(1-10-8)

-continued
(1-10-9)
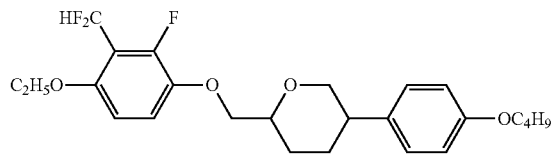
(1-10-10)
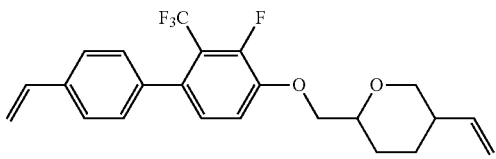
(1-10-11)
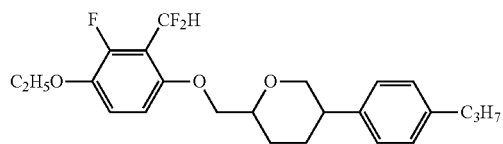
(1-10-12)
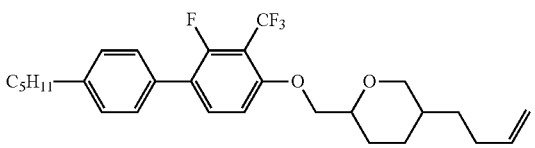
(1-10-13)
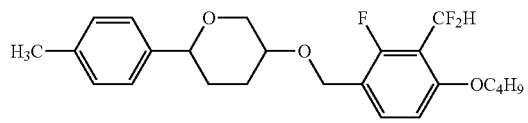
(1-10-14)
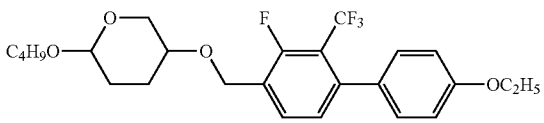
(1-10-15)
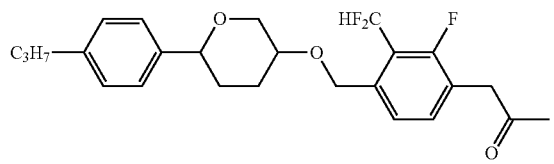
(1-10-16)
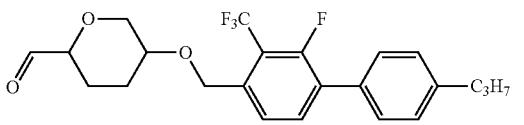
(1-10-17)
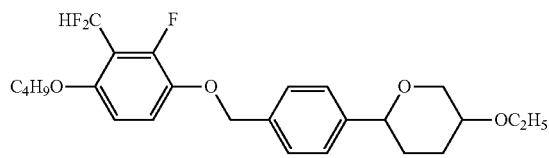
(1-10-18)
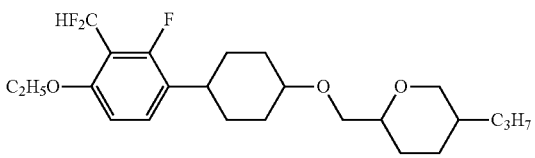
(1-10-19)
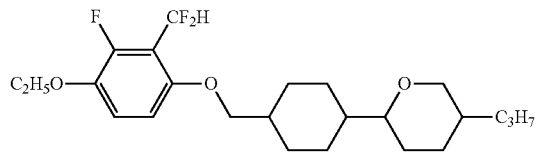
(1-10-20)
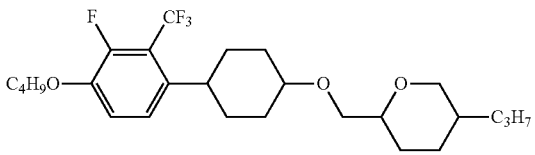
(1-10-21)
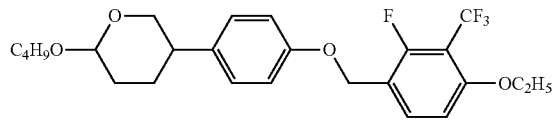
(1-10-22)
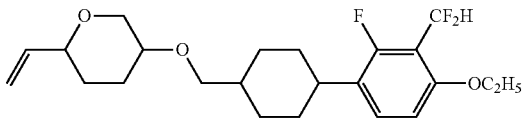
(1-10-23)
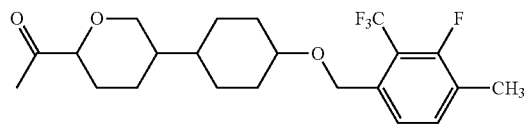
(1-10-24)
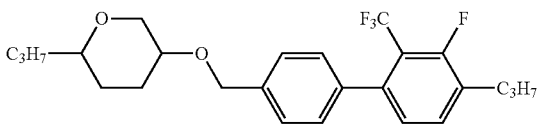
(1-10-25)
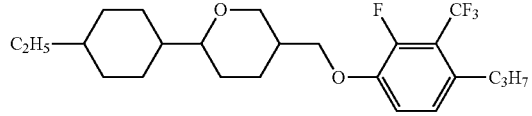
(1-10-26)
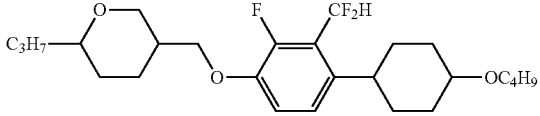

-continued
(1-10-27)
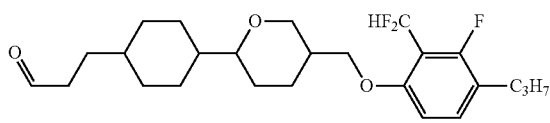
(1-10-28)
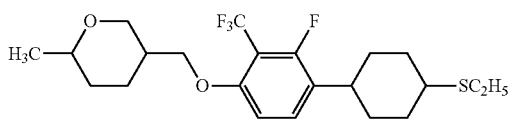
Formula 59
(1-10-29)
(1-10-30)
(1-10-31)
(1-10-32)
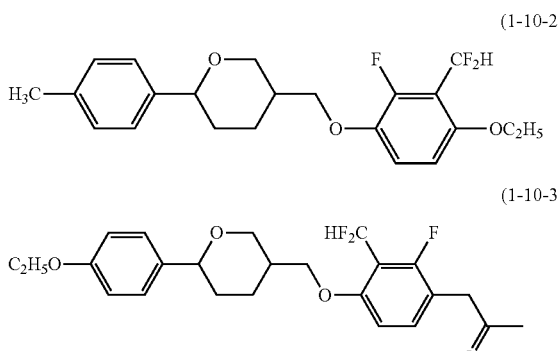
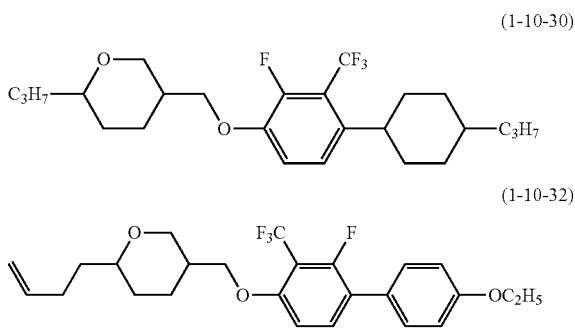
(1-10-33)
(1-10-34)
(1-10-35)
(1-10-36)
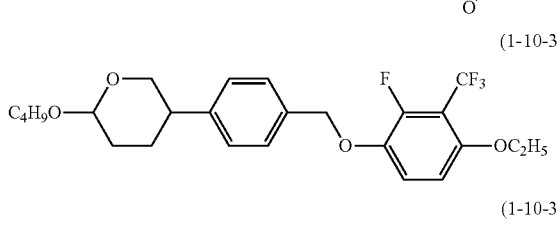
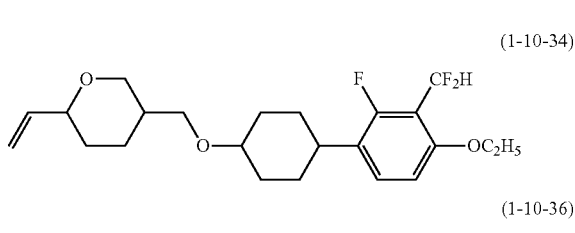
(1-10-37)
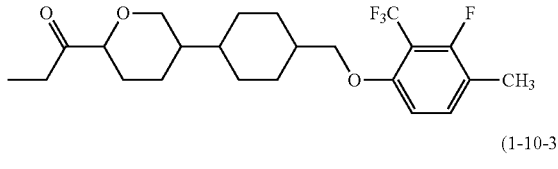
(1-10-38)
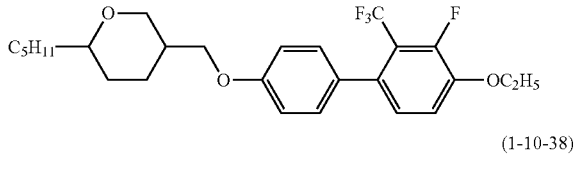
(1-10-39)
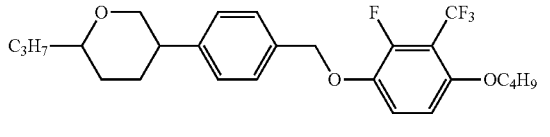
(1-10-40)
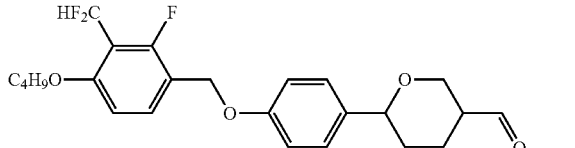
(1-10-41)
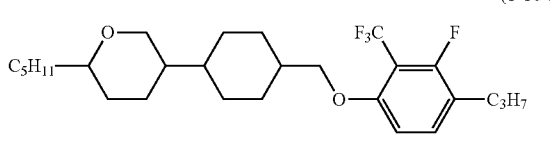
(1-10-42)
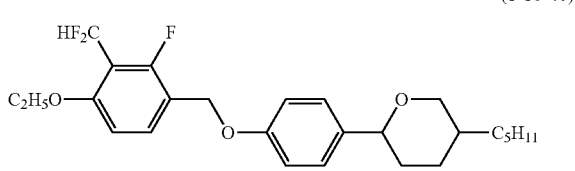
(1-10-43)
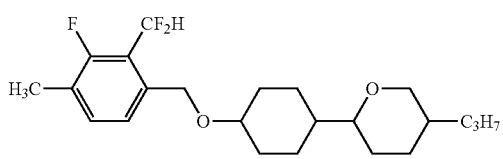
(1-10-44)
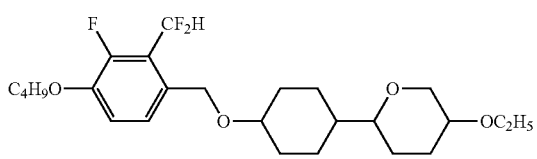
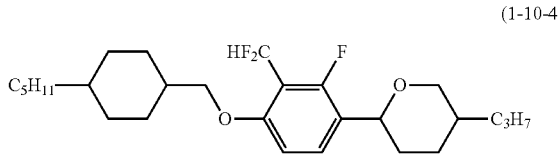
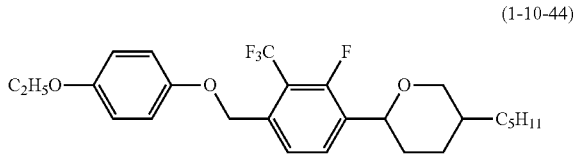

-continued
(1-10-45)
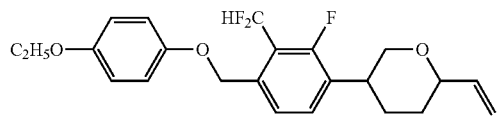
(1-10-46)
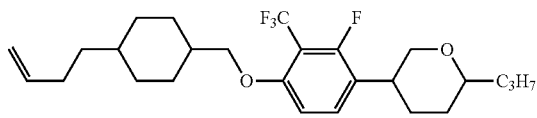
(1-10-47)
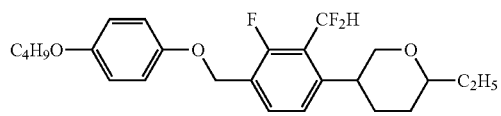
(1-10-48)
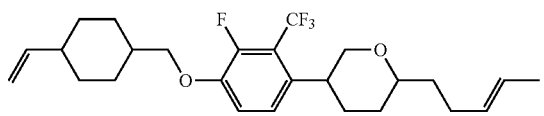
(1-10-49)
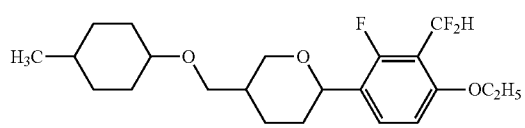
(1-10-50)
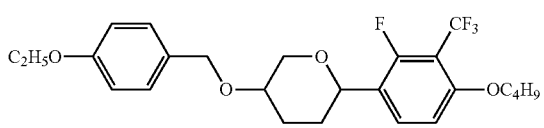
(1-10-51)
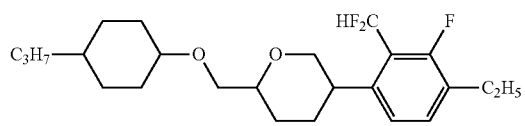
(1-10-52)
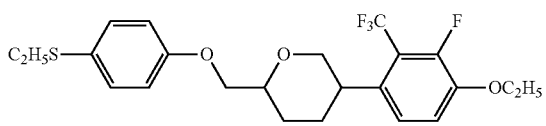
(1-10-53)
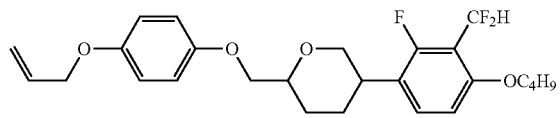
(1-10-54)
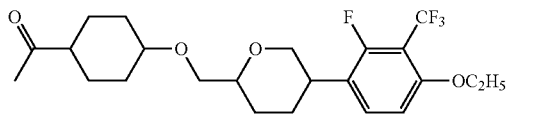
Formula 60
(1-11-1)
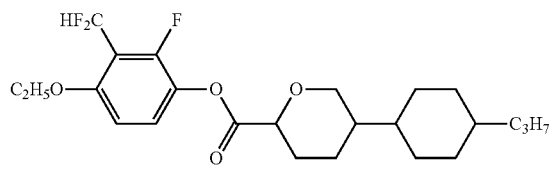
(1-11-2)
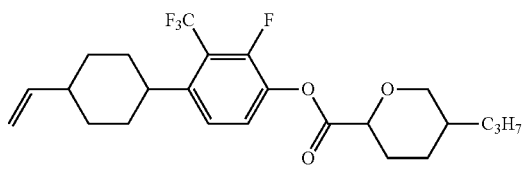
(1-11-3)
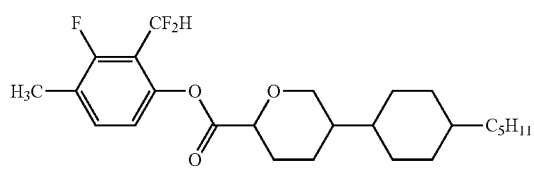
(1-11-4)
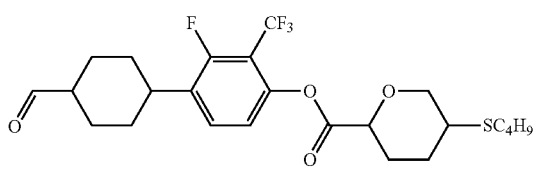
(1-11-5)
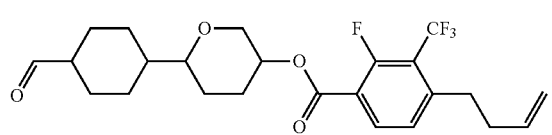
(1-11-6)
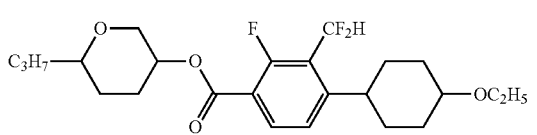
(1-11-7)
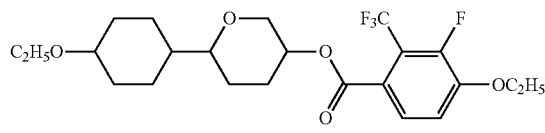
(1-11-8)
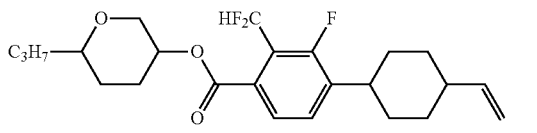

(1-11-9)
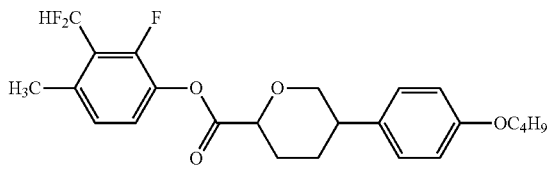
(1-11-10)
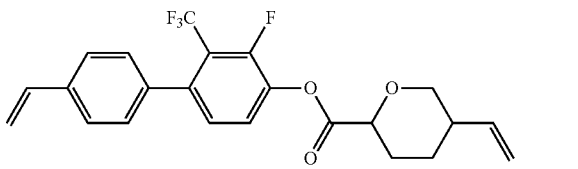
(1-11-11)
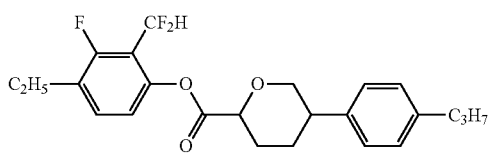
(1-11-12)
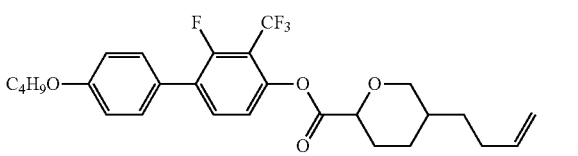
(1-11-13)
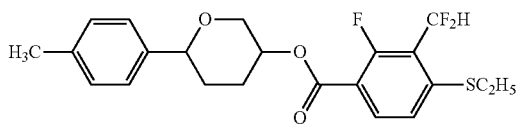
(1-11-14)
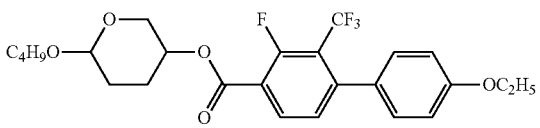
(1-11-15)
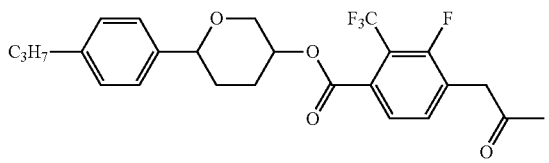
(1-11-16)
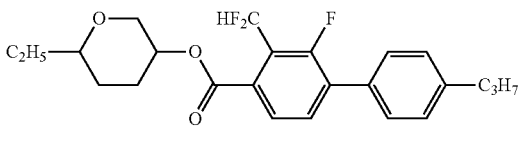
(1-11-17)
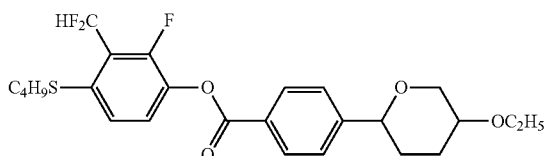
(1-11-18)
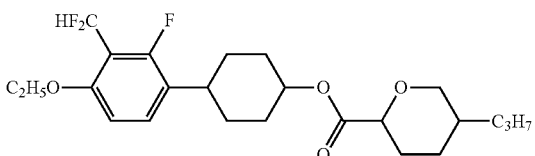
(1-11-19)
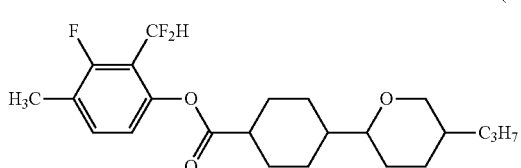
(1-11-20)
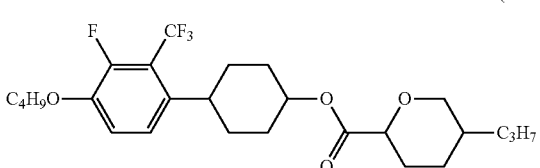
(1-11-21)
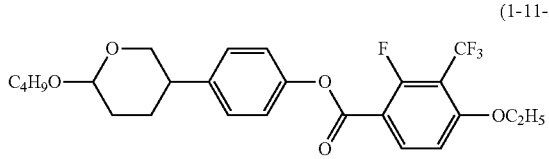
(1-11-22)
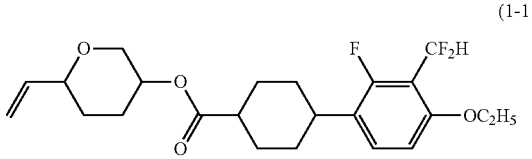
(1-11-23)
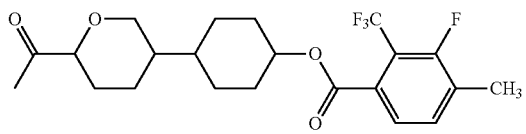
(1-11-24)
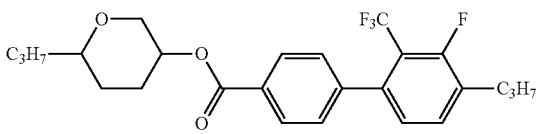
(1-11-25)
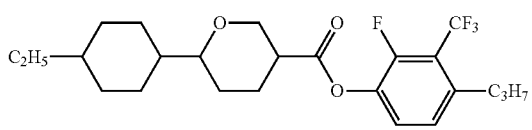
(1-11-26)
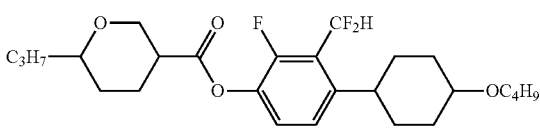

-continued
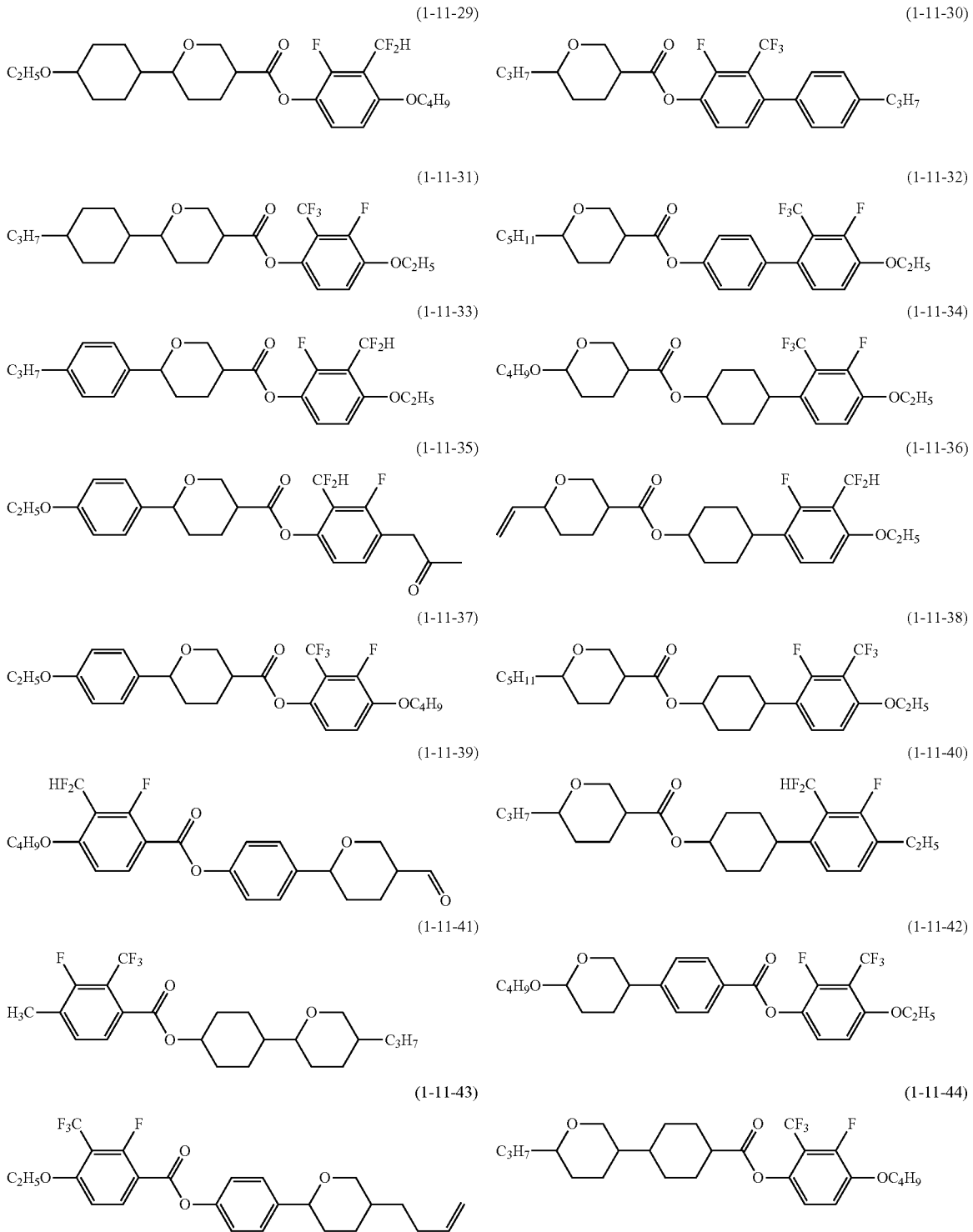

-continued
(1-11-45)
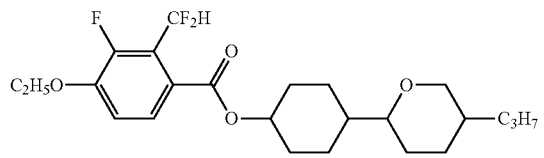
(1-11-46)
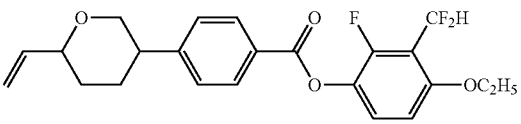
(1-11-47)
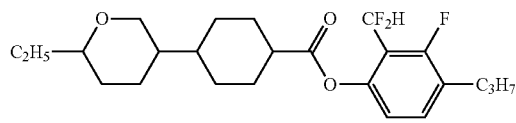
(1-11-48)
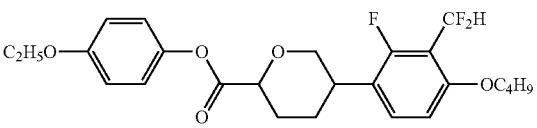
(1-11-49)
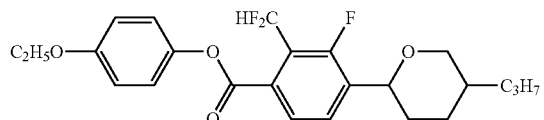
(1-11-50)
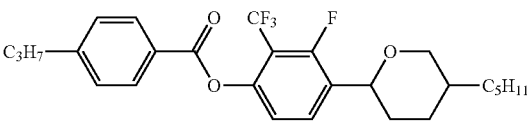
(1-11-51)
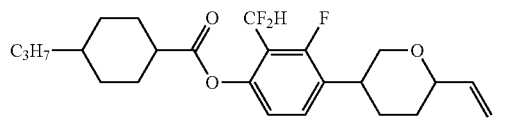
(1-11-52)
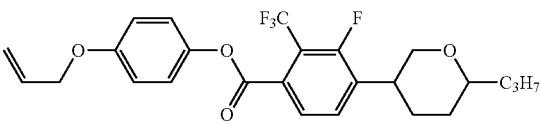
(1-11-53)
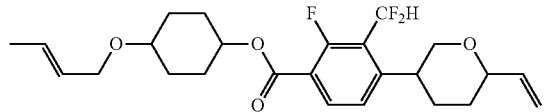
(1-11-54)
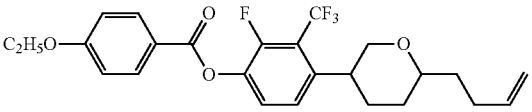
Formula 62
(1-11-55)
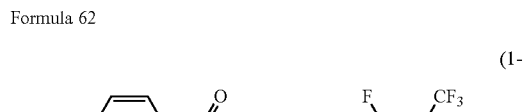
(1-11-56)
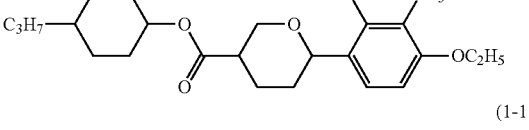
(1-11-57)
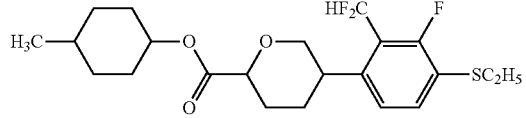
(1-11-58)
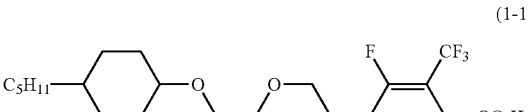
(1-11-59)
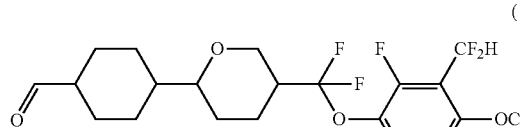
(1-11-60)
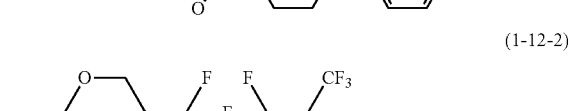
(1-12-1)
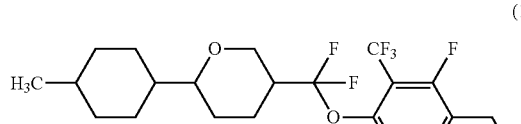
(1-12-2)
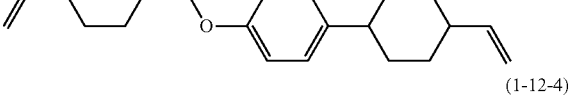
(1-12-3)
(1-12-4)

-continued
(1-12-5)
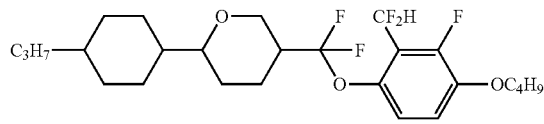
(1-12-6)
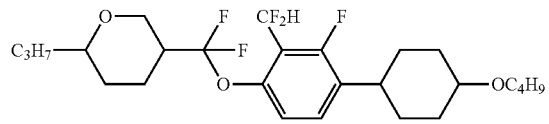
(1-12-7)
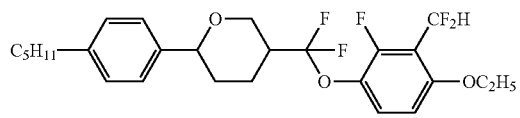
(1-12-8)
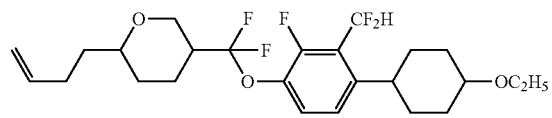
(1-12-9)
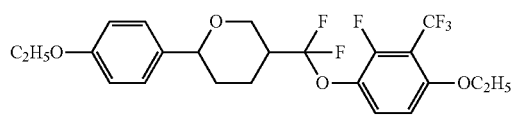
(1-12-10)
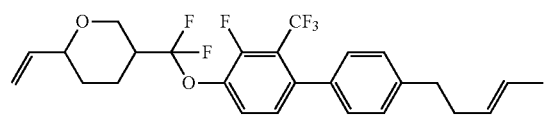
(1-12-11)
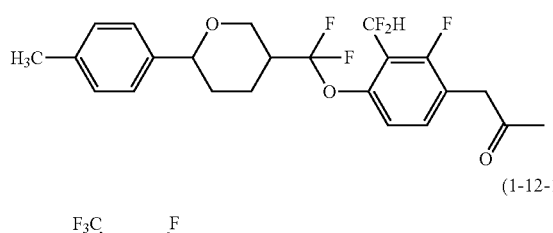
(1-12-12)
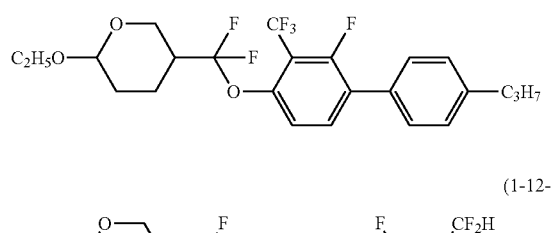
(1-12-13)
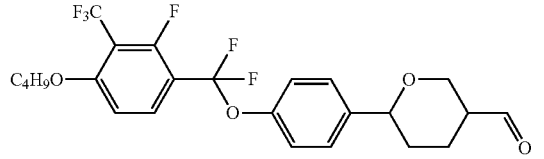
(1-12-14)
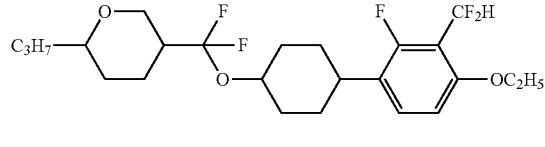
(1-12-15)
(1-12-16)
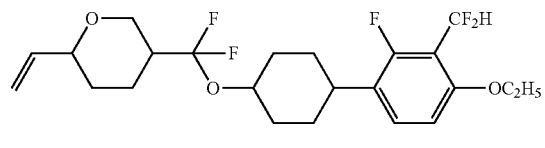
(1-11-57)
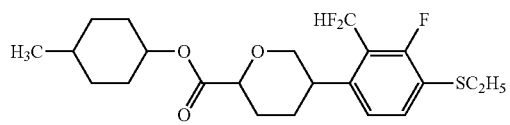
(1-11-58)
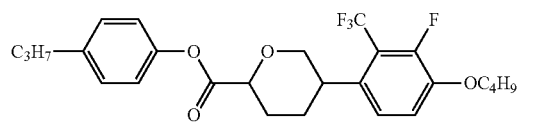
(1-12-17)
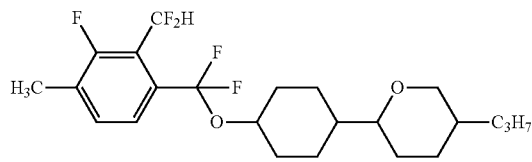
(1-12-18)
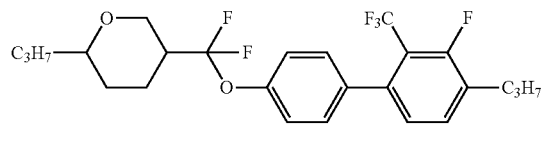
(1-12-19)
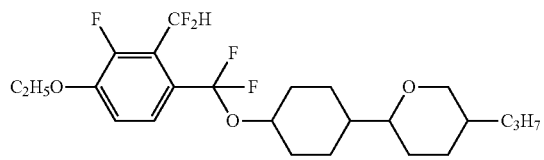
(1-12-20)

Formula 63
(1-12-21)
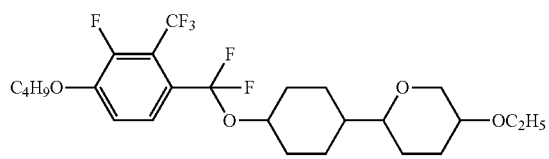
(1-12-22)
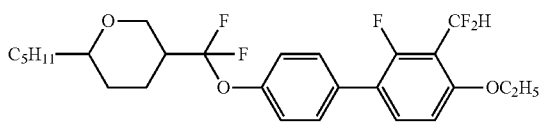
(1-12-23)
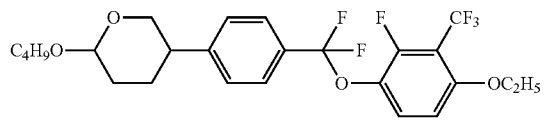
(1-12-24)
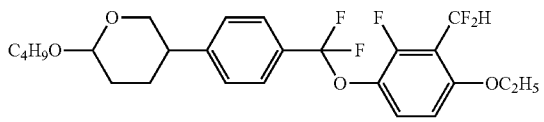
(1-12-25)
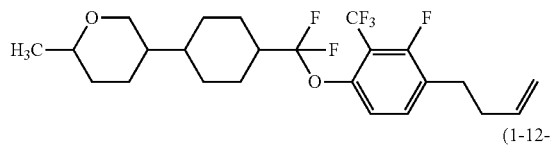
(1-12-26)
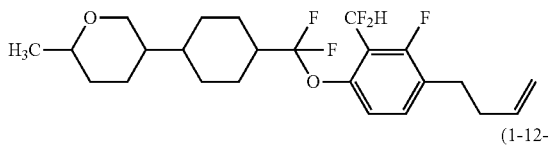
(1-12-27)
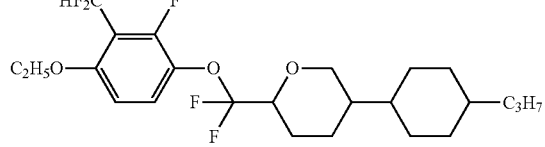
(1-12-28)
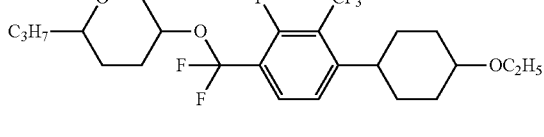
(1-12-29)
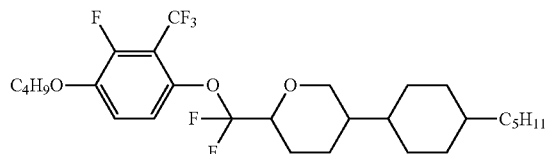
(1-12-30)
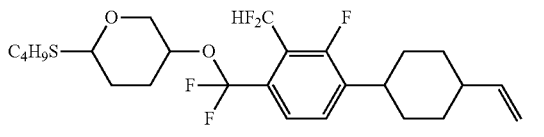
(1-12-31)
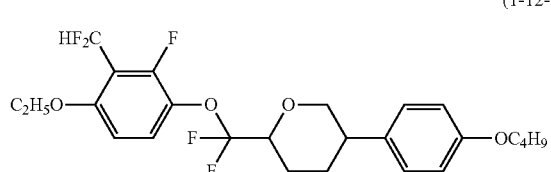
(1-12-32)
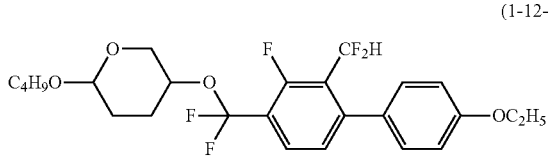
(1-12-33)
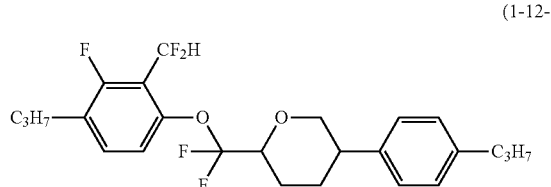
(1-12-34)
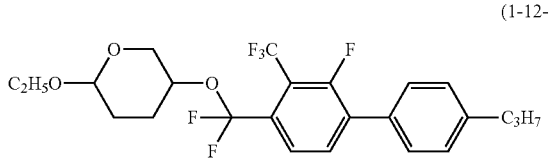
(1-12-35)
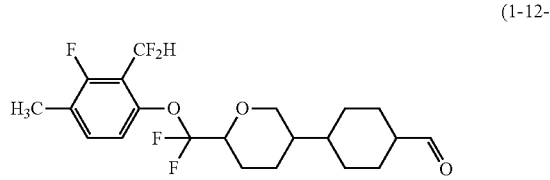
(1-12-36)
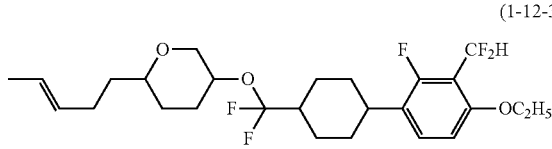
(1-12-37)
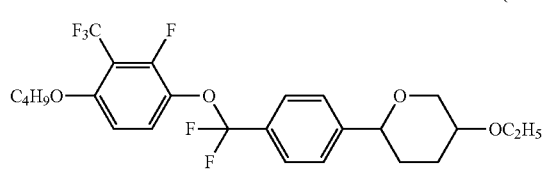
(1-12-38)
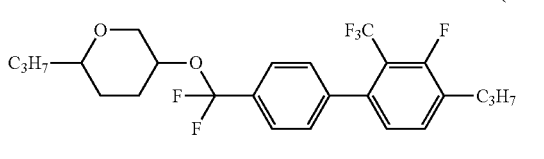

-continued

-continued
(1-12-55)
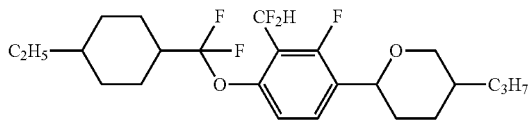
(1-12-56)
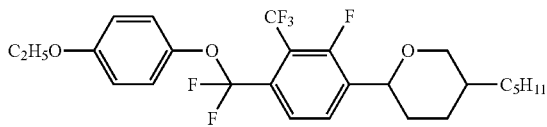
(1-12-57)
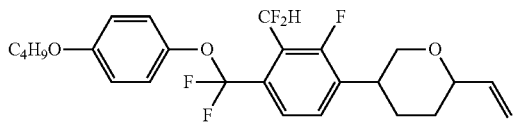
(1-12-58)
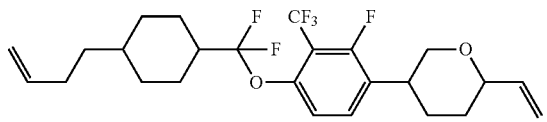
(1-12-59)
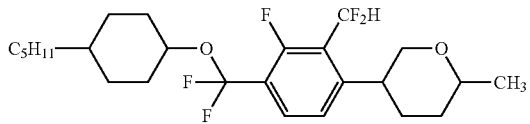
(1-12-60)
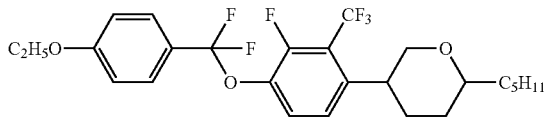
(1-12-61)
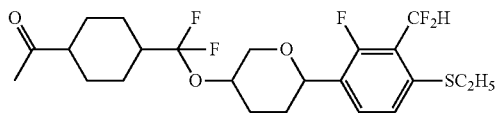
(1-12-62)
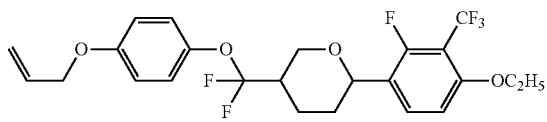
(1-12-63)
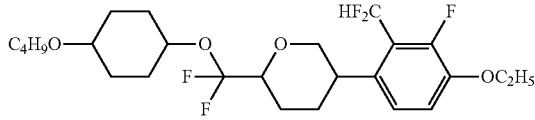
(1-12-64)
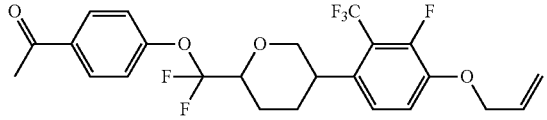
(1-12-65)
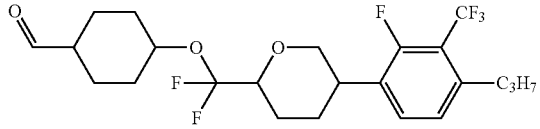
(1-12-66)
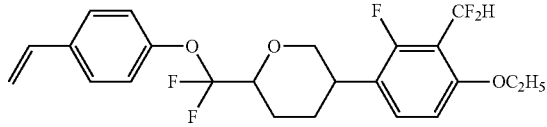
Formula 65
(1-13-1)
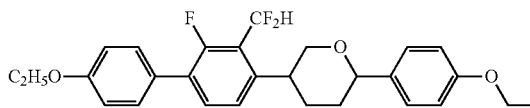
(1-13-2)
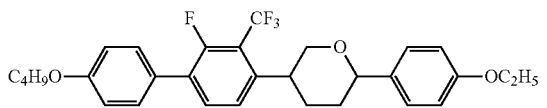
(1-13-3)
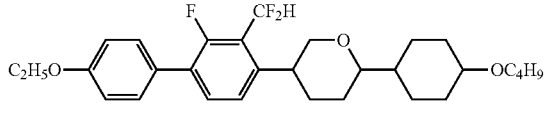
(1-13-4)
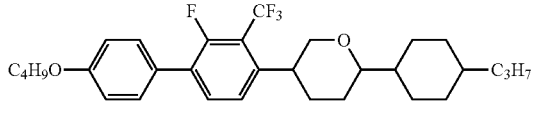
(1-13-5)
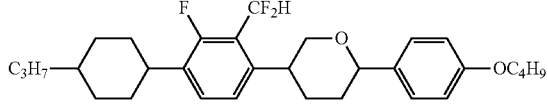
(1-13-6)
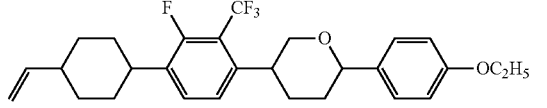
(1-13-7)
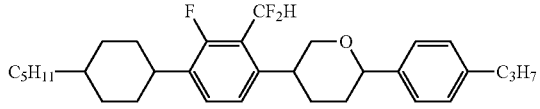
(1-13-8)
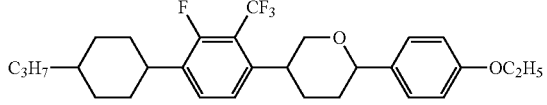

-continued
(1-13-9)
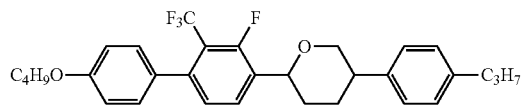
(1-13-10)
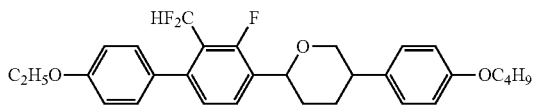
(1-13-11)
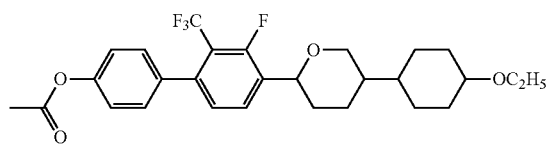
(1-13-12)
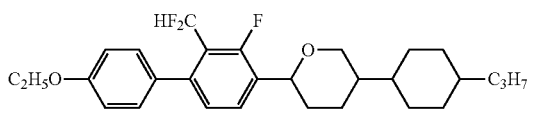
(1-13-13)
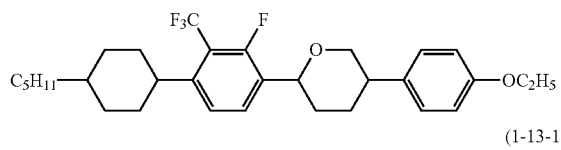
(1-13-14)
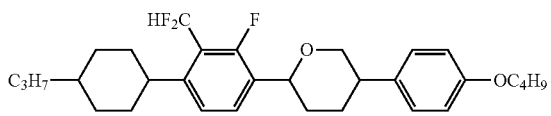
(1-13-15)
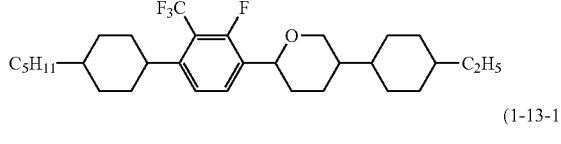
(1-13-16)
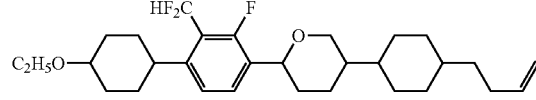
(1-13-17)
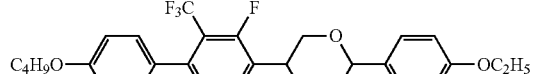
(1-13-18)
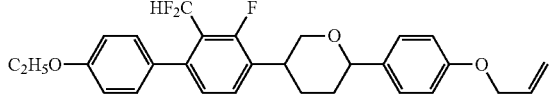
(1-13-19)
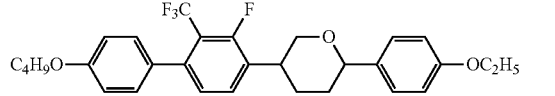
(1-13-20)
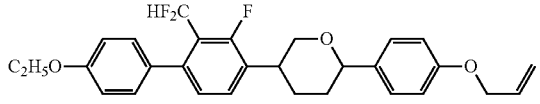
(1-13-21)
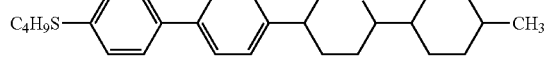
(1-13-22)
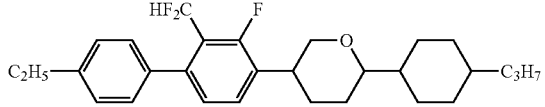
(1-13-23)
(1-13-24)
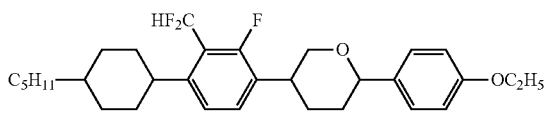
Formula 66
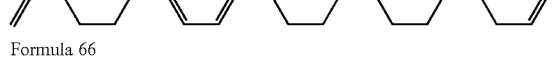
(1-14-1)
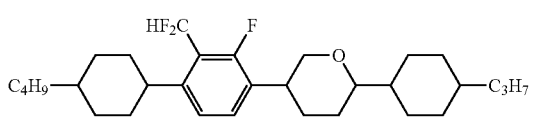
(1-14-2)
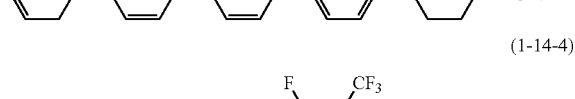
(1-14-3)
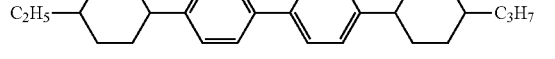
(1-14-4)

-continued
(1-14-5)
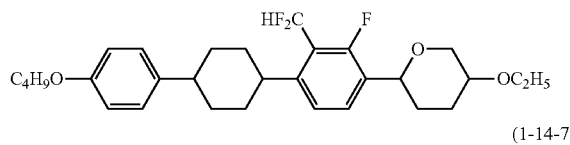
(1-14-6)
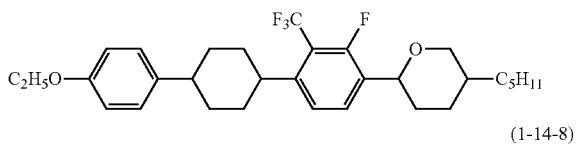
(1-14-7)
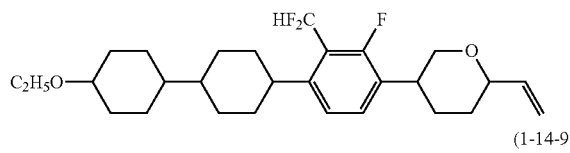
(1-14-8)
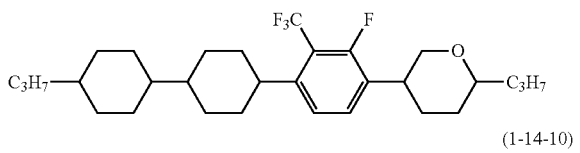
(1-14-9)
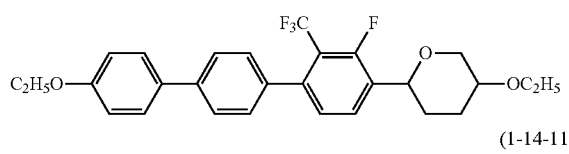
(1-14-10)
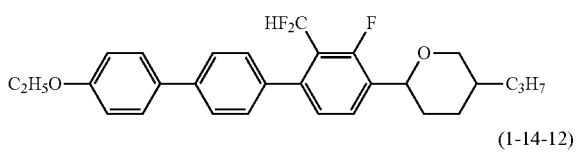
(1-14-11)
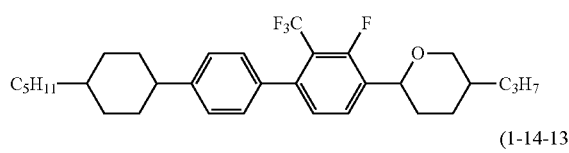
(1-14-12)
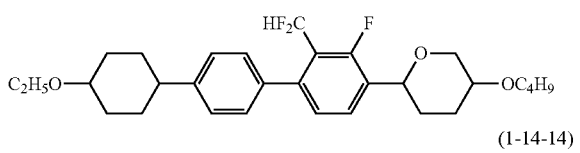
(1-14-13)
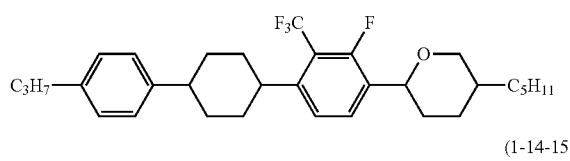
(1-14-14)
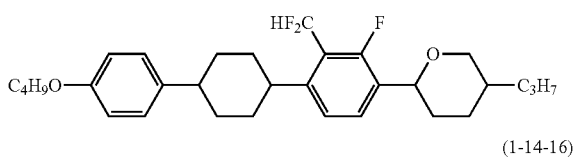
(1-14-15)
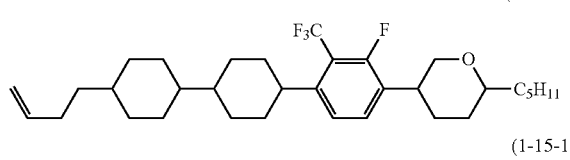
(1-14-16)
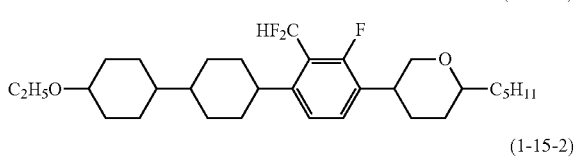
(1-15-1)
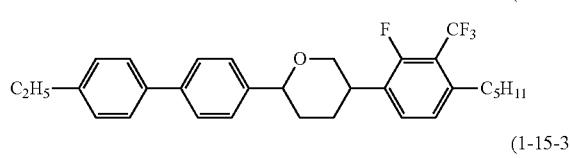
(1-15-2)
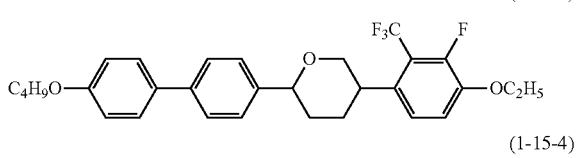
(1-15-3)
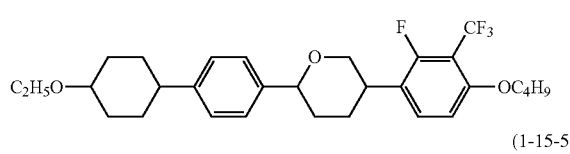
(1-15-4)
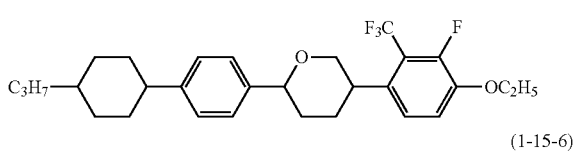
(1-15-5)
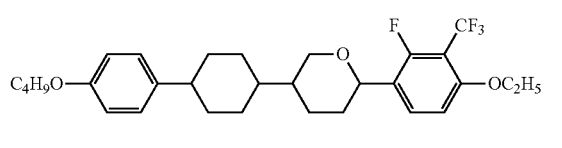
(1-15-6)
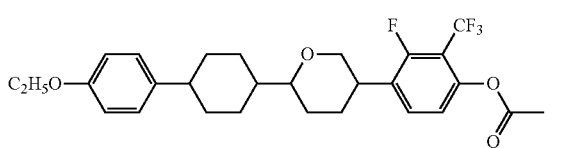
(1-15-7)
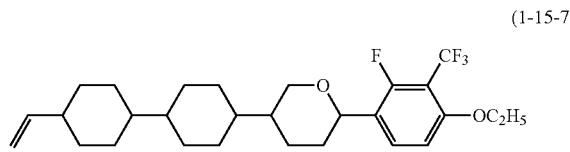
(1-15-8)
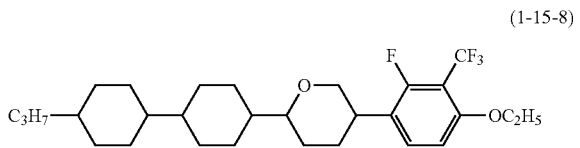
(1-15-9)
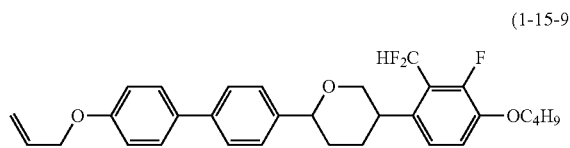
(1-15-10)
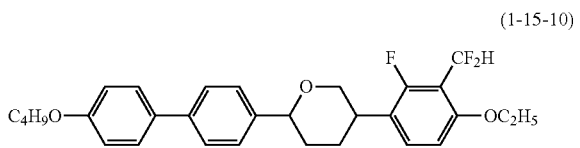

-continued
(1-15-11)
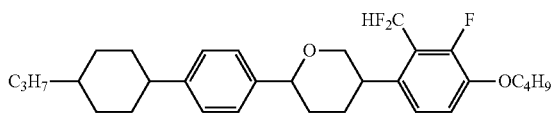
(1-15-12)
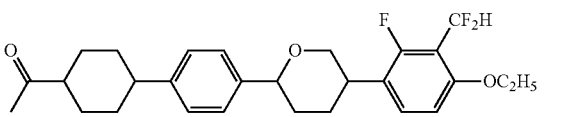
Formula 67
(1-15-13)
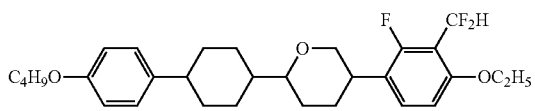
(1-15-14)
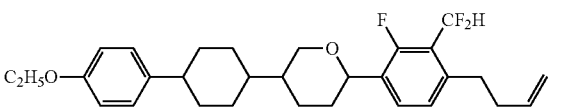
(1-15-15)
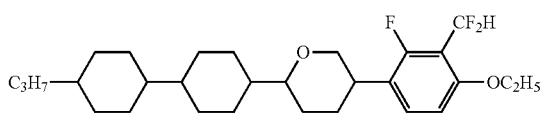
T$_{NI}$: 187.6, Δε: -8.3, Δn: 0.105.
(1-15-16)
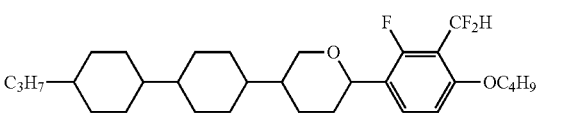
(1-16-1)
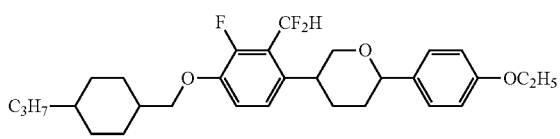
(1-16-2)
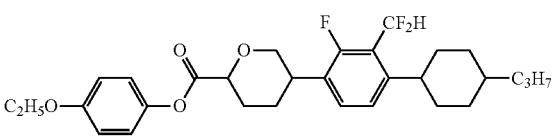
(1-16-3)
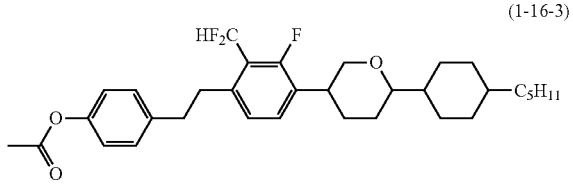
(1-16-4)
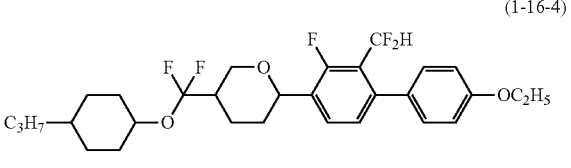
(1-16-5)
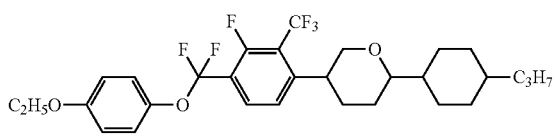
(1-16-6)
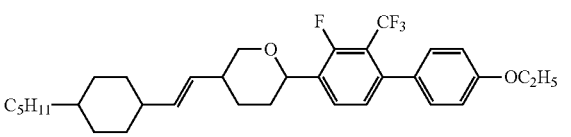
(1-16-7)
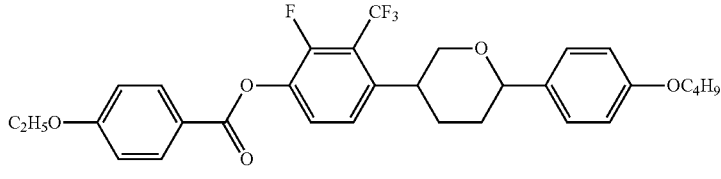
(1-16-8)
(1-16-9)
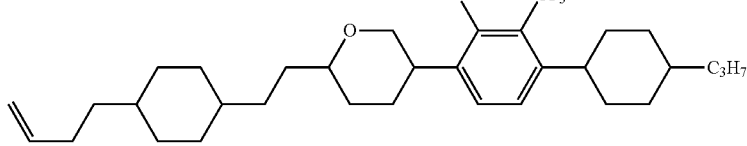
(1-16-10)

-continued
(1-16-11)
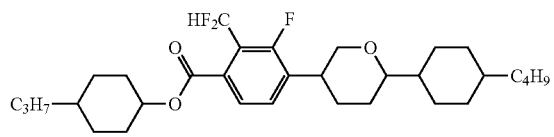
(1-16-12)
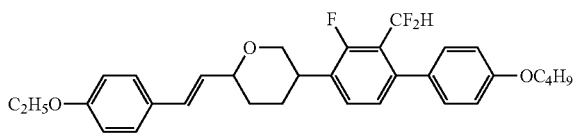
(1-16-13)
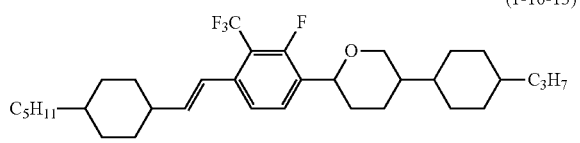
(1-16-14)
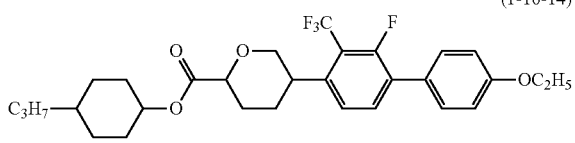
(1-16-15)
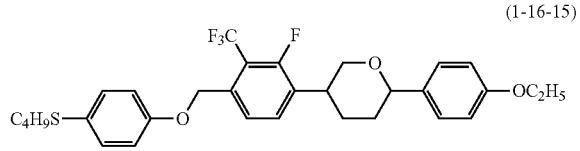
(1-16-16)
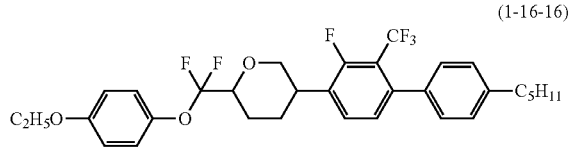
(1-17-1)
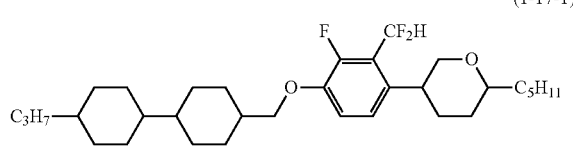
(1-17-2)
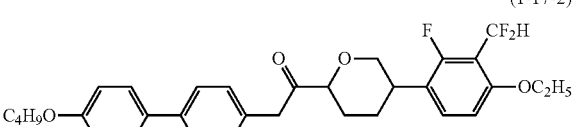
(1-17-3)
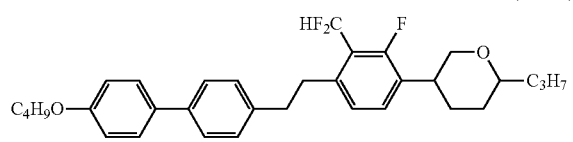
(1-17-4)
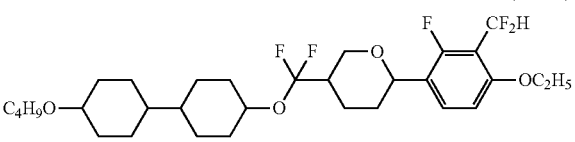
(1-17-5)
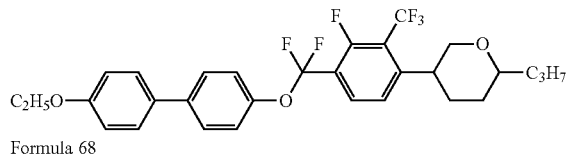
(1-17-6)
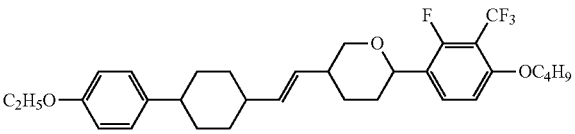
Formula 68
(1-17-7)
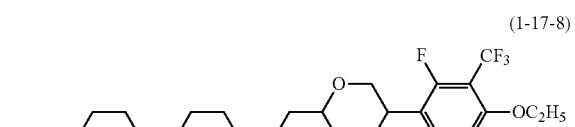
(1-17-8)
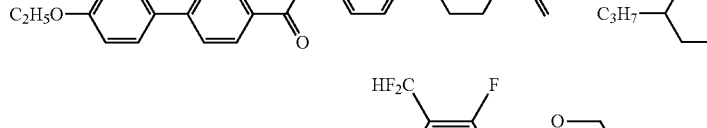
(1-17-9)
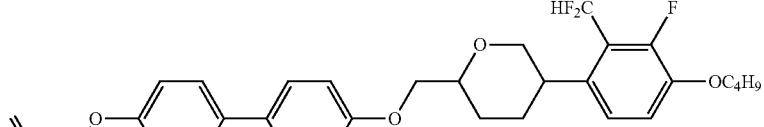
(1-17-9)
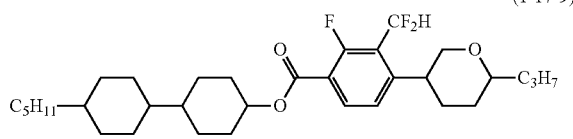
(1-17-10)
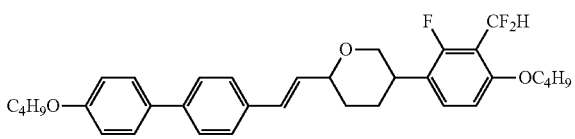

-continued
(1-17-11)
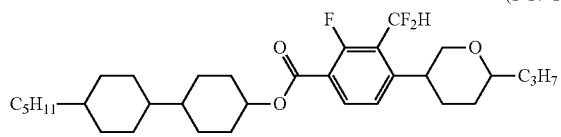
(1-17-12)
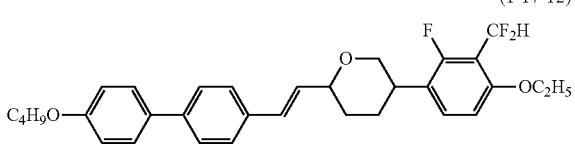
(1-17-13)
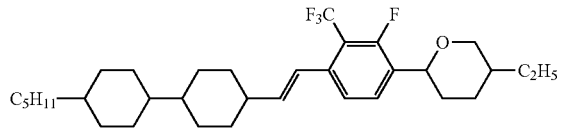
(1-17-14)
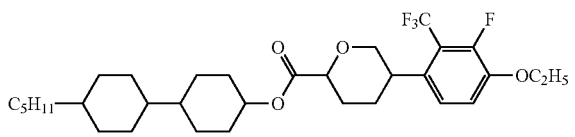
(1-17-15)
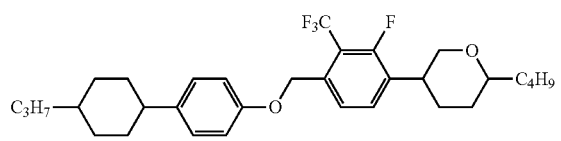
(1-17-16)
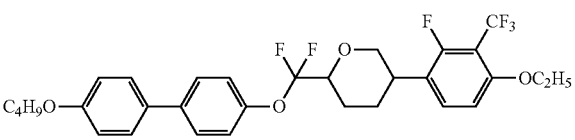
(1-18-1)
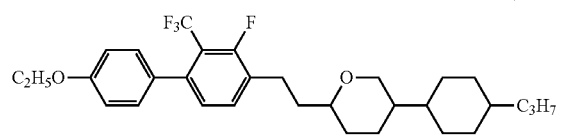
(1-18-2)
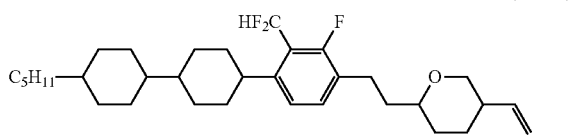
(1-18-3)
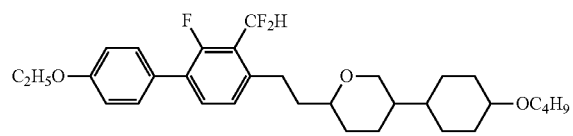
(1-18-4)
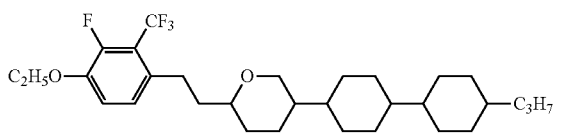
(1-18-5)
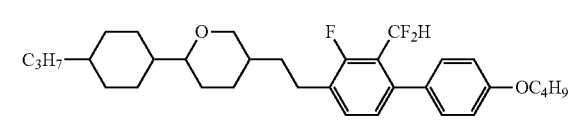
(1-18-6)
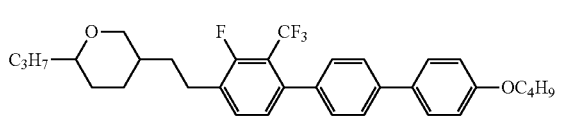
(1-18-8)
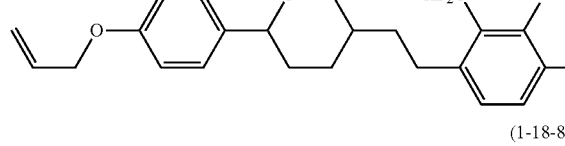
(1-18-9)
(1-18-10)
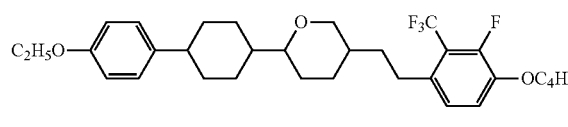
(1-18-11)
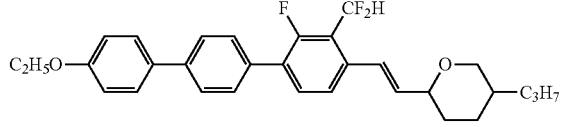
(1-18-12)
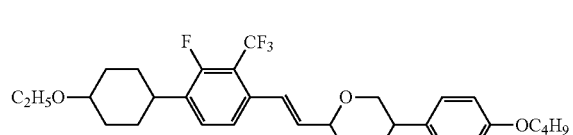
(1-18-13)
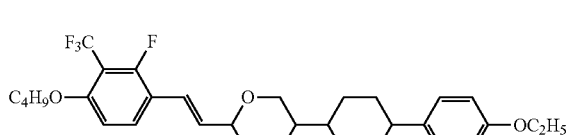
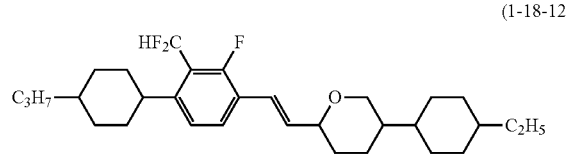

-continued
(1-17-13)
(1-17-14)
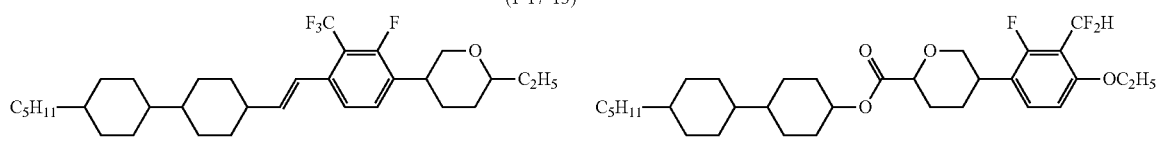
(1-18-14)
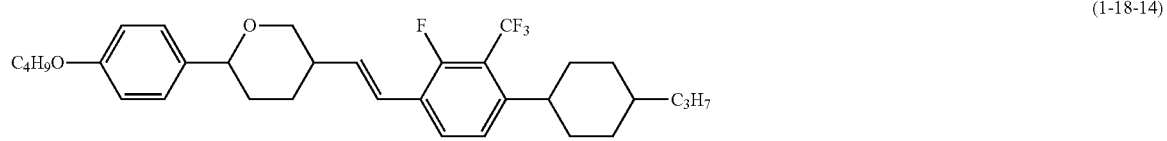
Formula 69
(1-18-15)
(1-18-16)
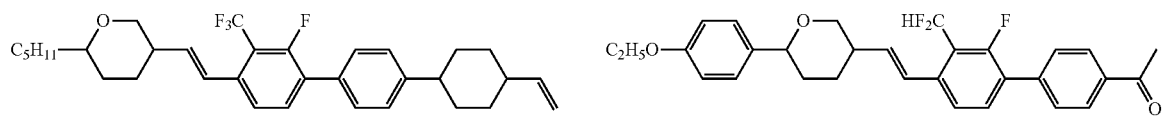
(1-18-17)
(1-18-18)
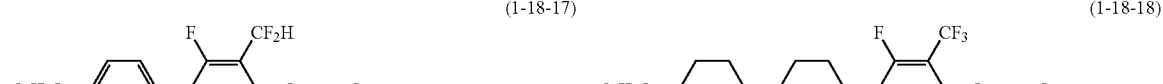
(1-18-19)
(1-18-20)
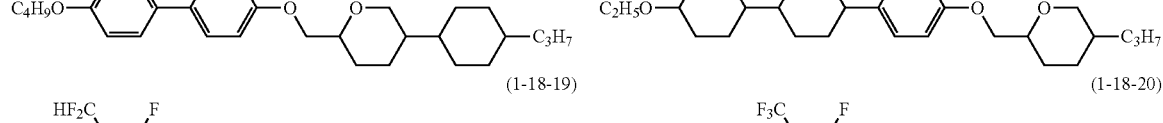
(1-18-21)
(1-18-22)
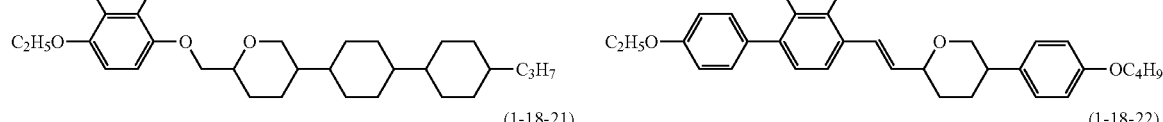
(1-18-23)
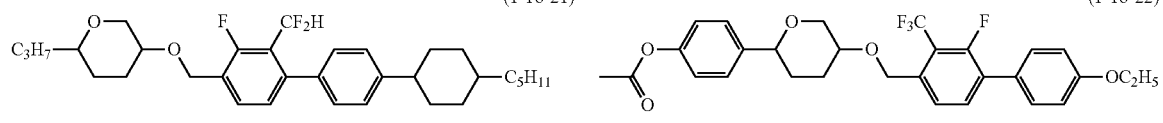
(1-18-24)
(1-19-1)
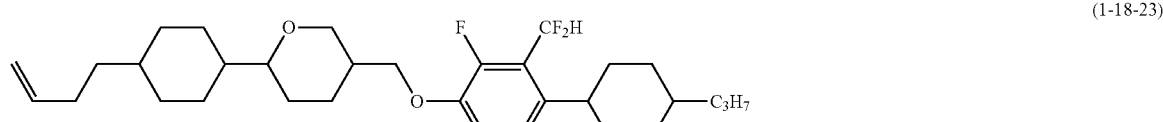
(1-19-2)
(1-19-3)
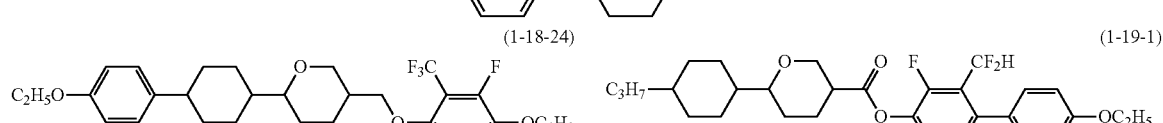
(1-19-4)
(1-19-5)
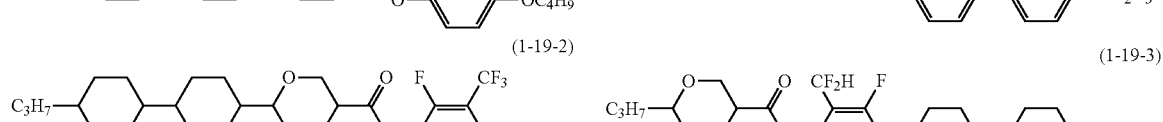
(1-19-6)
(1-19-7)
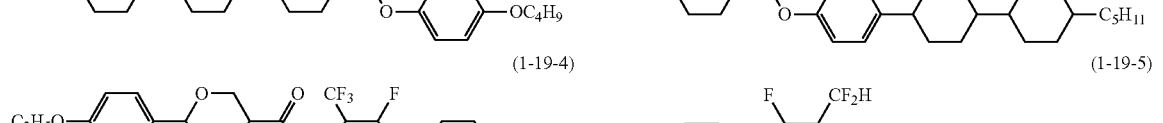

-continued
(1-19-8)
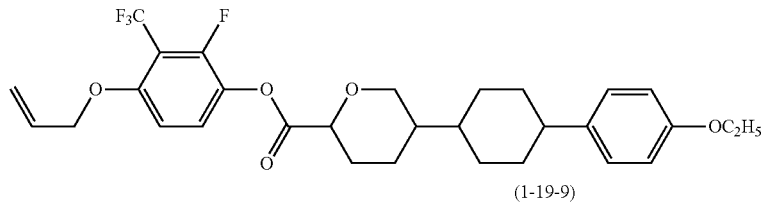
(1-19-9)
(1-19-10)
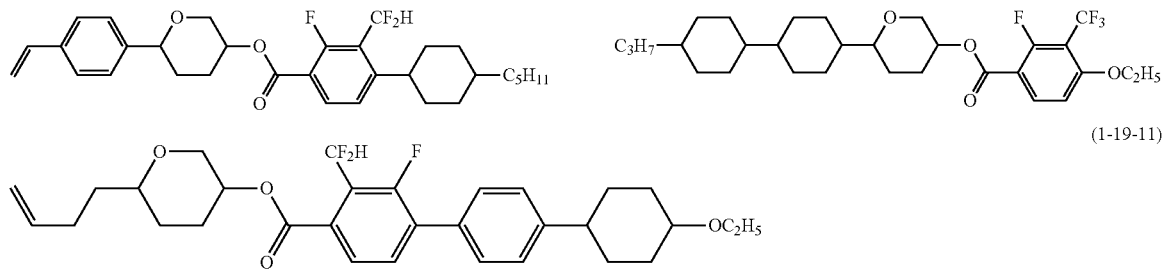
(1-19-11)
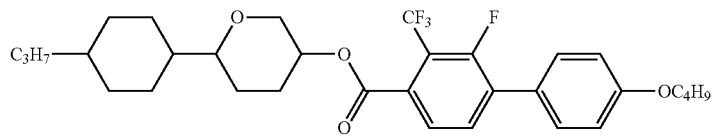
(1-19-12)
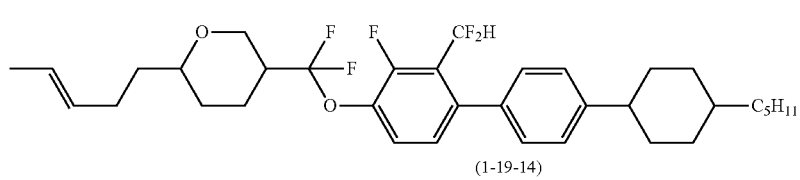
Formula 70
(1-19-13)
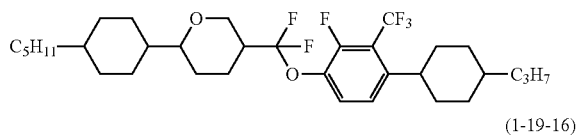
(1-19-14)
(1-19-15)
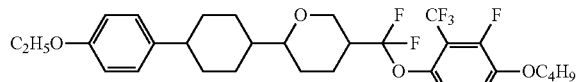
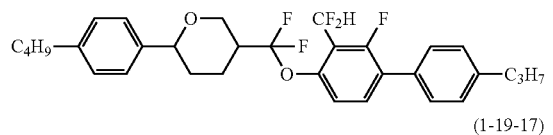
(1-19-16)
(1-19-17)
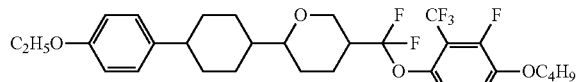
(1-19-18)
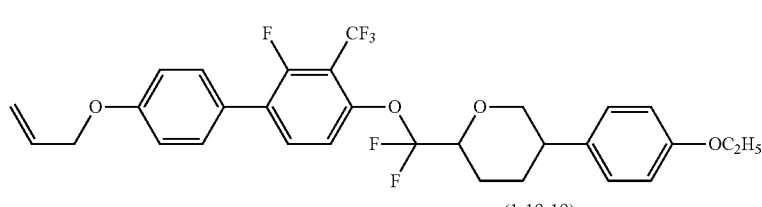
(1-19-19)
(1-19-20)
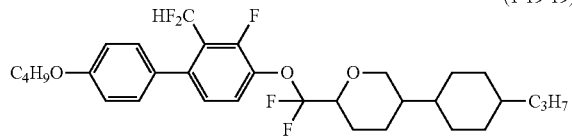
(1-19-21)
(1-19-22)
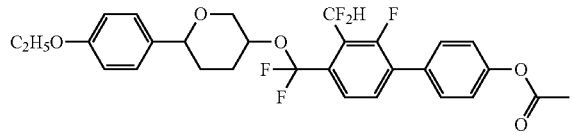
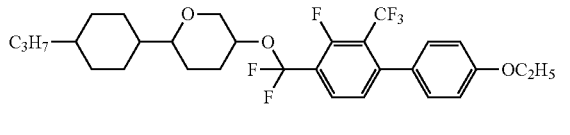

Formula 71

Examples of Liquid Crystal Compositions

Liquid crystal compositions of the invention are described in detail by way of Examples. The invention is not limited by the Examples. Compounds in Examples are described using symbols based on definitions in Table 2 below. In Table 2, a configuration of 1,4-cyclohexylene is trans. A ratio (percentage) of each compound is expressed in terms of percentage by mass (% by mass) based on the total mass of the liquid crystal composition. Values of physical properties of the composition were summarized in the last part. The physical properties were measured according to the methods described above, and described as were without extrapolation of measured values.

TABLE 2

Method for Description of Compounds using Symbols
R—(A$_1$)—Z$_1$— ... —Zn—(A$_n$)—R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |

| 2) Right-terminal Group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —OCH=CH—C$_n$H$_{2n+1}$ | —OVn |
| —C$_n$H$_{2n}$—CH=CH$_2$ | —nV |
| —CH=CF$_2$ | —VFF |
| —COOCH$_3$ | —EMe |
| —CN | —C |
| —F | —F |

TABLE 2-continued

Method for Description of Compounds using Symbols
R—(A₁)—Z₁—...—Zn—(Aₙ)—R'

| | |
|---|---|
| —Cl | —CL |
| —OCF₃ | —OCF3 |

3) Bonding Group —Zₙ— | Symbol

| | |
|---|---|
| —CₙH₂ₙ— | n |
| —COO— | E |
| —CH=CH— | V |
| —CH₂O— | 1O |
| —CF₂O— | X |
| —C≡C— | T |

4) Ring Structure —Aₙ— | Symbol

 H

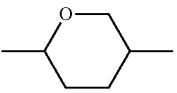 Dh

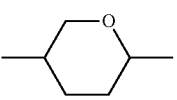 dH

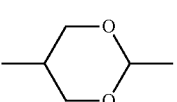 G

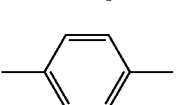 B

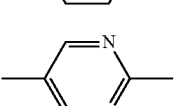 Py

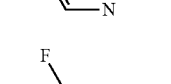 B(2F)

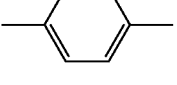 B(F)

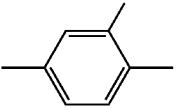 B(F,F)

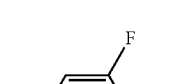 B(2F,3F)

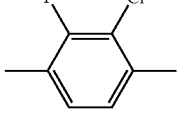 B(2F,3CL)

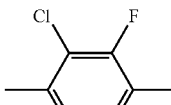 B(2CL,3F)

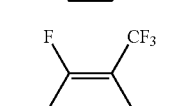 B(2F,3CF3)

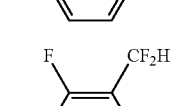 B(2F,3CF2H)

5) Examples of Description

Example 1  3-HDhB(2F,3CF2H)—O2

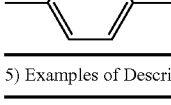

Example 2  3-HdhB(2F,3CF3)—O2

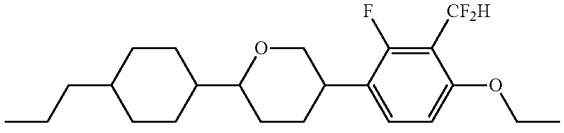

Example 3  1V2-BEB-C

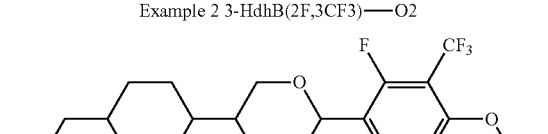

Example 4  3-H2BTB-2

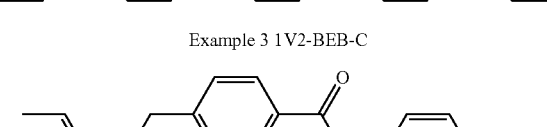

Example 4

A composition formulation of a liquid crystal composition in Example 4 was as described below.

| | | |
|---|---|---|
| 3-HDhB(2F,3CF2H)—O2 | (1-5-11) | 4% |
| 3-HHDhB(2F,3CF2H)—O2 | (1-15-15) | 4% |
| 3-HH—O1 | (12-1) | 8% |
| 5-HH—O1 | (12-1) | 4% |

-continued

| | | |
|---|---|---|
| 3-HH-4 | (12-1) | 5% |
| 3-HB(2F,3F)—O2 | (6-1) | 16% |
| 5-HB(2F,3F)—O2 | (6-1) | 21% |
| 3-HHB(2F,3F)-1 | (7-1) | 7% |
| 3-HHB(2F,3F)—O2 | (7-1) | 14% |
| 5-HHB(2F,3F)—O2 | (7-1) | 17% |

Values of physical properties of the liquid crystal composition were as described below.
NI=76.4° C.; Δn=0.083; Δ∈=−4.4; η=35.4 mPa·s.

Example 5

A composition formulation of a liquid crystal composition in Example 5 was as described below.

| | | |
|---|---|---|
| 3-HDhB(2F,3CF2H)—O2 | (1-5-11) | 3% |
| 3-HdhB(2F,3CF2H)—O2 | (1-4-11) | 3% |
| 3-HB—O1 | (12-5) | 15% |
| 3-HH-4 | (12-1) | 5% |
| 3-HB(2F,3F)—O2 | (6-1) | 12% |
| 5-HB(2F,3F)—O2 | (6-1) | 12% |
| 2-HHB(2F,3F)-1 | (7-1) | 12% |
| 3-HHB(2F,3F)-1 | (7-1) | 12% |
| 3-HHB(2F,3F)—O2 | (7-1) | 7% |
| 5-HHB(2F,3F)—O2 | (7-1) | 13% |
| 3-HHB-1 | (13-1) | 6% |

Values of physical properties of the liquid crystal composition were as described below.
NI=79.3° C.; Δn=0.088; Δ∈=−3.1; =28.9 mPa·s.

Example 6

A composition formulation of a liquid crystal composition in Example 6 was as described below.

| | | |
|---|---|---|
| 3-HdhB(2F,3CF2H)—O2 | (1-4-11) | 4% |
| 3-HHDhB(2F,3CF2H)—O2 | (1-15-15) | 4% |
| 3-HH-4 | (12-1) | 6% |
| 3-H2B(2F,3F)—O2 | (6-4) | 22% |
| 5-H2B(2F,3F)—O2 | (6-4) | 22% |
| 2-HHB(2F,3CL)—O2 | (7-12) | 2% |
| 3-HHB(2F,3CL)—O2 | (7-12) | 3% |
| 4-HHB(2F,3CL)—O2 | (7-12) | 2% |
| 5-HHB(2F,3CL)—O2 | (7-12) | 2% |
| 2-HBB(2F,3F)—O2 | (7-7) | 9% |
| 3-HBB(2F,3F)—O2 | (7-7) | 9% |
| V-HHB-1 | (13-1) | 6% |
| 3-HHB-3 | (13-1) | 6% |
| 3-HHEBH-5 | (14-6) | 3% |

Values of physical properties of the liquid crystal composition were as described below.
NI=83.6° C.; Δn=0.099; Δ∈=−3.9; η=34.4 mPa·s.
In addition, a pitch when 0.25 mass part of optically active compound (Op-5) (the compound is exemplified in the description of embodiments) was added to 100 mass parts of the composition was 60.5 micrometers.

Example 7

A composition formulation of a liquid crystal composition in Example 7 was as described below.

| | | |
|---|---|---|
| 3-HDhB(2F,3CF2H)—O2 | (1-5-11) | 4% |
| 3-HdhB(2F,3CF2H)—O2 | (1-4-11) | 3% |
| 2-BEB(F)—C | (5-14) | 5% |
| 3-BEB(F)—C | (5-14) | 4% |
| 4-BEB(F)—C | (5-14) | 12% |
| 1V2-BEB(F,F)—C | (5-15) | 16% |
| 3-HB—O2 | (12-5) | 10% |
| 3-HH-4 | (12-1) | 3% |
| 3-HHB—F | (3-1) | 3% |
| 3-HHB-1 | (13-1) | 8% |
| 3-HHB—O1 | (13-1) | 4% |
| 3-HBEB—F | (3-37) | 4% |
| 3-HHEB—F | (3-10) | 3% |
| 5-HHEB—F | (3-10) | 4% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 5% |

Values of physical properties of the liquid crystal composition were as described below.
NI=80.6° C.; Δn=0.138; Δ∈=23.0; η=37.3 mPa·s.

Example 8

A composition formulation of a liquid crystal composition in Example 8 was as described below.

| | | |
|---|---|---|
| 3-HDhB(2F,3CF2H)—O2 | (1-5-11) | 3% |
| 3-HHDhB(2F,3CF2H)—O2 | (1-15-15) | 3% |
| 1V2-BEB(F,F)—C | (5-15) | 6% |
| 3-HB—C | (5-1) | 18% |
| 2-BTB-1 | (12-10) | 10% |
| 5-HH—VFF | (12-1) | 30% |
| 3-HHB-1 | (13-1) | 4% |
| VFF-HHB-1 | (13-1) | 8% |
| VFF2-HHB-1 | (13-1) | 11% |
| 3-H2BTB-2 | (13-17) | 3% |
| 3-H2BTB-4 | (13-17) | 4% |

Values of physical properties of the liquid crystal composition were as described below.
NI=76.2° C.; Δn=0.119; Δ∈=8.9; η=10.6 mPa·s.

Example 9

A composition formulation of a liquid crystal composition in Example 9 was as described below.

| | | |
|---|---|---|
| 3-HDhB(2F,3CF2H)—O2 | (1-5-11) | 2% |
| 3-HdhB(2F,3CF2H)—O2 | (1-4-11) | 2% |
| 3-HHDhB(2F,3CF2H)—O2 | (1-15-15) | 2% |
| 5-HB—CL | (2-2) | 3% |
| 7-HB(F)—F | (2-3) | 7% |
| 3-HH-4 | (12-1) | 9% |
| 3-HH—EMe | (12-2) | 23% |
| 3-HHEB—F | (3-10) | 8% |
| 5-HHEB—F | (3-10) | 8% |
| 3-HHEB(F,F)—F | (3-12) | 10% |
| 4-HHEB(F,F)—F | (3-12) | 5% |
| 4-HGB(F,F)—F | (3-103) | 3% |
| 5-HGB(F,F)—F | (3-103) | 6% |
| 2-H2GB(F,F)—F | (3-106) | 4% |
| 3-H2GB(F,F)—F | (3-106) | 5% |
| 5-GHB(F,F)—F | (3-109) | 3% |

Values of physical properties of the liquid crystal composition were as described below.
NI=73.1° C.; Δn=0.067; Δ∈=9.1; η=25.7 mPa·s.

Use Examples of Liquid Crystal Compositions
Specific Use Examples includes composition formulations of liquid crystal compositions as described below.

Use Example 1

| | | |
|---|---|---|
| 3-HdhB(2F,3CF2H)—O2 | (1-4-11) | 4% |
| 3-HdhB(2F,3CF3)—O2 | (1-4-18) | 3% |
| 3-HB—O1 | (12-5) | 15% |
| 3-HH-4 | (12-1) | 4% |
| 3-HB(2F,3F)—O2 | (6-1) | 12% |
| 5-HB(2F,3F)—O2 | (6-1) | 12% |
| 2-HHB(2F,3F)-1 | (7-1) | 12% |
| 3-HHB(2F,3F)-1 | (7-1) | 12% |
| 3-HHB(2F,3F)—O2 | (7-1) | 10% |
| 5-HHB(2F,3F)—O2 | (7-1) | 10% |
| 6-HEB(2F,3F)—O2 | (6-6) | 6% |

Use Example 2

| | | |
|---|---|---|
| 3-HDhB(2F,3CF2H)—O2 | (1-5-11) | 4% |
| 5-BDhB(2F,3CF2H)—O2 | (1-5-17) | 3% |
| 2-HH-5 | (12-1) | 3% |
| 3-HH-4 | (12-1) | 15% |
| 3-HH-5 | (12-1) | 4% |
| 3-HB—O2 | (12-5) | 12% |
| 3-H2B(2F,3F)—O2 | (6-4) | 15% |
| 5-H2B(2F,3F)—O2 | (6-4) | 15% |
| 3-HHB(2F,3CL)—O2 | (7-12) | 5% |
| 2-HBB(2F,3F)—O2 | (7-7) | 3% |
| 3-HBB(2F,3F)—O2 | (7-7) | 9% |
| 5-HBB(2F,3F)—O2 | (7-7) | 5% |
| 3-HHB-1 | (13-1) | 4% |
| 3-HHB—O1 | (13-1) | 3% |

Use Example 3

| | | |
|---|---|---|
| 3-HdhB(2F,3CF2H)—O2 | (1-4-11) | 4% |
| 5-H2dhB(2F,3CF2H)—O2 | (1-8-31) | 3% |
| 3-HB—O1 | (12-5) | 12% |
| 3-HH-4 | (12-1) | 5% |
| 3-HB(2F,3F)—O2 | (6-1) | 12% |
| 5-HB(2F,3F)—O2 | (6-1) | 12% |
| 2-HHB(2F,3F)-1 | (7-1) | 12% |
| 3-HHB(2F,3F)-1 | (7-1) | 12% |
| 3-HHB(2F,3F)—O2 | (7-1) | 9% |
| 5-HHB(2F,3F)—O2 | (7-1) | 13% |
| 3-HHB-1 | (13-1) | 6% |

Use Example 4

| | | |
|---|---|---|
| 3-HdhB(2F,3CF3)—O2 | (1-4-18) | 4% |
| 5-H2dhB(2F,3CF2H)—O2 | (1-8-31) | 3% |
| 2-HB—C | (5-1) | 5% |
| 3-HB—C | (5-1) | 12% |
| 3-HB—O2 | (12-5) | 12% |
| 2-BTB-1 | (12-10) | 3% |
| 3-HHB—F | (3-1) | 4% |
| 3-HHB-1 | (13-1) | 8% |
| 3-HHB—O1 | (13-1) | 5% |
| 3-HHB-3 | (13-1) | 12% |
| 3-HHEB—F | (3-10) | 2% |
| 5-HHEB—F | (3-10) | 4% |
| 2-HHB(F)—F | (3-2) | 7% |
| 3-HHB(F)—F | (3-2) | 7% |
| 5-HHB(F)—F | (3-2) | 7% |
| 3-HHB(F,F)—F | (3-3) | 5% |

Use Example 5

| | | |
|---|---|---|
| 3-HHDhB(2F,3CF2H)—O2 | (1-15-15) | 3% |
| 5-BDhB(2F,3CF2H)—O2 | (1-5-17) | 2% |
| 5-HB—CL | (2-2) | 16% |
| 3-HH-4 | (12-1) | 12% |
| 3-HH-5 | (12-1) | 4% |
| 3-HHB—F | (3-1) | 4% |
| 3-HHB—CL | (3-1) | 3% |
| 4-HHB—CL | (3-1) | 4% |
| 3-HHB(F)—F | (3-2) | 10% |
| 4-HHB(F)—F | (3-2) | 9% |
| 5-HHB(F)—F | (3-2) | 9% |
| 7-HHB(F)—F | (3-2) | 8% |
| 5-HBB(F)—F | (3-23) | 4% |
| 1O1-HBBH-5 | (14-1) | 3% |
| 5-HHBB(F,F)—F | (4-6) | 3% |
| 3-HH2BB(F,F)—F | (4-15) | 3% |
| 4-HH2BB(F,F)—F | (4-15) | 3% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A compound of the invention has a large negative value of dielectric anisotropy ($\Delta\epsilon$), and when the compound is incorporated into a liquid crystal composition, the invention can provide a liquid crystal composition allowing low voltage driving according to various kinds of display modes, and a liquid crystal display device using the liquid crystal composition.

What is claimed is:
1. A compound represented by formula (1):

Formula 1

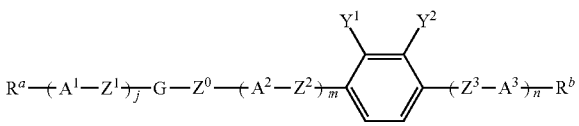

(1)

wherein, in formula (1),
one of $Y^1$ and $Y^2$ is fluorine, and the other is $CF_2H$ or $CF_3$;
G is a ring represented by formula (pr-1) or formula (pr-2):

Formula 2

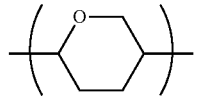

(pr-1)

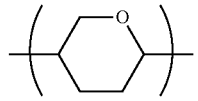

(pr-2)

wherein
$A^1$ to $A^3$ are independently 1,4-cyclohexylene or 1,4-phenylene;

$R^a$ and $R^b$ are independently hydrogen or alkyl having 1 to 20 carbons, and in the alkyl, at least one of —CH$_2$— may be replaced by —O—, —S— or —CO—, and at least one of —(CH$_2$)$_2$— may be replaced by —CH=CH—;

$Z^0$, and $Z^1$ to $Z^3$ are independently a single bond, —(CH$_2$)—CH=CH—, —CF$_2$O—, —OCF$_2$—, —CH$_2$O—, —OCH$_2$—, —COO— or —OCO—;

j, m and n are an integer from 0 to 2, and a sum of j, m and n is 0, 1 or 2, a plurality of -A$^1$-Z$^1$— may be identical with or different from each other when j is 2, a plurality of -A$^2$-Z$^2$— may be identical with or different from each other when m is 2, and a plurality of —Z$^3$-A$^3$- may be identical with or different from each other when n is 2, however, G is a ring represented by formula (pr-1) when m is 0, $Y^1$ is CF$_2$H or CF$_3$, $Y^2$ is fluorine, and $Z^0$ is a single bond.

2. The compound according to claim 1, wherein, in formula (1), $Z^0$, and $Z^1$ to $Z^3$ are a single bond.

3. The compound according to claim 1, wherein, in formula (1), m is 0.

4. The compound according to claim 1, represented by formula (1-1-1) or formula (1-2-1):

Formula 3

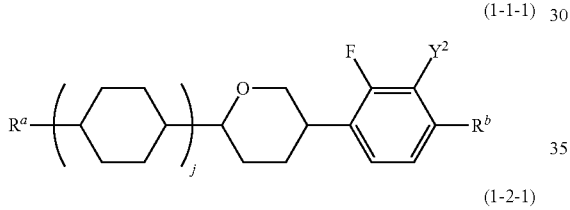

(1-1-1)

(1-2-1)

wherein, in formula (1-1-1) or formula (1-2-1), $R^a$ and $R^b$ are defined in a manner identical with the definitions of the identical symbols in formula (1), respectively, $Y^2$ is CF$_2$H or CF$_3$, and j is 1 or 2.

5. A liquid crystal composition containing the compound according to claim 1.

6. The liquid crystal composition according to claim 5, further containing at least one kind of compound selected from the group of compounds represented by formulas (2) to (4):

Formula 4

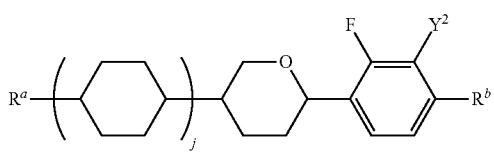

(2)

-continued

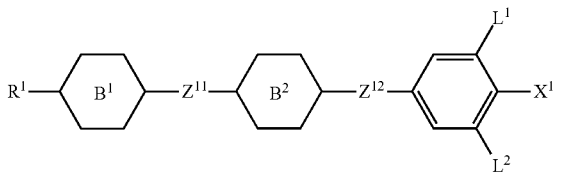

(3)

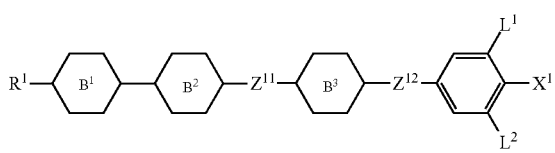

(4)

wherein, in formulas (2) to (4), $R^1$ is alkyl having 1 to 10 carbons or alkenyl having 2 to 10 carbons, and in the alkyl and the alkenyl, at least one of hydrogen may be replaced by fluorine, and at least one of —CH$_2$— may be replaced by —O—;

$X^1$ is fluorine, chlorine, —OCF$_3$, —OCF$_2$H, —CF$_3$, —CF$_2$H, —CFH$_2$, —OCF$_2$CF$_2$H or —OCF$_2$CFHCF$_3$;

ring B$^1$, ring B$^2$ and ring B$^3$ are independently 1,4-cyclohexylene, 1,3-dioxane-2,5-diyl, pyrimidine-2,5-diyl, tetrahydropyran-2,5-diyl, tetrahydropyran-3,6-diyl, or 1,4-phenylene in which at least one of hydrogen may be replaced by fluorine;

$Z^{11}$ and $Z^{12}$ are independently —(CH$_2$)$_2$—, —(CH$_2$)$_4$—, —COO—, —CF$_2$O—, —OCF$_2$—, —CH=CH—, —CH$_2$O— or a single bond; and $L^1$ and $L^2$ are independently hydrogen or fluorine.

7. The liquid crystal composition according to claim 5, further containing a compound represented by formula (5):

Formula 5

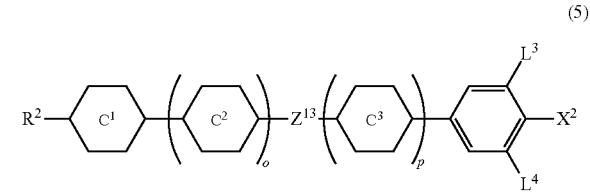

(5)

wherein, in formula (5), $R^2$ is alkyl having 1 to 10 carbons or alkenyl having 2 to 10 carbons, and in the alkyl and the alkenyl, at least one of hydrogen may be replaced by fluorine, and at least one of —CH$_2$— may be replaced by —O—;

$X^2$ is —C≡N or —C≡C—C≡N;

ring $C^1$, ring $C^2$ and ring $C^3$ are independently 1,4-cyclohexylene, 1,4-phenylene, 1,3-dioxane-2,5-diyl, tetrahydropyran-2,5-diyl, tetrahydropyran-3,6-diyl or pyrimidine-2,5-diyl, and in the 1,4-phenylene, at least one of hydrogen may be replaced by fluorine;

$Z^{13}$ is —(CH$_2$)$_2$—, —COO—, —CF$_2$O—, —OCF$_2$—, —C≡C—, —CH$_2$O— or a single bond;

$L^3$ and $L^4$ are independently hydrogen or fluorine;

o is 0, 1 or 2, p is 0 or 1, two of ring $C^2$ may be identical or different when o is 2, and a sum of o and p is 0, 1 or 2.

8. The liquid crystal composition according to claim 5, further containing at least one kind of compound selected from the group of compounds represented by formulas (6) to (11):

Formula 6

(6)
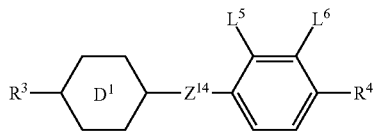

(7)
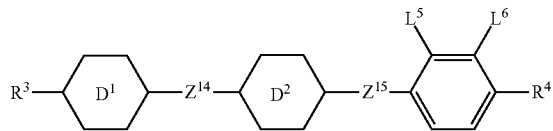

(8)
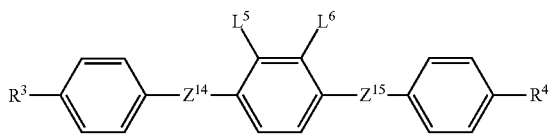

(9)
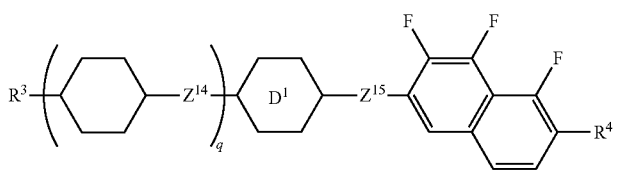

(10)
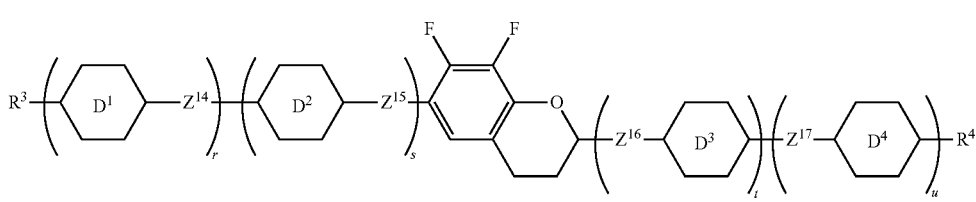

(11)
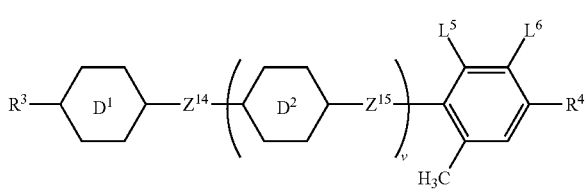

wherein, in formulas (6) to (11), $R^3$ and $R^4$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene, tetrahydropyran-2,5-diyl, tetrahydropyran-3,6-diyl or decahydro-2,6-naphthalene, and in the 1,4-phenylene, at least one of hydrogen may be replaced by fluorine;

$Z^{14}$, $Z^{15}$, $Z^{16}$ and $Z^{17}$ are independently —$(CH_2)_2$—, —COO—, —$CH_2O$—, —$OCF_2$—, —$OCF_2(CH_2)_2$— or a single bond;

$L^5$ and $L^6$ are independently fluorine or chlorine; and q, r, s, t, u and v are independently 0 or 1, and a sum of r, s, t and u is 1 or 2.

9. The liquid crystal composition according to claim 5, further containing at least one kind of compound selected from the group of compounds represented by formulas (12) to (14):

Formula 7

(12)
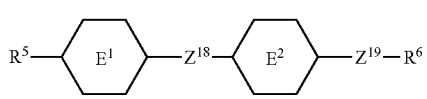

(13)
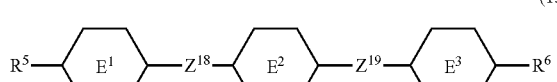

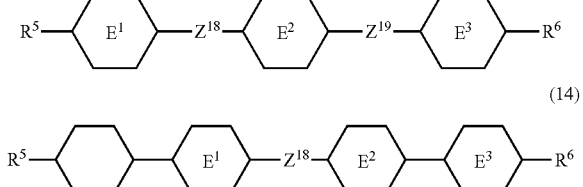

(14)
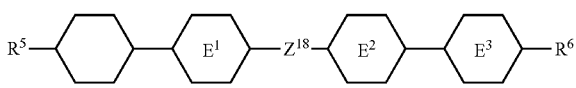

wherein, in formulas (12) to (14), $R^5$ and $R^6$ are independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{18}$ and $Z^{19}$ are independently —C≡C—, —COO—, —(CH$_2$)$_2$—, —CH═CH— or a single bond.

10. The liquid crystal composition according to claim 5, further containing at least one kind selected from the group of an optically active compound and a polymerizable compound.

11. The liquid crystal composition according to claim 5, further containing at least one kind selected from the group of an antioxidant and an ultraviolet light absorber.

12. A liquid crystal display device, comprising the liquid crystal composition according to claim 5.

* * * * *